(12) United States Patent
Morishita et al.

(10) Patent No.: US 8,365,248 B2
(45) Date of Patent: Jan. 29, 2013

(54) DATA PROVIDING DEVICE, OPERATION DEVICE, AND DATA PROCESSING DEVICE

(75) Inventors: Taichiro Morishita, Osaka (JP); Masaki Takeuchi, Osaka (JP); Tohru Sugayama, Osaka (JP); Junichi Shirakawa, Osaka (JP); Mitsunori Nojima, Osaka (JP); Yohhei Iwami, Osaka (JP); Akira Tojima, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 149 days.

(21) Appl. No.: 12/994,620

(22) PCT Filed: May 18, 2009

(86) PCT No.: PCT/JP2009/059147
§ 371 (c)(1),
(2), (4) Date: Nov. 24, 2010

(87) PCT Pub. No.: WO2009/145079
PCT Pub. Date: Mar. 12, 2009

(65) Prior Publication Data
US 2011/0072493 A1  Mar. 24, 2011

(30) Foreign Application Priority Data

May 30, 2008 (JP) .................... 2008-143755
Mar. 4, 2009 (JP) .................... 2009-050909
Apr. 7, 2009 (JP) .................... 2009-093339

(51) Int. Cl.
*H04L 9/32* (2006.01)
(52) U.S. Cl. .................... 726/2; 726/3; 726/4
(58) Field of Classification Search .............. 726/1–7; 713/168–171
See application file for complete search history.

(56) References Cited

U.S. PATENT DOCUMENTS

| 6,115,821 | A * | 9/2000 | Newby et al. ............ 726/21 |
| 6,564,323 | B2 * | 5/2003 | Takahashi et al. ............ 713/182 |
| 7,904,964 | B1 * | 3/2011 | Risan et al. ............ 726/27 |
| 2004/0172561 | A1 | 9/2004 | Iga |
| 2006/0227378 | A1 | 10/2006 | Mihira |
| 2009/0281950 | A1 | 11/2009 | Iga |
| 2009/0282490 | A1 | 11/2009 | Iga |

FOREIGN PATENT DOCUMENTS

| JP | 2003-157222 A | 5/2003 |
| JP | 2004-86544 A | 3/2004 |
| JP | 2004-178100 A | 6/2004 |
| JP | 2004-265139 A | 9/2004 |
| JP | 2004-348236 A | 12/2004 |
| JP | 2005-202536 A | 7/2005 |
| JP | 2006-313535 A | 11/2006 |

OTHER PUBLICATIONS

International Search Report PCT/JP2009/059147 mailing date of Jun. 23, 2009.

* cited by examiner

*Primary Examiner* — Hosuk Song
(74) *Attorney, Agent, or Firm* — Birch, Stewart, Kolasch and Birch, LLP

(57) ABSTRACT

A service providing device (400) includes: one-time PW generating processing section (435) which generates, for each operation device (300), authentication information for use in authentication processing carried out by the service providing device (400) in a case where the service providing device (400) is accessed by a display processing device (200); and an image data generating processing section (436) which (i) generates operation data including the authentication information generated and processing specifying information specifying the authentication processing, and (ii) transmits the operation data thus generated to the operation device (300).

19 Claims, 36 Drawing Sheets

DATA PROVIDING DEVICE, OPERATION DEVICE, AND DATA PROCESSING DEVICE

TECHNICAL FIELD

The present invention relates, for example, to (i) a data providing device which provides operation data for use by an operation device to operate a data processing device, (ii) a data processing device which carries out processing in accordance with operation data, and (iii) an operation device which transmits operation data to a data processing device.

BACKGROUND ART

In recent years, there has been widespread use of a portable device (for example, a mobile telephone and a digital camera) capable of communication in accordance with a high-speed infrared communication protocol such as IrSS (registered trademark; hereinafter referred to as "IrSS"). Such a portable device can obtain image data and then directly transmit the image data, by a short-distance wireless telecommunication, to operation target devices, e.g., various household AV equipment such as a television and a HDD recorder. With this technology, a user can operate the portable device to, for example, cause (i) a HDD recorder to store image data or (ii) a television to display image data.

Further, a user can now cause instruction information for operating an operation target device to be included in an EXIF region of image data in, for example, a JPEG (Joint Photographic Experts Group) format. The user can thus use the above image data as operation data for operating operation target devices. With this technology, the user can use the operation device as a remote control for each operation target device by transmitting the operation data from the operation device, e.g., a portable device, to the operation target devices.

Suppose that, for example, a user has transmitted, from a portable device to a television, operation data which includes, in an EXIF region, instruction information, i.e., a set of (i) a URL (uniform resource locator) and (ii) an instruction to access a website specified by the URL. In this case, the television, upon receipt of the operation data, displays content such as the website specified by the URL, in accordance with the instruction information. This indicates that with the above technologies, (i) a user can, by transmitting operation data from a portable device to a television, easily cause the television to display desired content, and (ii) it is thus possible to provide an operation system which has a high operability and a high convenience.

A use case is assumed here in which only a user provided with a predetermined authority is permitted to view content within the operation system. In this case, it is common to require a user to enter information necessary for authentication, such as a user ID and a password, on a login screen or the like so that the user can achieve authentication as an authorized user.

Patent Literature 1, for example, discloses a system in which a user can use various services on a video recorder via a network by remotely operating the video recorder with a mobile telephone. The system can impose a restriction on the use of services by requiring the user to use the mobile telephone for user authentication. More specifically, after the user has successfully completed the authentication with use of the mobile telephone, the system supplies a user account to the mobile telephone. The user then registers the user account in the video recorder with use of a remote control for the video recorder. As a result, the user can use the services on the video recorder.

Further, Patent Literature 2 discloses a technique in which authentication for a terminal device is carried out in a server. Specifically, to allow a user to use, on a terminal device, a network service provided over a first communication network, the technique disclosed includes the steps of (i) transmitting security information from a server to a portable electronic device via a second communication network which is different from the first communication network, (ii) transmitting the security information by a short-distance wireless telecommunication from the portable electronic device to the terminal device in response to a request from the terminal device, and (iii) carrying out authentication in the server on the basis of the security information transmitted from the terminal device. Patent Literature 2 further discloses that by (i) transmitting identification information of a terminal device from the terminal device to the server and (ii) determining in the server whether the terminal device is permitted to use a service, security information is transmitted to only a terminal device which is permitted to use a network service. Patent Literature 2 further discloses that damage due to a security information leak is prevented by (i) generating new security information each time the terminal device becomes permitted to use a network service and (ii) transmitting such new security information to the portable electronic device.

CITATION LIST

Patent Literature 1
Japanese Patent Application Publication, Tokukai, No. 2005-202536 A (Publication Date: Jul. 28, 2005)
Patent Literature 2
Japanese Patent Application Publication, Tokukai, No. 2004-086544 A (Publication Date: Mar. 18, 2004)
Patent Literature 3
Japanese Patent Application Publication, Tokukai, No. 2004-348236 A (Publication Date: Dec. 9, 2004)

SUMMARY OF INVENTION

A problem below has been caused in a case where the technique of Patent Literature 1 is employed for the above use case of the operation system.

According to the use case, the television, upon receipt of the operation data from the mobile telephone, transits to an operation of accepting entries of a user ID and a password by displaying a login screen or the like for checking the user's authority before displaying content. The user cannot view desired content at this stage. According to the technique of Patent Literature 1, the user needs to take the trouble to manually register information such as an account and a password, supplied to the mobile telephone, with use of the remote control for the television so as to view the content.

In other words, the problem is that a user, when viewing content on a television to which content access is restricted, is forced to carry out troublesome operations of (i) transmitting operation data to the television with use of a mobile telephone and then (ii) registering an account (password) with use of the mobile telephone as a remote control for the television. In addition, since such an account is made up of a string of symbols (letters and numbers), the account is difficult for the user to recognize, and the user may thus erroneously recognize or enter the account. The user needs to reenter the account each time such an error occurs. This also forces the user to carry out a troublesome operation. These troublesome operations impair the advantage (convenience), intended by the above operation system, of the capability to remotely operate an operation target device readily by simply transmitting operation data from a portable device to the operation target device.

Furthermore, according to the technique of Patent Literature 1, a user account is directly supplied to the mobile telephone and displayed on a display section of the mobile telephone. This indicates that the user account is not safely transmitted through a communication channel.

Further, a problem below has been caused in a case where the technique of Patent Literature 2 is employed for the above use case of the operation system.

According to the technique of Patent Literature 2, authentication is carried out by transmitting, to the terminal device, security information received in advance by a mobile telephone serving as the portable electronic device. However, since such security information is made up of a string of symbols (letters and numbers), it is difficult for the user, in a case where there are two or more items of security information, to recognize which services and accounts the respective items correspond to. As a result, the advantage (convenience) intended by the operation system is impaired.

In addition, to transmit security information from the portable electronic device to the terminal device, it is necessary that (i) the terminal device transmit a request to the portable electronic device and (ii) the portable electronic device transmit the security information to the terminal device. The technique of Patent Literature 2 thus cannot be employed in AV equipment having only a function of receiving a one-way communication based on, for example, IrSS. Furthermore, since it is the portable electronic device that identifies a terminal device to which security information can be transmitted, it is necessary to register the terminal device in the portable electronic device in advance. This forces the user to carry out a troublesome operation.

The present invention has been accomplished in view of the above problems. It is an object of the present invention to provide, for example, (i) a data providing device which is used, within an operation system in which a user operates an operation target device on an operation device with use of operation data for operating the operation target device, to provide operation data which allows authentication to be carried out without impairing convenience for a user, (ii) an operation device, (iii) a data processing device, and (iv) an operation system. It is another object of the present invention to provide, for example, a data providing device, an operation device, a data processing device, and an operation system, each of which allows authentication for the system to be carried out without impairing security and convenience for a user.

In order to solve the above problem, a data providing device of the present invention is a data providing device for providing operation data, including processing specifying information which specifies processing to be carried out, to an operation device which transmits the operation data to a data processing device which carries out the processing in accordance with the operation data, the data providing device including: authentication information generating means for generating, for each of operation devices, authentication information for use in authentication processing to be carried out by the data providing device in a case where the data providing device is accessed by the data processing device; operation data generating means for generating operation data including (i) the authentication information generated by the authentication information generating means and (ii) processing specifying information which specifies the authentication processing; and operation data transmitting means for transmitting the operation data, generated by the operation data generating means, to the operation device.

With the above arrangement, the data providing device can (i) generate, for each operation device, authentication information for use in authentication processing carried out by the data providing device in the case where the data providing device is accessed by the data processing device, (ii) generate operation data including the authentication information generated and processing specifying information which specifies the authentication processing, and (iii) transmit the operation data generated to the operation device.

As such, after the operation device receives the operation data generated as above and then transmits the operation data thus received to the data processing device, the data processing device can, upon receipt of the operation data, carry out the authentication processing, carried out when the data processing device accesses the data providing device, on the basis of the authentication information included in the operation data. As a result, a user of the operation device who operates the data processing device has no need to directly enter the authentication information, and is simply required to transmit the operation data, generated as above, to the data processing device.

The user of the operation device thus has no need to carry out a troublesome operation of directly entering authentication information, and is instead merely required to carry out a simple operation of receiving and transmitting operation data. As such, it is possible to carry out authentication processing, carried out when the data processing device accesses the data providing device, without impairing convenience for the user.

An operation device of the present invention is an operation device for transmitting operation data to a data processing device, which operation data (i) includes processing specifying information which specifies first processing to be carried out and (ii) is provided by a data providing device which generates authentication information for use in authentication processing carried out in a case where the data providing device is accessed by the data processing device which carries out the first processing in accordance with the operation data, the operation device including: operation data receiving means for receiving, from the data providing device, operation data including (i) the authentication information generated by the data providing device and (ii) processing specifying information which specifies the authentication processing; and operation data transmitting means for transmitting the operation data, received by the operation data receiving means, to the data processing device.

The above arrangement allows the operation device to (i) receive, from the data providing device which generates authentication information, operation data including the authentication information generated and processing specifying information which specifies the authentication processing, and (ii) transmit the operation data thus received to the data processing device.

As such, after the operation device transmits the operation data received as above to the data processing device, the data processing device can, upon receipt of the operation data, cause the data providing device to carry out authentication processing on the basis of the authentication information included in the operation data. In other words, the user of the operation device has no need to directly enter the authentication information, and is merely required to carry out a simple operation of transmitting the operation data received as above to the data processing device.

As a result, the user can advantageously carry out a simple operation of receiving and transmitting operation data to carry out the authentication processing, carried out when the data processing device accesses the data providing device, without impairing convenience for the user.

A data processing device of the present invention is a data processing device for carrying out processing in accordance with operation data including processing specifying information which specifies the processing to be carried out, the operation data being provided to an operation device from a data providing device which generates authentication information for use in authentication processing carried out in a case where the data providing device is accessed by the data processing device, the data processing device including: operation data receiving means for receiving, from the operation device, operation data including (i) the authentication information and (ii) processing specifying information which specifies the authentication processing; authentication information extracting means for extracting the authentication information from the operation data received by the operation data receiving means; and authentication information transmitting means for transmitting the authentication information, extracted by the authentication information extracting means, to the data providing device.

The above arrangement allows the data processing device to (i) receive, from the operation device, operation data including the authentication information processing specifying information which specifies the authentication processing, (ii) extracts the authentication information from the operation data thus received, and (iii) transmit the authentication information thus extracted to the data providing device.

As such, after receiving the operation data from the operation device, the data processing device can transmit the authentication information, included in the operation data, to the data providing device so as to cause the data providing device to carry out the authentication processing. A user of the operation device who operates the data processing device thus has no need to directly enter the authentication information, and is merely required to carry out a simple operation of transmitting the operation data generated as above to the data processing device in order to cause the data providing device to carry out the authentication processing.

The user of the operation device thus has no need to carry out a troublesome operation of directly entering authentication information, and is instead merely required to carry out a simple operation of receiving and transmitting operation data. As such, it is possible to carry out authentication processing, carried out when the data processing device accesses the data providing device, without impairing convenience for the user.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a block diagram illustrating an essential configuration of each of an operation device, a display processing device, and a service providing device, all included in an operation system in accordance with an first embodiment of the present invention.

FIG. 2 is a block diagram illustrating a general arrangement of the operation system in accordance with the first embodiment of the present invention.

FIG. 3 is a view schematically illustrating a data structure of operation image data used in the operation system in accordance with the first embodiment of the present invention.

FIG. 4 is a view schematically illustrating a data structure of operation image data used in the operation system in accordance with the first embodiment of the present invention.

FIG. 5 is a view schematically illustrating a data structure of operation image data used in the operation system in accordance with the first embodiment of the present invention.

FIG. 6 is a view schematically illustrating a data structure of operation image data used in the operation system in accordance with the first embodiment of the present invention.

FIG. 7 is a view schematically illustrating a data structure of operation image data used in the operation system in accordance with the first embodiment of the present invention.

FIG. 8 is a block diagram illustrating an essential configuration of each device constituting the operation system in accordance with the first embodiment of the present invention.

FIG. 9 is a view illustrating a processing procedure for accessing a website, provided by the service providing device, within the operation system in accordance with the first embodiment of the present invention.

FIG. 10 is a view illustrating a processing procedure for achieving authentication (login) for a website by transmitting, to the display processing device, image data obtained from the service providing device, within the operation system in accordance with the first embodiment of the present invention.

FIG. 11 is a view illustrating a processing procedure for achieving authentication (login) for a website simultaneously with access to the website by transmitting, to the display processing device, authentication information-attached site access image data obtained from the service providing device, within the operation system in accordance with the first embodiment of the present invention.

FIG. 12 is a view illustrating a processing procedure for achieving authentication (purchase) necessary for content purchase processing by transmitting, to the display processing device, purchase image data obtained from the service providing device, within the operation system in accordance with the first embodiment of the present invention.

FIG. 13 is a view illustrating a processing procedure for achieving authentication (login) for a website by transmitting, to the display processing device, image data obtained by the operation device in advance from the service providing device, within the operation system in accordance with the first embodiment of the present invention.

FIG. 14 is a view illustrating a processing procedure for achieving authentication (login) for a website by transmitting, to the display processing device, image data obtained by the operation device from the service providing device in response to a request from the display processing device, within the operation system in accordance with the first embodiment of the present invention.

FIG. 15 is a flowchart illustrating processing carried out by each device in a case where a user accesses a website which does not require authentication (login), within the operation system in accordance with the first embodiment of the present invention.

FIG. 16 is a view schematically illustrating how a list of services which a user can select is displayed as a menu on a display section of the operation device in accordance with the first embodiment of the present invention.

FIG. 17 is a view schematically illustrating how an image of an outline of a service is displayed on a display section of the operation device in accordance with the first embodiment of the present invention.

FIG. 18 is a flowchart illustrating processing carried out by each device in a case where a user first accesses a website which requires authentication (login), within the operation system in accordance with the first embodiment of the present invention.

FIG. 19 is a flowchart illustrating a procedure for (i) login authentication request processing carried out by the operation device in accordance with the first embodiment of the present invention, and (ii) authentication image data generating processing carried out by the service providing device in accordance with the first embodiment of the present invention.

FIG. 20 is a view schematically illustrating how an image is displayed, on the basis of image information included in authentication image data, on a display section of the operation device in accordance with the first embodiment of the present invention.

FIG. 21 is a flowchart illustrating processing carried out by each device in a case where a user, after accessing a website which requires authentication (login), accesses the website again within a period during which authentication based on a one-time password is valid, within the operation system in accordance with the first embodiment of the present invention.

FIG. 22 is a block diagram illustrating an essential configuration of each of an operation device, a display processing device, and a service providing device, all included in an operation system in accordance with a second embodiment of the present invention.

FIG. 23 is a flowchart illustrating processing carried out by each device in a case where a user accesses a website provided by the service providing device in accordance with the second embodiment of the present invention which service providing device provides a single item of authentication information-attached site access image data.

FIG. 24 is a flowchart illustrating processing carried out by each device in a case where a user accesses a website provided by the service providing device in accordance with the second embodiment of the present invention which service providing device provides authentication image data and two items of site access image data.

FIG. 25 is a block diagram illustrating an essential configuration of each of an operation device, a display processing device, and a service providing device, all included in an operation system in accordance with a third embodiment of the present invention.

FIG. 26 is a flowchart illustrating a procedure for processing carried out by each device in a case where authentication for a content purchase is carried out in the service providing device by transmitting purchase image data from the operation device to the display processing device, within the operation system in accordance with the third embodiment of the present invention.

FIG. 27 is a block diagram illustrating an essential configuration of each of an operation device, a display processing device, and a service providing device, all included in an operation system in accordance with a fourth embodiment of the present invention.

FIG. 28 is a flowchart illustrating a procedure for processing of obtaining user identification image data within the operation system in accordance with the fourth embodiment of the present invention.

FIG. 29 is a flowchart illustrating a procedure for processing of accessing, with use of the user identification image data, a website which requires authentication (login) within the operation system in accordance with the fourth embodiment of the present invention.

FIG. 30 is a block diagram illustrating an essential configuration of each of an operation device, a display processing device, and a service providing device, all included in an operation system in accordance with a fifth embodiment of the present invention.

FIG. 31 is a flowchart illustrating a procedure for processing of obtaining authentication image data within the operation system in accordance with the fifth embodiment of the present invention.

FIG. 32 is a flowchart illustrating a procedure for processing of accessing, with use of the authentication image data, a website which requires authentication (login) within the operation system in accordance with the fourth embodiment of the present invention.

FIG. 33 is a flowchart illustrating a procedure for terminal registration processing and user information registration/update processing carried out with use of an operation device and a service providing device in accordance with any of the above embodiments of the present invention.

FIG. 34 is a view schematically illustrating how image data generated in correspondence with a user is displayed on a display section of the operation device in accordance with any of the above embodiments of the present invention.

FIG. 35 is a view schematically illustrating how other image data generated in correspondence with the user is displayed on the display section of the operation device in accordance with any of the above embodiments of the present invention.

FIG. 36 is a view schematically illustrating how still other image data generated in correspondence with the user is displayed on the display section of the operation device in accordance with any of the above embodiments of the present invention.

DESCRIPTION OF EMBODIMENTS

In embodiments below, image data is used as an example of operation data received by a data processing device from an operation device. Although such image data as an example has a normal format such as a JPEG format, it is assumed that the image data has a data structure in which it is possible to include a processing specifying information item 5, which specifies, for example, (i) processing to be carried out by the data processing device, data to be processed. In the embodiments, image data including such a processing specifying information item 5 is also specifically referred to as "operation image data 3." The data structure of operation image data 3 and the processing specifying information item 5 will be described later in detail.

In the embodiments, a display processing device which receives image data as the operation data and which displays various data in accordance with the image data is used as an example of the data processing device.

[General Arrangement of System]

Figure 2:
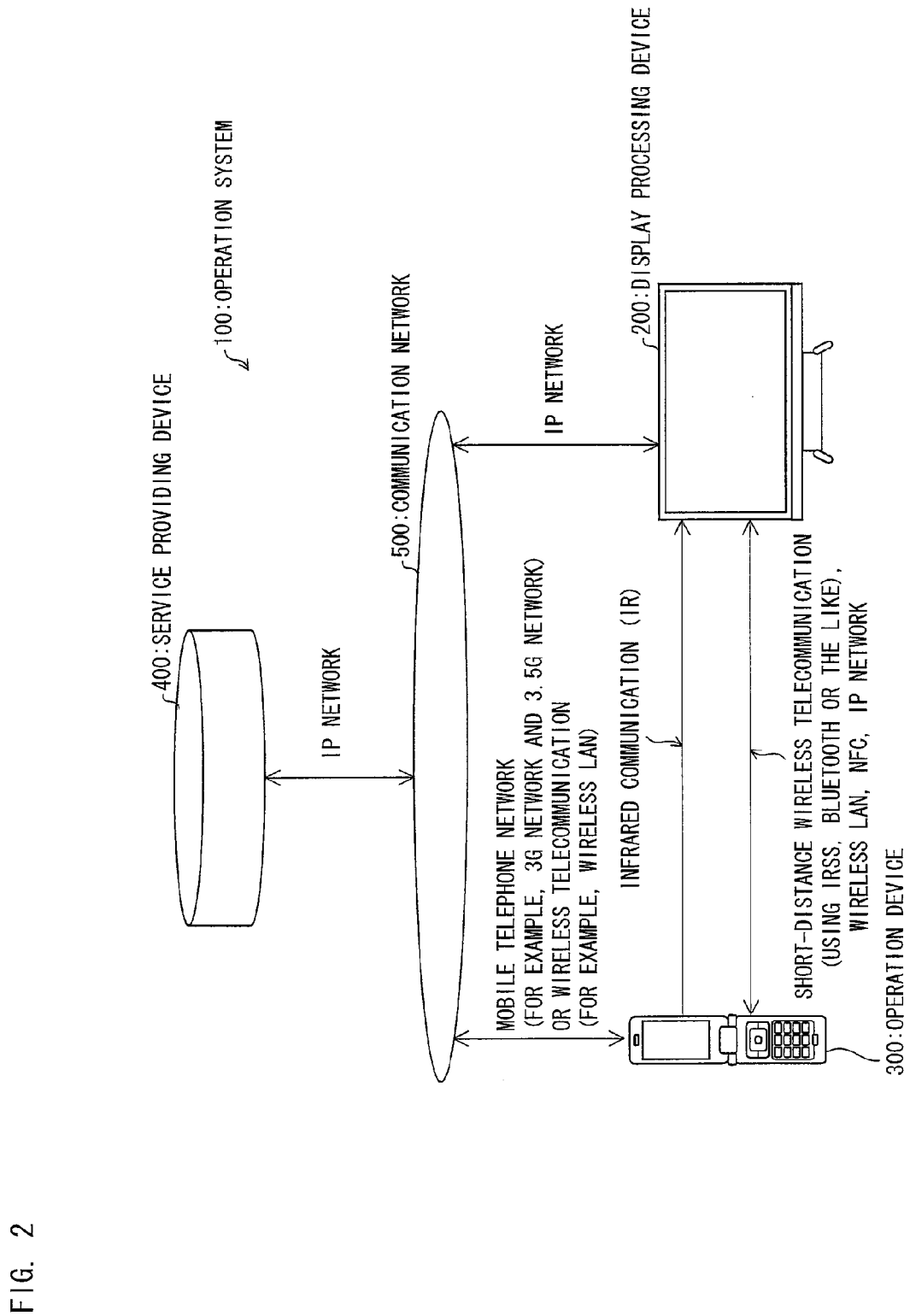
FIG. 2

With reference to FIG. 2, the following description deals with a general arrangement of an operation system 100 according to each of the embodiments. FIG. 2 is a block diagram illustrating the general arrangement of the operation system 100. As illustrated in FIG. 2, the operation system 100 includes at least: a display processing device (data processing device) 200; an operation device 300; and a service providing device (data providing device) 400. The operation system 100 is a system in which, in response to an operation of the display processing device 200 by a user with use of the operation device 300, it is possible to (i) obtain, via a communication network 500, various data (that is, content such as a web page) provided by the service providing device 400 as a service and (ii) allow such various data to be, for example, viewed with use of the display processing device 200.

The display processing device 200 is a device which is owned by the user of the operation system 100 and which carries out various processing in accordance with image data transmitted from the operation device 300. The display processing device 200 is thus arranged to be capable of receiving image data transmitted from the operation device 300. In a case where such image data thus received includes a processing specifying information item 5, the display processing device 200 can (i) extract the processing specifying information item 5 included in the image data received and (ii) carry out processing (for example, access to a website) according to the processing specifying information item 5 thus extracted.

The operation device 300 is a device which is owned by the user of the operation system 100 and which is used to operate the display processing device 200. The operation device 300 is thus arranged to be capable of transmitting image data to the display processing device 200 in response to an operation by the user as a trigger.

The service providing device 400 is a server which provides various services for the user of the operation system 100 and which is owned by a service providing company, for example. The service providing device 400 provides various data (that is, content such as a web page) in response to a request from, for example, the display processing device 200.

Further, the service providing device 400 provides, for the operation device 300, operation image data 3 which includes, embedded therein as a processing specifying information item 5, (i) authentication information (one-time password; hereinafter referred to also as "one-time PW") or (ii) user identification information (for example, user ID), both of which are used in authentication processing carried out when the user logs in the operation system 100 and when the user purchases content provided by the service providing device 400. This is a feature of the present invention and will be described later in detail.

In the embodiments below, it is assumed that the operation device 300 is a mobile telephone, the display processing device 200 is a television receiver, and the service providing device 400 is a service providing server which provides content such as a web page.

In the embodiments below, it is assumed that the operation device 300 is connected to the communication network 500 via, for example, a mobile telephone network (e.g., a 3G network or a 3.5G network) or a wireless telecommunication network (e.g., a wireless LAN). It is also assumed that each of the display processing device 200 and the service providing device 400 is connected to the communication network 500 via an IP (internet protocol) network. It is further assumed that the operation device 300 and the display processing device 200 communicate with each other by (i) an infrared communication (IR), (ii) a short-distance wireless telecommunication which complies with, for example, IrSS, Bluetooth (registered trademark; hereinafter referred to simply as "Bluetooth"), or NFC (near field communication) or which involves a wireless LAN, or (iii) an IP network communication.

Note that the operation device 300 is not limited to the above example, provided that it is possible to operate the display processing device 200. The operation device 300 can, for example, be a PDA (personal digital assistance), a PHS (personal handy-phone system), notebook-type personal computer, a portable game device, etc. Further, the display processing device 200 is simply required to be capable of operating under control by receiving an operation signal transmitted from the operation device 300. The display processing device 200 can, for example, be a personal computer, a video recorder, a music player, etc.

The above various data provided by the service providing device 400 can be text data, audio data, image data, video data, an application, or a combination of any of the above data. Further, the various data is not limited to data having a particular format.

(Operation Image Data 3)

The following description outlines the data structure of operation image data 3 with reference to FIGS. 3 through 7. FIGS. 3 through 7 are each a schematic view illustrating an outline of the data structure of operation image data 3. As illustrated in FIGS. 3 through 7, the operation image data 3 is generally JPEG image data including an image region 610 and an EXIF region 620.

The image region 610 is a region in which a compressed image of a photograph or the like is stored. The EXIF region 620 is, in contrast, a region in which mainly metadata or the like of image information stored in the image region 610 is stored. The EXIF region 620 includes a maker note region 621. The maker note region 621 is a region which (i) has specifications that can be set freely by a service providing company carrying out a service of delivering operation image data 3 and (ii) can thus be used by the service providing company. It is possible to store one or more processing specifying information items 5 in the maker note region 621. In an example illustrated in FIG. 3, a single processing specifying information item 5 (processing specifying information item 5A) is stored. In an example illustrated in FIG. 5, two processing specifying information items 5 (processing specifying information items 5A and 5B) are stored. Note that it is not particularly limited where in the maker note region 621 a processing specifying information item 5 is stored.

Note that it is possible to store in the image region 610 an image indicative of processing specified in a processing specifying information item 5 stored in the maker note region 621. With the arrangement, by displaying operation image data 3 in a display section of the operation device 300, the user can easily recognize what processing is to be carried out in a case where the operation image data 3 is transmitted to the display processing device 200.

In the description below, image information stored in the image region 610 of operation image data 3 is referred to also as image information included in the operation image data 3.

Operability for the user is preferably improved by causing the image, stored in the image region 610 when a service providing company provides operation image data 3 for users, to be not identical for all the users but different depending on each individual user. Examples of the image which is different depending on each individual user encompass (i) an image of the user name or an image (avatar) representative of the user, (ii) an image of the name of a service which the user can log in, or an icon with which such a service can be identified, and (iii) an image indicative of an operation currently available for the user.

(Processing Specifying Information Item 5)

A processing specifying information item 5 includes a combination of (i) a command name 6, which is the name of a command specifying processing to be carried out by the display processing device 200, and (ii) a parameter 7, which specifies, for example, a parameter of the command and data to be processed. Depending on the command, the parameter 7 does not need to be specified or a plurality of parameters can be specified. The command name 6 can be replaced by a code with which the command is identifiable. It is assumed herein that the command name 6 and the parameter 7 are written with use of, for example, predetermined tags so as to be identifiable.

Figure 3:
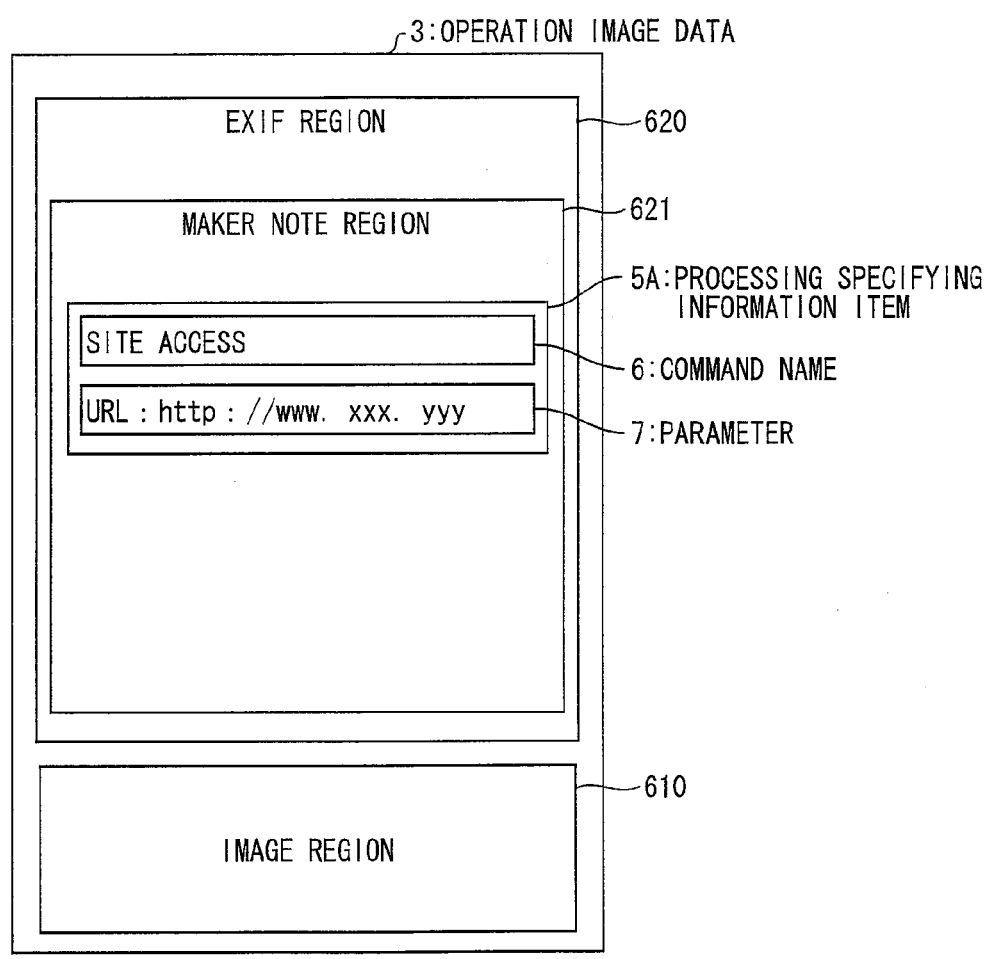
FIG. 3

An example of the operation image data 3 illustrated in FIG. 3 includes a processing specifying information item 5A. The processing specifying information item 5A includes a command name 6 of "SITE ACCESS" and a parameter 7 of "URL:http://www.xxx.yyy". The processing specifying information item 5A serves as an instruction to (i) access a website indicated by a URL specified in the parameter 7 and (ii) obtain a corresponding web page. In the embodiments below, operation image data 3, such as the example illustrated in FIG. 3, which includes a processing specifying information item whose command name 6 is "SITE ACCESS" and whose parameter 7 specifies a URL is specifically referred to also as "SITE ACCESS image data 3A."

Figure 4:
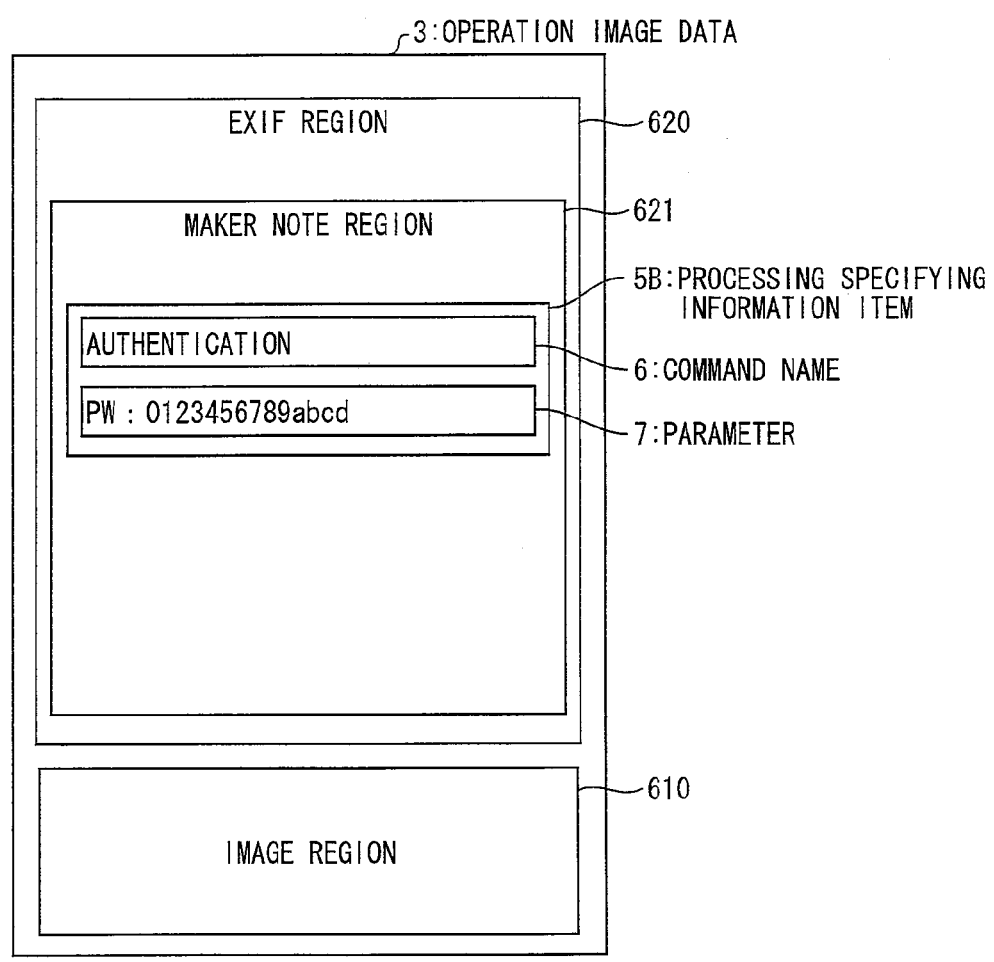
FIG. 4
Figure 5:
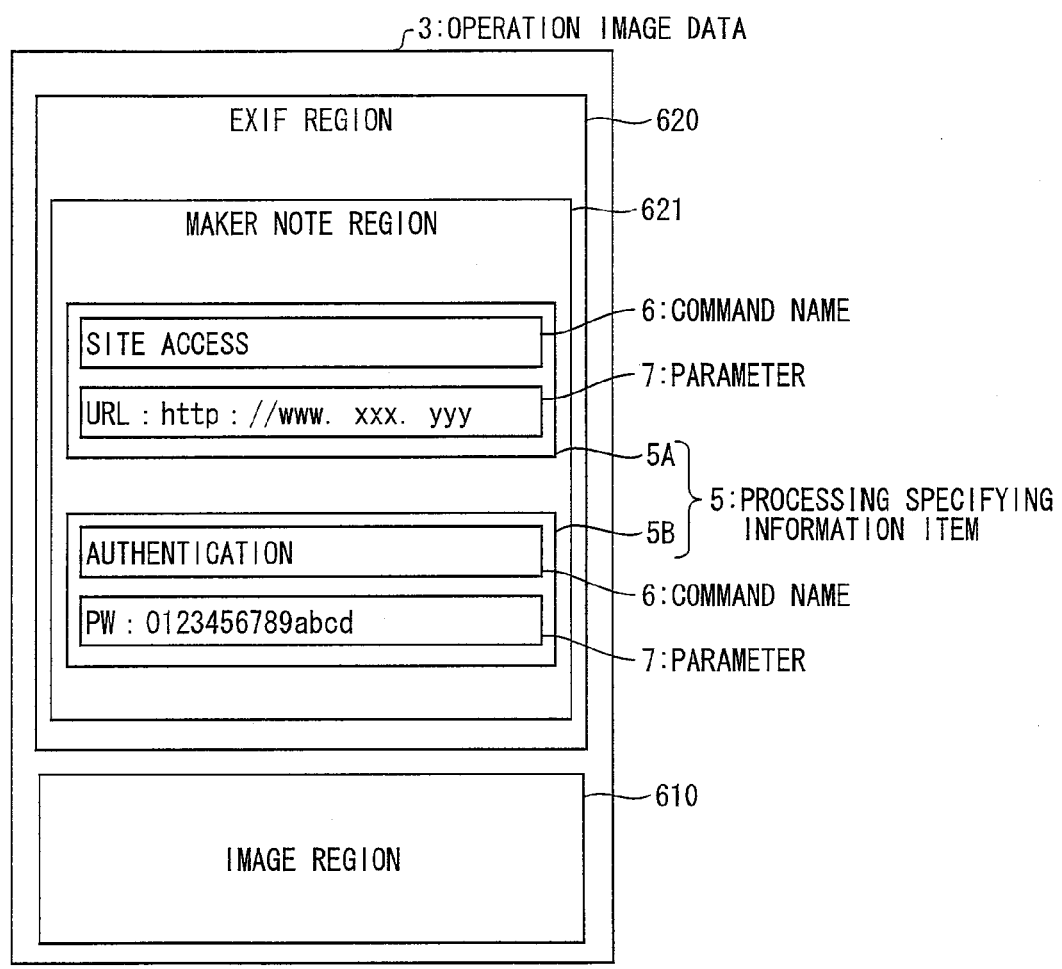
FIG. 5

An example of the operation image data 3 illustrated in FIG. 4 includes a processing specifying information item 5B. The processing specifying information item 5B includes a command name 6 of "AUTHENTICATION" and a parameter 7 of "PW:0123456789abcd". The processing specifying information item 5B serves as an instruction to carry out authentication (login) processing with reference to a password (hereinafter referred to also as "PW") specified in the parameter 7. In the embodiments below, operation image data 3, such as the example illustrated in FIG. 4, which includes a processing specifying information item whose command name 6 is "AUTHENTICATION" and whose parameter 7 specifies a password is specifically referred to also as "authentication image data 3B."

As described above, a plurality of processing specifying information items 5 can also be stored in the maker note region 621. An example of the operation image data 3 illustrated in FIG. 5 includes two processing specifying information items, namely a processing specifying information item 5A and a processing specifying information item 5B. In the embodiments below, operation image data 3, such as the example illustrated in FIG. 5, which includes (i) a processing specifying information item whose command name 6 is "SITE ACCESS" and (ii) a processing specifying information item whose command name 6 is "AUTHENTICATION" is specifically referred to also as "authentication information-attached site access image data 3C."

Figure 6:
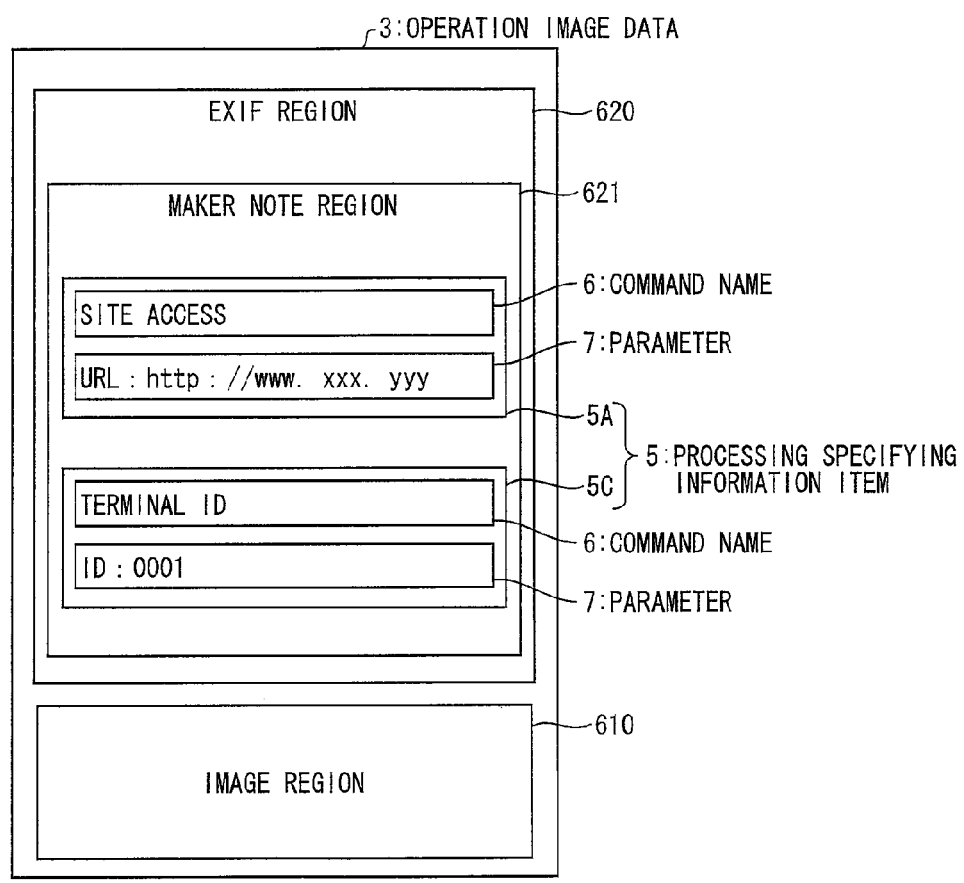
FIG. 6

An example of the operation image data 3 illustrated in FIG. 6 includes two processing specifying information items, namely a processing specifying information item 5A and a processing specifying information item 5C. The processing specifying information item 5C includes a command name 6 of "TERMINAL ID" and a parameter 7 of "ID:0001". The processing specifying information item 5C indicates that the terminal ID specified in the parameter 7 has been transmitted.

Figure 7:
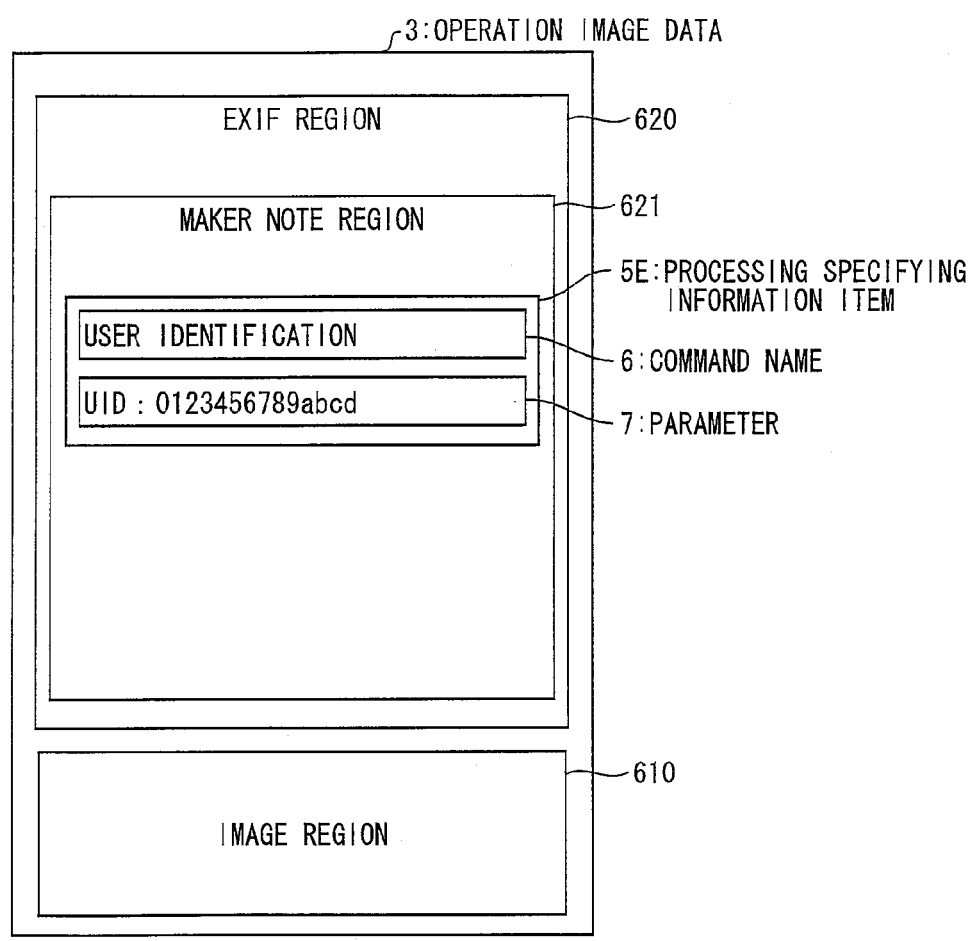
FIG. 7

An example of the operation image data 3 illustrated in FIG. 7 includes a processing specifying information item 5E. The processing specifying information item 5E includes a command name 6 of "USER IDENTIFICATION" and a parameter 7 of "UID (user ID): 0123456789abcd". The processing specifying information item 5E serves as an instruction to carry out authentication (login) processing with reference to the user ID which is specified in the parameter 7 and which serves as user identification information. In the embodiments below, operation image data 3, such as the example illustrated in FIG. 7, which includes a processing specifying information item whose command name 6 is "USER IDENTIFICATION" and whose parameter 7 specifies user identification information is specifically referred to also as "user identification image data 3E."

[Essential Configuration of System]

Figure 8:
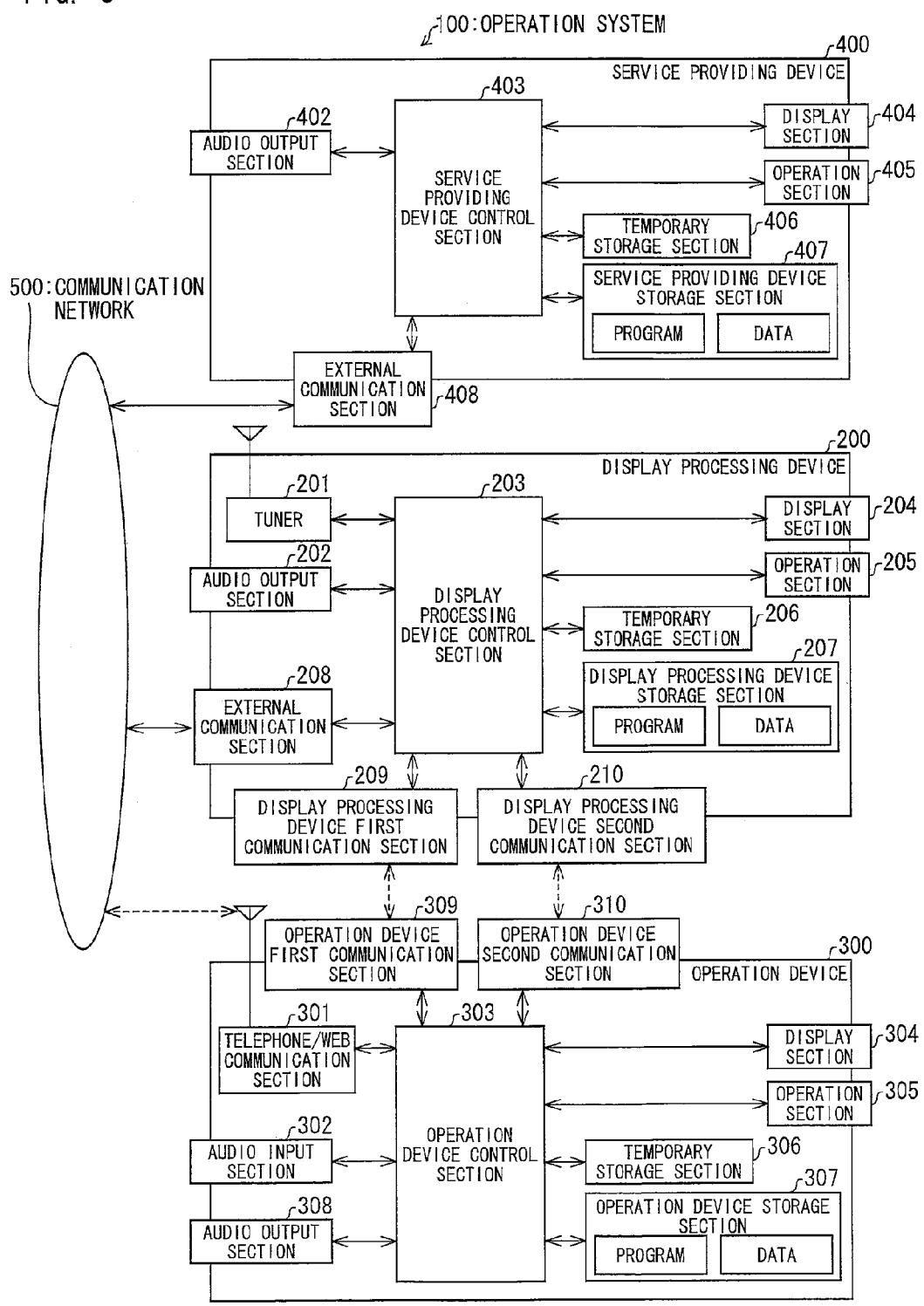
FIG. 8

With reference to FIG. 8, the following description deals with an essential configuration of each constituent device of the operation system 100. FIG. 8 is a block diagram illustrating an essential configuration of the devices constituting the operation system 100.

(Configuration of Display Processing Device)

As illustrated in FIG. 8, the display processing device 200 includes: a tuner 201; an audio output section 202; a display processing device control section 203; a display section 204; an operation section 205; a temporary storage section 206; a display processing device storage section 207; an external communication section 208; a display processing device first communication section 209; and a display processing device second communication section 210.

The tuner 201 selectively receives a broadcast wave of a channel specified by the display processing device control section 203, and converts the broadcast wave into a predetermined signal for output. The display processing device 200 carries out processing such as decoding with respect to the signal so as to output, for example, video and audio which are broadcast through the channel. Note that the tuner 201 is simply required to have a function of receiving a broadcast wave and converting such a received broadcast wave into a predetermined signal. As such, a conventional, general tuner such as a digital terrestrial tuner, a BS tuner, or a CS tuner can also be used according to need.

The audio output section 202 outputs audio to the outside of the display processing device 200 on the basis of the output from the tuner 201 and an instruction from the display processing device control section 203. The audio output section 202 can be constituted by a loudspeaker, for example.

The display processing device control section 203 centrally controls operation of the display processing device 200, and can be constituted by a CPU (central processing unit), for example. The display processing device control section 203 operates as it uses, as a work area, the temporary storage section 206, which is constituted by a RAM (random access memory), for example. Processing carried out by the display processing device control section 203 will be described later in detail.

The display section 204 is a display device which displays video on the basis of the output from the tuner 201 and an instruction from the display processing device control section 203. The display section 204 can be constituted by, for example, a LC (liquid crystal) display panel, an EL (electroluminescence) display panel, or a CRT (cathode-ray tube) display device. Components (not shown) such as a VDP (video display processor) and a VRAM (video RAM), which are necessary to display an image, are provided as appropriate between the display processing device control section 203 and the display section 204.

Note that the display section 204 is not necessarily required to be included in the display processing device 200, and can also be an external device connected to the display processing device 200 via a cable. In this case, the display section 204 as an external device is connected to the display processing device 200 via a cable for image transmission, such as a D terminal cable, a HDMI (high definition multimedia interface) cable, an iLink cable, or a DVI (digital visual interface) cable, and displays an output from the display processing device 200.

The operation section 205 is a section through which a user can make an entry with respect to the display processing device 200. The operation section 205 is not particularly limited to a specific one, provided that the user can make a desired entry. It is assumed herein that the operation section 205 includes operation keys for various entry operations. Specifically, it is assumed that the operation section 205 includes operation keys for respective entry operations such as switching of channels, increasing and decreasing of the volume, and switching on/off for a power supply of the display processing device 200.

The display processing device storage section 207 stores programs and data as illustrated in FIG. 8. The display processing device 200 carries out a predetermined operation by causing the display processing device control section 203 to (i) read a program stored in the display processing device storage section 207 to the temporary storage section 206 and (ii) execute the program.

Each of the external communication section 208, the display processing device first communication section 209, and the display processing device second communication section 210 is provided so that the display processing device 200 can communicate with external equipment. The external communication section 208 is arranged to be connectable to a communication network 500 such as a public communication line. Components (not shown) such as a LAN (local area network) and a router, which are necessary to carry out communication, are provided as appropriate between the external communication section 208 and the communication network 500.

The display processing device first communication section 209 and the display processing device second communication section 210 are arranged to be capable of communicating with an operation device first communication section 309 and an operation device second communication section 310 of the operation device 300, respectively. The display processing device first communication section 209 and the display processing device second communication section 210 will be described later in detail.

Since it is assumed that the display processing device 200 is a television receiver as described above, it is also assumed that the display processing device 200 includes, other than the above functions, functions (for example, channel switching, volume adjustment, and screen brightness adjustment) which are normally included in a television receiver.

(Configuration of Operation Device)

As illustrated in FIG. 8, the operation device 300 includes: a telephone/web communication section 301; an audio input section 302; an operation device control section 303; a display section 304; an operation section 305; a temporary storage section 306; an operation device storage section 307; an audio output section 308; an operation device first communication section 309; and an operation device second communication section 310.

The telephone/web communication section 301 carries out, via a mobile telephone network such as a 3G network or a 3.5G network, (i) telephone communication with another mobile telephone or a fixed-line telephone and (ii) communication with an external device (in this case, the service providing device 400) by connecting to the Internet. The telephone/web communication section 301 is thus arranged to be connectable to the communication network 500. Note that the above functions are carried out with use of a telephone network communication section (not shown) and a mobile telephone line section (not shown).

The audio input section 302 serves to, for example, input an audio signal to the operation device 300 during a telephone conversation or the like. The audio output section 308 serves to output audio during a telephone conversation or the like on the basis of, for example, an audio signal received by the telephone/web communication section 301. The audio output section 308 further outputs audio or the like indicative of an incoming of, for example, a telephone call or an electronic mail.

The operation device control section 303 centrally controls operation of the operation device 300, and can be constituted by a CPU, for example. The operation device control section 303 operates as it uses, as a work area, the temporary storage section 306, which is constituted by a RAM, for example. Processing carried out by the operation device control section 303 will be described later in detail.

The display section 304 displays an image in accordance with an instruction from the operation device control section 303. Components (not shown) such as a VDP and a VRAM, which are necessary to display an image, are provided as appropriate between the operation device control section 303 and the display section 304. The display section 304 can be constituted by, for example, a LC display panel or an EL display panel.

The operation section 305 allows a user of the operation device 300 to carry out an entry operation with respect to the operation device 300. The operation section 305 is thus not particularly limited, provided that the user can carry out a desired entry operation. It is assumed herein that the operation section 305 is an operation key section provided on a surface of a main body of the operation device 300.

Specifically, it is assumed that the operation key section includes a plurality of operation keys such as (i) various menu keys for causing, for example, a menu screen for a website connection to be displayed on the display section 304, (ii) direction keys, i.e., an up key, a down key, a left key, and a right key, for selecting an item displayed on the display section 304, (iii) an enter key for entering an item selected, and (iv) character entry keys for entering, for example, numbers and letters.

The operation device storage section 307 stores programs and data as illustrated in FIG. 8. The operation device 300 carries out a predetermined operation by causing the operation device control section 303 to (i) read a program stored in the operation device storage section 307 to the temporary storage section 306 and (ii) execute the program. The operation device storage section 307 further stores data such as (i) HTML data received by the telephone/web communication section 301 and (ii) data entered by the user of the operation device 300.

The operation device first communication section 309 and the operation device second communication section 310 are provided so that the operation device 300 can communicate with external equipment. The operation device first communication section 309 and the operation device second communication section 310 are arranged so as to be capable of communicating with the display processing device first communication section 209 and the display processing device second communication section 210 of the display processing device 200, respectively. The operation device first communication section 309 and the operation device second communication section 310 will be described later in detail.

(Configuration of Service Providing Device)

As illustrated in FIG. 8, the service providing device 400 includes: an audio output section 402; a service providing device control section 403; a display section 404; an operation section 405; a temporary storage section 406; a service providing device storage section 407; and an external communication section 408.

The audio output section 402 outputs audio to the outside of the service providing device 400 on the basis of an instruction from the service providing device control section 403. The audio output section 402 can be constituted by a loudspeaker, for example.

The service providing device control section 403 centrally controls operation of the service providing device 400, and can be constituted by a CPU, for example. The service providing device control section 403 operates as it uses, as a work area, the temporary storage section 406, which is constituted by a RAM, for example. Processing carried out by the service providing device control section 403 will be described later in detail.

The display section 404 is a display device which displays, for example, a service setting screen on the basis of an instruction from the service providing device control section 403. The display section 404 can be constituted by, for example, a LC display panel, an EL display panel, or a CRT display device.

The operation section 405 allows a user to carry out an entry operation with respect to the service providing device 400. The operation section 405 is thus not particularly limited, provided that the user can carry out a desired entry operation. It is assumed herein that the operation section 405 is a keyboard for carrying out a complex operation of, for example, (i) setting various services to be provided by the service providing device 400 and (ii) maintaining content.

The service providing device storage section 407 stores programs and data as illustrated in FIG. 8. The service providing device 400 carries out a predetermined operation by causing the service providing device control section 403 to (i) read a program stored in the service providing device storage section 407 to the temporary storage section 406 and (ii) execute the program.

The external communication section 408 is provided so that the service providing device 400 can communicate with external equipment (in this case, the display processing device 200 and the operation device 300). The external communication section 408 is arranged to be connectable to the communication network 500. Components (not shown) such as a LAN and a router, which are necessary to carry out communication, are provided as appropriate between the external communication section 408 and the communication network 500.

(Communication Between Display Processing Device 200 and Operation Device 300)

As described above, the operation device first communication section 309 is arranged so as to be capable of communicating with the display processing device first communication section 209, whereas the operation device second communication section 310 is arranged so as to be capable of communicating with the display processing device second communication section 210. In other words, the operation device 300 and the display processing device 200 can communicate with each other via (i) a first communication pathway formed by the operation device first communication section 309 and the display processing device first communication section 209, and (ii) a second communication pathway formed by the operation device second communication section 310 and the display processing device second communication section 210.

The first communication pathway is used to transmit a signal (hereinafter referred to also as "remote control signal") from the operation device 300 for instructing the display processing device 200 to carry out an operation. It is assumed herein that the first communication pathway is a pathway of infrared communication (IR). It is thus assumed that the operation device first communication section 309 and the display processing device first communication section 209 are an infrared emitting section and an infrared receiving section, respectively.

The second communication pathway is used to transmit and receive image data between the operation device 300 and the display processing device 200. It is assumed herein that the second communication pathway is a pathway of short-distance wireless telecommunication using IrSS, Bluetooth or the like. In other words, each of the operation device second communication section 310 and the display processing device second communication section 210 is a communication section which can transmit and receive a signal by a short-distance wireless telecommunication. Note that the second communication pathway is simply required to allow data to be transmitted and received, and can also be a wireless LAN such as IEEE802.11 wireless and ZigBee (registered trademark).

(Communication Between Display Processing Device 200 and Service Providing Device 400)

As described above, the external communication section 208 of the display processing device 200 is arranged so as to be capable of communicating with the communication network 500, and the external communication section 408 of the service providing device 400 is also arranged so as to be capable of communicating with the communication network 500. In other words, the display processing device 200 and the service providing device 400 can communicate with each other via a communication pathway formed through the communication network 500. It is assumed herein that each of the display processing device 200 and the service providing device 400 is connected to the communication network 500 via, for example, an IP network.

(Communication Between Operation Device 300 and Service Providing Device 400)

As described above, the telephone/web communication section 301 of the operation device 300 is arranged so as to be capable of communicating with the communication network 500. This indicates that the operation device 300 and the service providing device 400 can communicate with each other via a communication pathway formed through the communication network 500. It is assumed herein that the operation device 300 is connected to the communication network 500 via, for example, a mobile telephone network such as a 3G network or a 3.5G network.

[Point of Invention]

As described above, it is assumed that the operation system 100 is a system in which, when a user operates the display processing device 200 with use of the operation device 300, it is possible, for example, to (i) access the service providing device 400 so as to obtain various data (that is, content such as a web page) provided by the service providing device 400 as a service, and (ii) view such various data with use of the display processing device 200. As described in the Background Art section, since a service provided in the operation system 100 may require authentication (login), a normal method of entering an ID and a password may impair operability and convenience for the user.

In view of the circumstances, a main feature of the present invention is that authentication (login) for use of a service provided by the service providing device 400 simply requires the user operating the display processing device 200 with use of the operation device 300 to transmit, to the display processing device 200, operation image data 3 which includes information for use in the authentication (login) and which has been obtained from the service providing device 400. Note that although it is assumed herein that the information for use in the authentication (login) is a password and/or user identification information, the information for use in the authentication is not limited to this.

The following description deals with five example cases in each of which operation image data 3 including information which is used in the authentication (login) and which has been obtained from the service providing device 400 is transmitted to the display processing device 200. In the example cases, the service provided by the service providing device 400 is a website which provides a predetermined web page. Further, each of the example cases describes an outline of processing. Details of such processing will be described later.

Example 1

Figure 9:
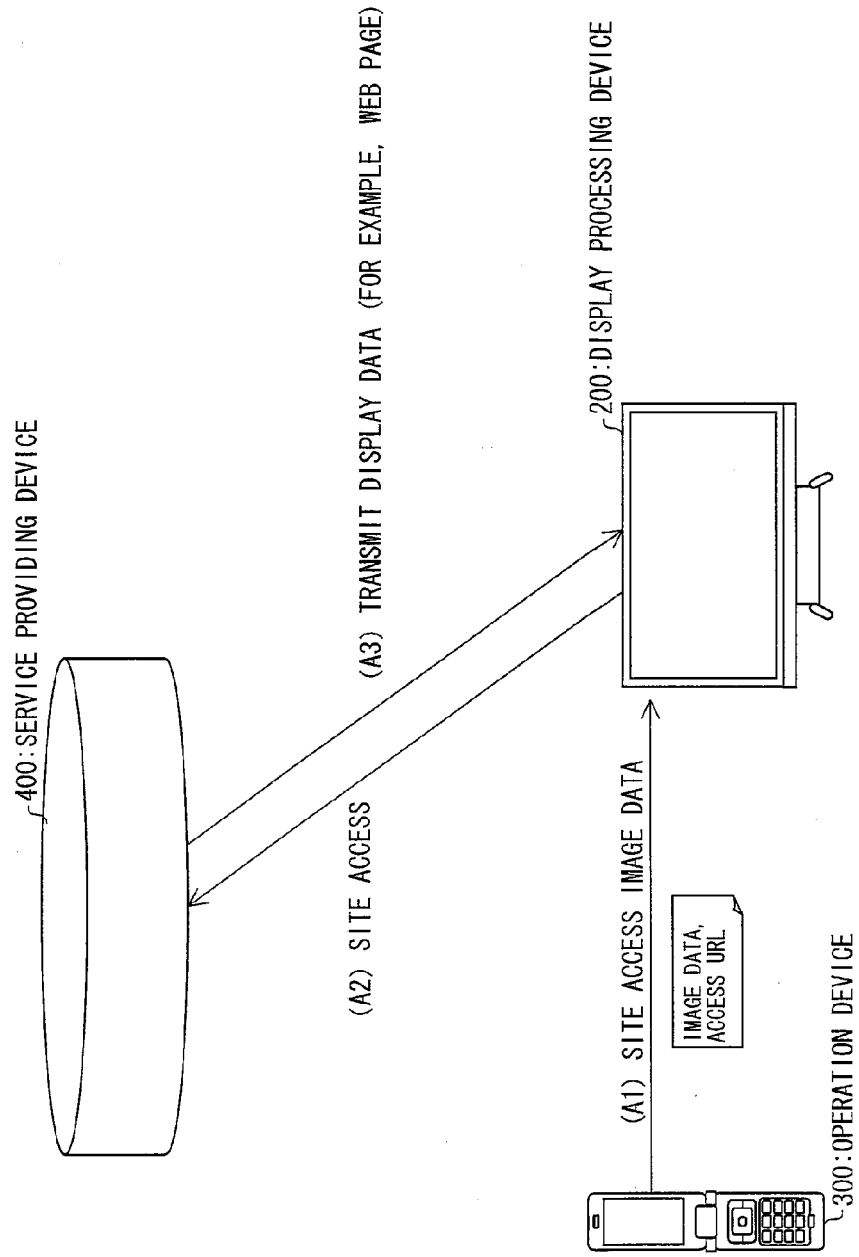
FIG. 9
Figure 10:
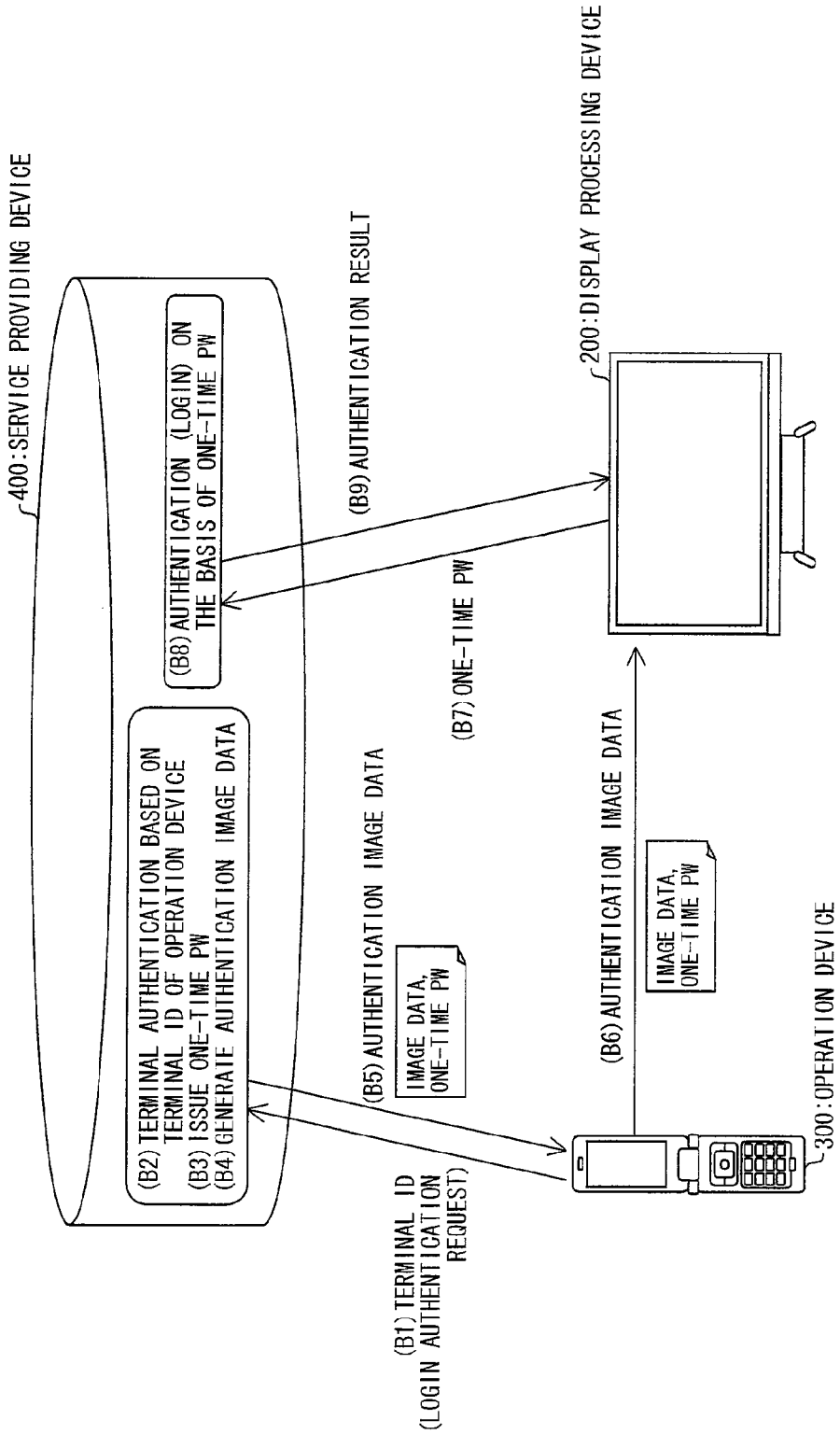
FIG. 10

With reference to FIGS. 9 and 10, this example describes a case in which after a user has become aware that a website which the user has accessed has notified the user that authentication (login) is necessary, the user obtains authentication image data 3B from the service providing device 400 and transmits the authentication image data 3B thus obtained to the display processing device 200 so as to achieve authentication (login) for the website which the user has accessed.

As illustrated in FIG. 9, the operation device 300 first transmits site access image data 3A to the display processing device 200 (A1). In response, the display processing device 200 analyzes the site access image data 3A and then attempts to access a website which is provided by the service providing device 400 and which is specified by a URL included in a processing specifying information item 5 of the site access image data 3A (A2). In response to the attempt, the service providing device 400 transmits display data serving as content such as a web page (A3). It is assumed herein that the display data transmitted in the step A3 is information for notifying the user that authentication (login) is necessary.

In this case, the user cannot access the website provided by the service providing device 400 unless the user obtains authentication (login). Thus, as illustrated in FIG. 10, the user then transmits a "login authentication request" for requesting information for the authentication (login), to the service providing device 400 with use of the operation device 300 (B1). The login authentication request thus transmitted includes a terminal ID (operation device identification information; second device information) of the operation device 300. Upon receipt of the login authentication request, the service providing device 400 first carries out terminal authentication on the basis of the terminal ID included in the login authentication request (B2). If the terminal authentication has been successfully completed, the service providing device 400 generates a one-time password for the authentication (login) for the website (B3). The service providing device 400 next generates authentication image data 3B including the one-time password (B4). The service providing device 400 then transmits the authentication image data 3B thus generated to the operation device 300 (B5).

Next, after receipt of the authentication image data 3B, the operation device 300 transmits the authentication image data 3B to the display processing device 200 (B6). In response, the display processing device 200 analyzes the authentication image data 3B and then transmits the one-time password, included in a processing specifying information item 5, to the service providing device 400 (B7).

The service providing device 400 carries out authentication (login) on the basis of the one-time password received (B8). If the authentication (login) has been successfully completed, the service providing device 400 transmits a result of the authentication (B9).

As described above, according to the present invention, authentication (login) for a website provided by the service providing device 400 can be carried out by transmitting authentication image data 3B from the operation device 300 to the display processing device 200.

Variation of Example 1

In the step B7 of Example 1, the display processing device 200 transmits a one-time password to the service providing device 400. The step B7 can be changed as follows: The display processing device 200 transmits the authentication image data 3B itself, received from the operation device 300, to the service providing device 400. The service providing device 400 then analyzes the authentication image data 3B so as to extract the one-time password included in the processing specifying information item 5. According to this arrangement, it is possible to check not only whether the one-time password has been provided by the service providing device 400, but also whether the authentication image data 3B has been provided by the service providing device 400. In other words, the arrangement (i) makes it possible to check whether the authentication image data 3B has not been improperly generated or tampered with, and consequently (ii) allows an improvement in security.

In the step B3 of Example 1, the service providing device 400 generates a one-time password. The step B3 can be changed as follows: The operation device 300 generates a one-time password and transmits a "login authentication request," including the one-time password, to the service providing device 400 in the step B1. The service providing device 400 then extracts the one-time password included in the "login authentication request" in the step B3.

Example 2

Figure 11:
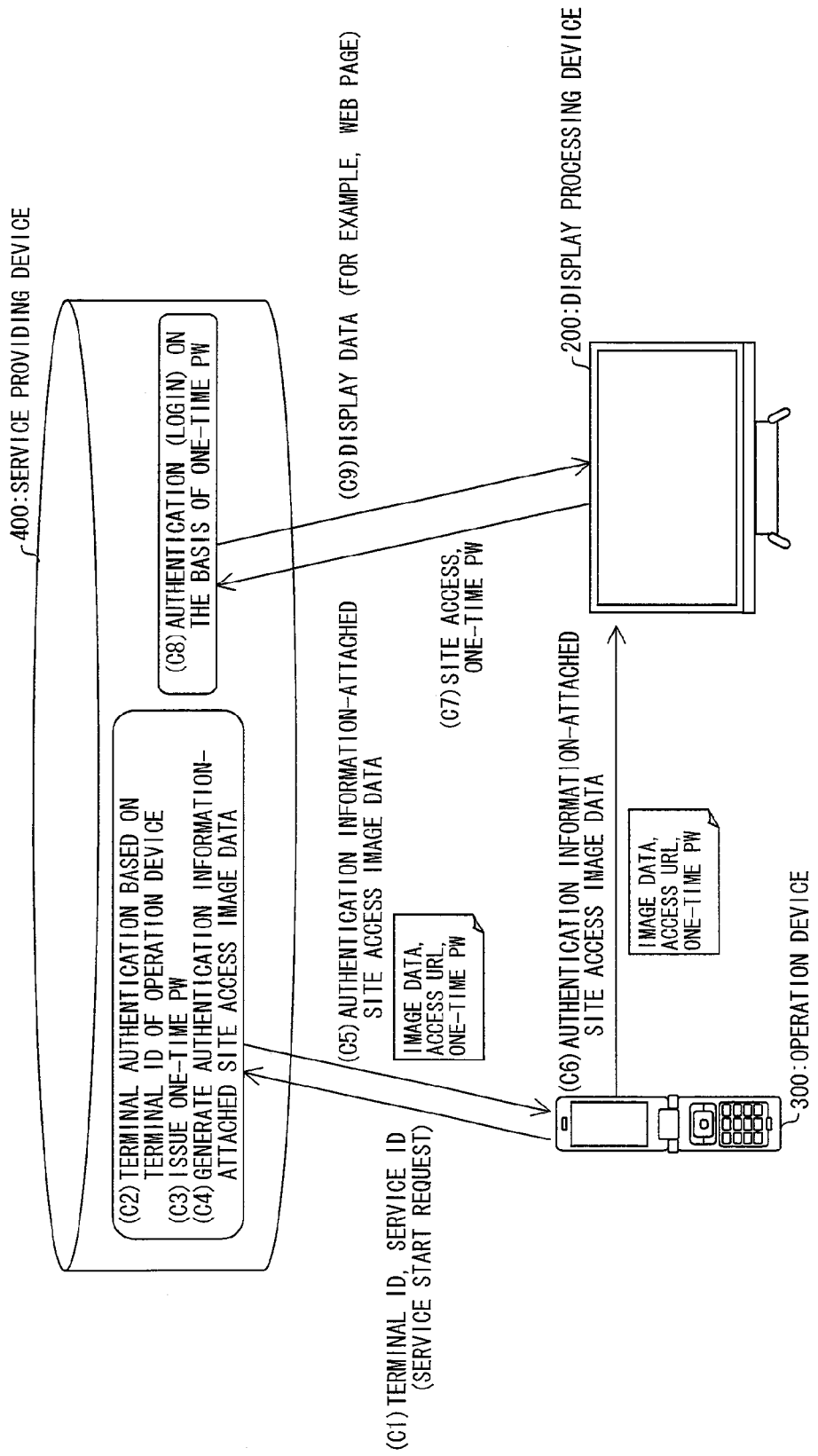
FIG. 11

With reference to FIG. 11, this example describes a case in which authentication (login) is obtained simultaneously with access to a website by transmitting, to the display processing device 200, authentication information-attached site access image data 3C which has been obtained from the service providing device 400 and which includes (i) a URL for accessing the website and (ii) a one-time password for authentication (login) for the website.

As illustrated in FIG. 11, the operation device 300 transmits, to the service providing device 400, a "service start request" for requesting information for accessing a website (C1). The service start request thus transmitted includes (i) a terminal ID of the operation device 300 and (ii) a service ID (service identification information) for identifying the website to be accessed. Upon receipt of the service start request, the service providing device 400 first carries out terminal authentication on the basis of the terminal ID included in the service start request (C2). If the terminal authentication has been successfully completed, the service providing device 400 generates a one-time password for authentication (login) for the website specified by the service ID included in the service start request (C3). The service providing device 400 next generates authentication information-attached site access image data 3C including (i) the one-time password and (ii) a URL for accessing the website specified by the service ID (C4). The service providing device 400 then transmits the authentication information-attached site access image data 3C thus generated to the operation device 300 (C5).

After receipt of the authentication information-attached site access image data 3C, the operation device 300 transmits the authentication information-attached site access image data 3C to the display processing device 200 (C6). The display processing device 200 analyzes the authentication information-attached site access image data 3C. The display processing device 200 then accesses the website specified by the URL included in a processing specifying information item 5 and transmits the one-time password included in a processing specifying information item 5 (C7).

The service providing device 400 carries out authentication (login) on the basis of the one-time password received (C8). If the authentication (login) has been successfully completed, the service providing device 400 transmits display data to the display processing device 200 (C9).

As described above, according to the present invention, authentication (login) can be achieved simultaneously with access to a website, provided by the service providing device 400, by transmitting authentication information-attached site access image data 3C from the operation device 300 to the display processing device 200.

Variation of Example 2

Example 2 describes a case in which authentication information-attached site access image data 3C including (i) a one-time password and (ii) a URL for accessing a website specified by a service ID is transmitted and received. Example 2 can be varied such that two kinds of image data, namely (i) site access image data 3A including a URL for accessing a website specified by a service ID and (ii) authentication image data 3B including a one-time password, are transmitted and received.

In the step C7 of Example 2, the display processing device 200 simultaneously accesses the website specified by the URL included in the processing specifying information item 5 and transmits the one-time password, included in the processing specifying information item 5, to the service providing device 400. The step C7 can be changed as follows: The display processing device 200 transmits the authentication information-attached site access image data 3C itself, received from the operation device 300, to the service providing device 400. The service providing device 400 then analyzes the authentication information-attached site access image data 3C so as to extract the one-time password included in the processing specifying information item 5. According to this arrangement, it is possible to check not only whether the one-time password has been provided by the service providing device 400, but also whether the authentication information-attached site access image data 3C has been provided by the service providing device 400. In other words, the arrangement (i) makes it possible to check whether the authentication information-attached site access image data 3C has not been improperly generated or tampered with, and consequently (ii) allows an improvement in security.

Example 3

Figure 12:
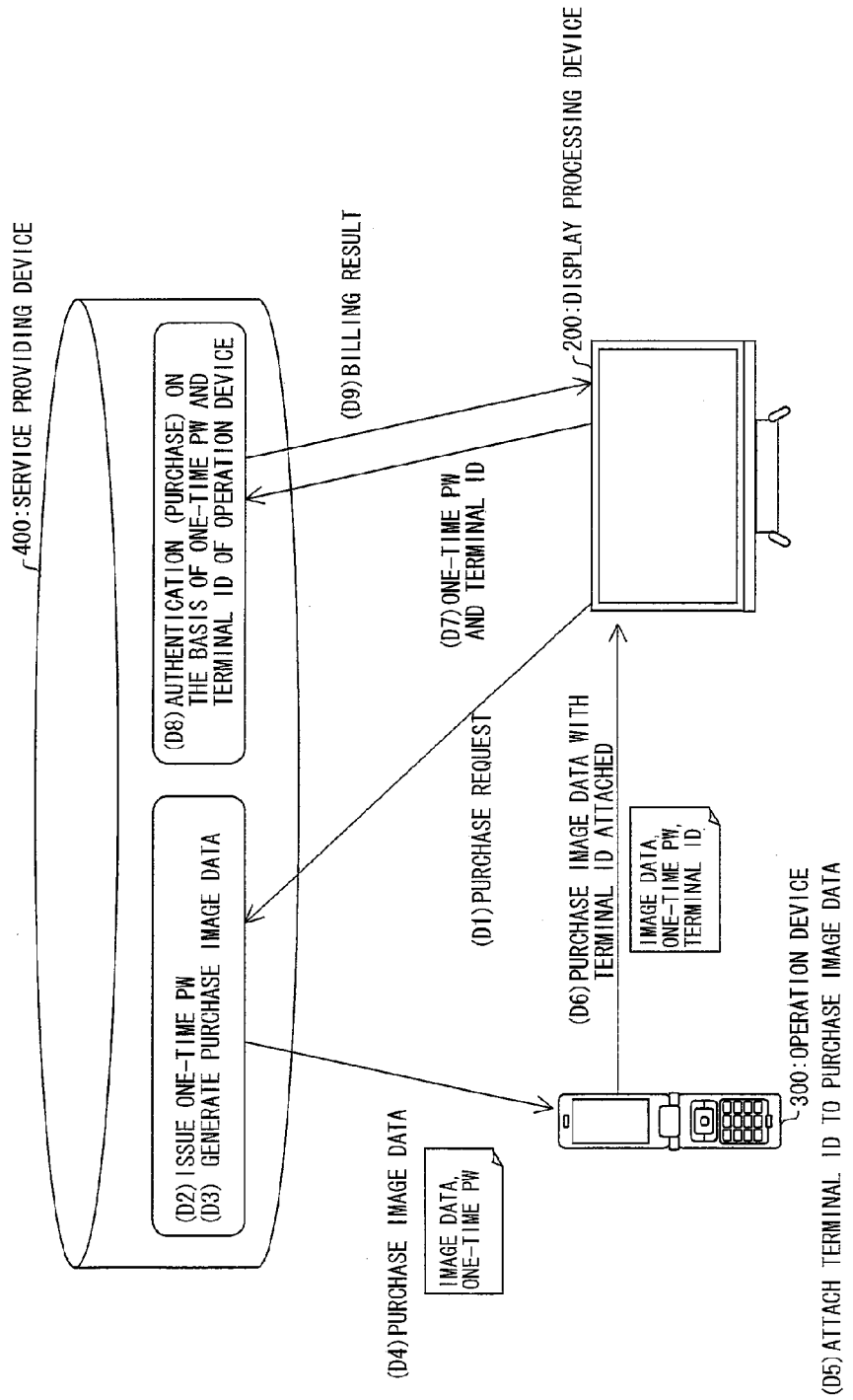
FIG. 12

With reference to FIG. 12, this example describes a case in which, when content on a website is purchased, authentication (purchase) necessary for a content purchase process is carried out in the service providing device 400 by transmitting purchase image data 3D (described later) from the operation device 300 to the display processing device 200.

When the display processing device 200 shows a display indicative of a state in which content can be purchased, if a user carries out an operation with use of the operation device 300 to purchase content, the display processing device 200 transmits, to the service providing device 400, a "purchase request," which is a request for purchasing content (D1). Upon receipt of the purchase request, the service providing device 400 generates a one-time password for use in an authentication (purchase) process for the content purchase (D2). The service providing device 400 next generates operation image data 3 including the one-time password (D3). The service providing device 400 then transmits the image data thus generated to the operation device 300 (D4). Note that the operation image data 3 thus generated can further include a URL of, for example, a server by which authentication is to be carried out. The operation image data 3 generated in this example is hereinafter referred to also as "purchase image data 3D."

After receipt of the purchase image data 3D, the operation device 300 stores its own terminal ID in a processing specifying information item 5 of the purchase image data 3D (D5). The operation device 300 then transmits the purchase image data 3D, in which the terminal ID has been stored, to the display processing device 200 (D6).

The display processing device 200 analyzes the purchase image data 3D and then transmits, to the service providing device 400, the terminal ID and the one-time password each included in a processing specifying information item 5 (D7). The service providing device 400 then carries out authentication (purchase) on the basis of the terminal ID and the one-time password received (D8). If the authentication (purchase) has been successfully completed, the service providing device 400 transmits a result of the content purchase processing to the display processing device 200 (D9).

As described above, according to the present invention, authentication (purchase) for a content purchase can be achieved by transmitting purchase image data 3D from the operation device 300 to the display processing device 200.

Variation of Example 3

In the step D7 of Example 3, the display processing device 200 transmits, to the service providing device 400, the terminal ID and the one-time password each included in a processing specifying information item 5. The step D7 can be changed as follows: The display processing device 200 transmits the purchase image data 3D itself, received from the operation device 300, to the service providing device 400. The service providing device 400 then analyzes the purchase image data 3D so as to extract the one-time password included in a processing specifying information item 5. According to this arrangement, it is possible to check not only whether the terminal ID and the one-time password have been provided by the service providing device 400, but also whether the purchase image data 3D has been provided by the service providing device 400. In other words, the arrangement (i) makes it possible to check whether the purchase image data 3D has not been improperly generated or tampered with, and consequently (ii) allows an improvement in security.

In the step D4 of Example 3, the service providing device 400 transmits the purchase image data 3D to the operation device 300. The step D4 can be changed so that (i) the service providing device 400 transmits, instead of the purchase image data 3D, data including a URL for accessing a website and (ii) the operation device 300 obtains purchase image data 3D from the website specified by the URL. In this case, an improvement in security can be achieved by an arrangement in which (i) the operation device 300 transmits, when accessing the website, its terminal ID to the service providing device 400 so that the service providing device 400 can carry out terminal authentication on the basis of the terminal ID, and (ii) the service providing device 400 then transmits purchase image data 3D to the operation device 300.

Further, in the steps D2, D3, and D5 of Example 3, the purchase image data 3D is generated and processed. Alternatively, the purchase image data 3D can be generated on the above website when the purchase image data 3D is obtained from the website (that is, the operation device 300 does not process the purchase image data 3D). According to this arrangement, the operation device 300 is not required to process the purchase image data 3D. As such, it is possible to simplify the configuration of the operation device 300.

Example 4

Figure 13:
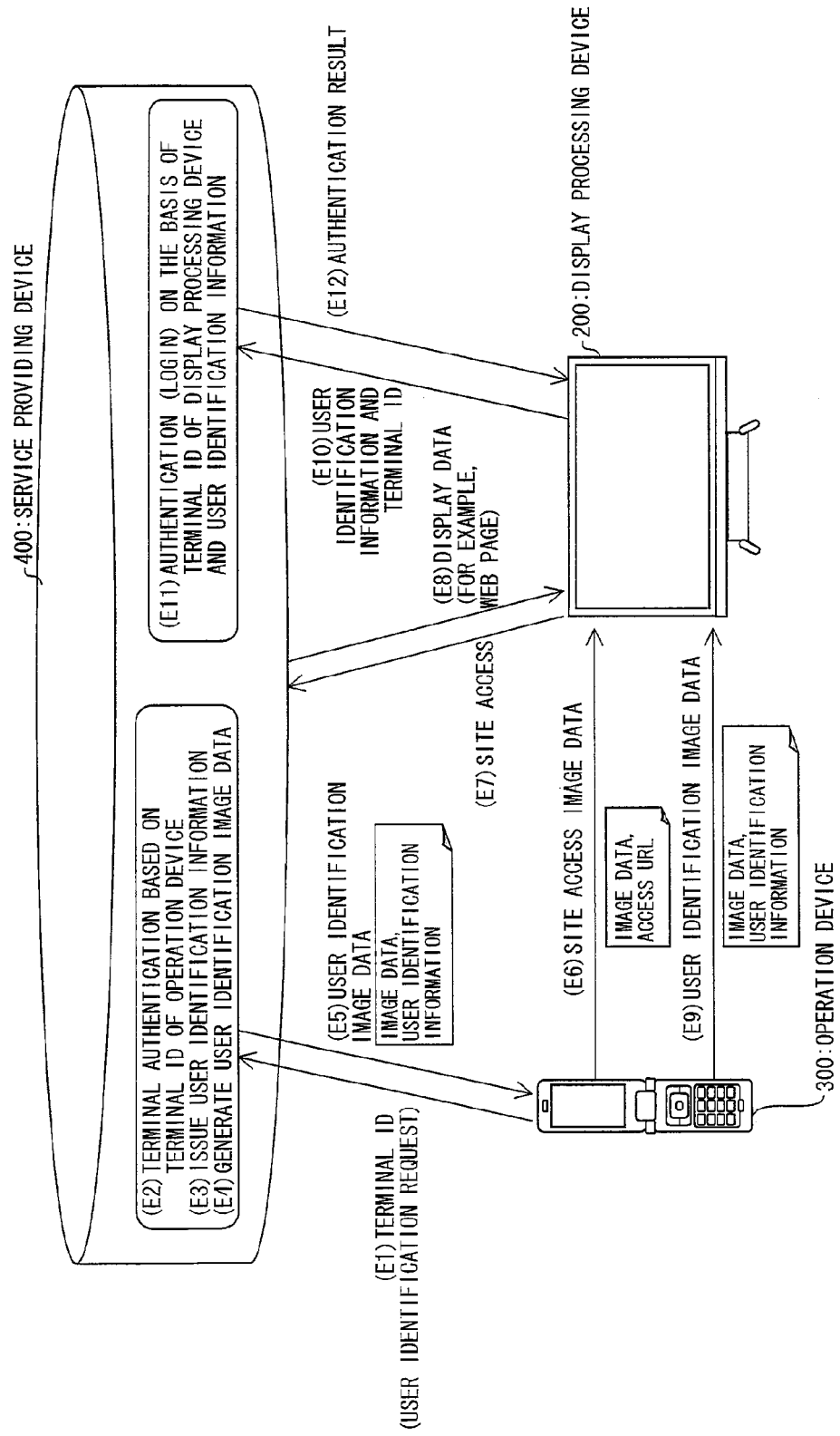
FIG. 13

With reference to FIG. 13, this example describes a case in which (i) the operation device 300 obtains user identification image data 3E from the service providing device 400 in advance and (ii) when a user has become aware that a website which the user has accessed has notified the user that authentication (login) is necessary, the authentication (login) for the website which the user has accessed is achieved by transmitting the user identification image data 3E obtained to the display processing device 200.

First, as illustrated in FIG. 13, to obtain user identification image data 3E, the user transmits a "user identification request" for requesting information for user identification, to the service providing device 400 with use of the operation device 300 (E1). The user identification request thus transmitted includes a terminal ID of the operation device 300. Upon receipt of the user identification request, the service providing device 400 first carries out terminal authentication on the basis of the terminal ID of the operation device 300 included in the user identification request (E2). If the terminal authentication has been successfully completed, the service providing device 400 generates user identification information for use in the authentication (login) for the website (E3). The service providing device 400 next generates user identification image data 3E including the user identification information (E4). The service providing device 400 then transmits the user identification image data 3E thus generated to the operation device 300 (E5).

Note that in a case where terminal authentication is not carried out on the basis of the terminal ID of the operation device 300, the user identification request transmitted in the step E1 does not need to include the terminal ID of the operation device 300.

To access the website, the operation device 300 first transmits site access image data 3A to the display processing device 200 (E6). In response, the display processing device 200 analyzes the site access image data 3A and then attempts to access a website which is provided by the service providing device 400 and which is specified by a URL included in a processing specifying information item 5 of the site access image data 3A (E7). In response to the attempt, the service providing device 400 transmits display data serving as content such as a web page (E8). It is assumed herein that the display data transmitted in the step E8 is information for notifying the user that authentication (login) is necessary.

In this case, the user cannot access the website provided by the service providing device 400 unless the user obtains authentication (login). Thus, as illustrated in FIG. 13, the operation device 300, which has obtained the user identification image data 3E through the steps E1 through E5 in advance, transmits the user identification image data 3E to the display processing device 200 (E9). The display processing device 200 analyzes the user identification image data 3E and then transmits, to the service providing device 400 which provides the website that the display processing device 200 attempted to access in the step E7, (i) the user identification information included in a processing specifying information item 5 and (ii) a terminal ID (first device information; device information) of the display processing device 200 (E10).

The service providing device 400 then carries out authentication (login) on the basis of the received user identification information and the received terminal ID of the display processing device 200 (E11). If the authentication (login) has been successfully completed, the service providing device 400 transmits a result of the authentication to the display processing device 200 (E12).

As described above, according to the present invention, authentication (login) for a website provided by the service providing device 400 can be carried out by (i) obtaining user identification image data 3E in advance with use of the operation device 300 and (ii) transmitting the user identification image data 3E thus obtained to the display processing device 200.

Variation of Example 4

According to Example 4, the display processing device 200 transmits its terminal ID to the service providing device 400 in the step E10, and the service providing device 400 carries out authentication (login) on the basis of the terminal ID in the step E11. The steps E10 and E11 can be changed as follows: In a case where the display processing device 200 does not transmit its terminal ID to the service providing device 400 in the step E10, and authentication (login) is thus carried out in the step E11, (i) the service providing device 400 transmits, to the operation device 300, an authentication checking notification, which includes an authentication URL, by electronic mail or the like, (ii) the operation device 300 transmits its terminal ID to the service providing device 400 when accessing a website specified by the authentication URL, and (iii) the service providing device 400 carries out authentication (login) on the basis of the received terminal ID of the operation device 300. According to this arrangement, authentication (login) is achieved without use of the terminal ID of the display processing device 200. As such, authentication (login) can be achieved even in a case where a website is accessed by a display processing device 200 whose terminal ID has not been registered in the service providing device 400 in advance.

Example 5

Figure 14:
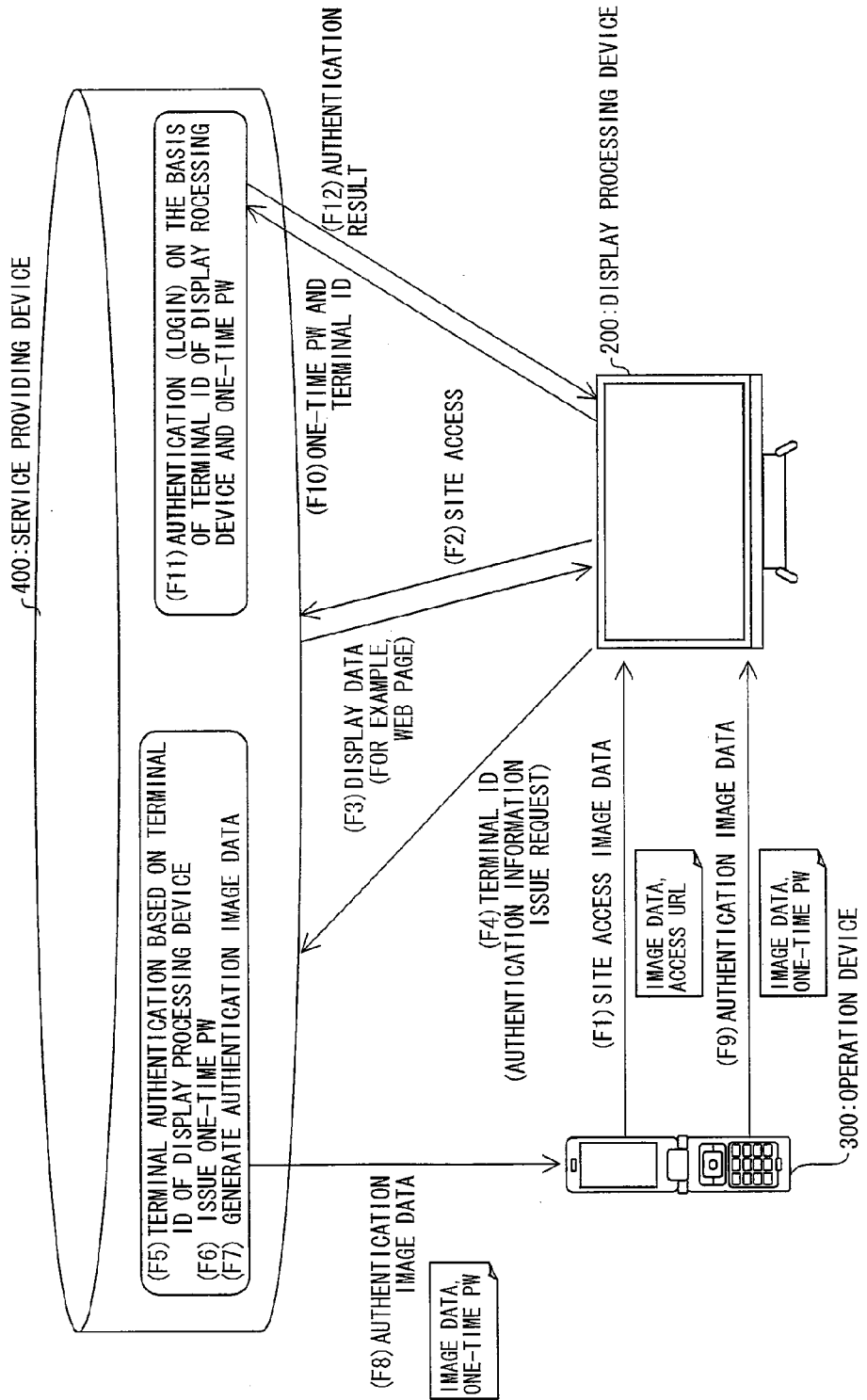
FIG. 14

With reference to FIG. 14, this example describes a case in which, when a user has become aware that a website which the user has accessed has notified the user that authentication (login) is necessary, authentication (login) for the website which the user has accessed is achieved by (i) carrying out an authentication information issue operation with use of the display processing device 200 so that the service providing device 400 transmits authentication image data 3B to the operation device 300, and then (ii) transmitting the authentication image data 3B from the operation device 300 to the display processing device 200.

As illustrated in FIG. 14, the operation device 300 first transmits site access image data 3A to the display processing device 200 (F1). In response, the display processing device 200 analyzes the site access image data 3A and then attempts to access a website which is provided by the service providing device 400 and which is specified by a URL included in a processing specifying information item 5 of the site access image data 3A (F2). In response to the attempt, the service providing device 400 transmits display data serving as content such as a web page (F3). It is assumed herein that the display data transmitted in the step F3 is information for notifying the user that authentication (login) is necessary.

In this case, the user cannot access the website provided by the service providing device 400 unless the user obtains authentication (login). Thus, as illustrated in FIG. 14, through an operation or the like by the user, the display processing device 200 transmits, to the service providing device 400, an "authentication information issue request" for requesting an issue of information for authentication (login) (F4). The authentication information issue request thus transmitted includes a terminal ID of the display processing device 200. Upon receipt of the authentication information issue request, the service providing device 400 first carries out terminal authentication on the basis of the terminal ID of the display processing device 200 included in the authentication information issue request (F5). If the terminal authentication has been successfully completed, the service providing device 400 generates a one-time password for the authentication (login) for the website (F6). The service providing device 400 then generates authentication image data 3B including the one-time password (F7) and transmits the authentication image data 3B thus generated to the operation device 300 (F8).

Note that in a case where terminal authentication is not carried out on the basis of the terminal ID of the display processing device 200, the authentication information issue request transmitted in the step F4 does not need to include the terminal ID of the display processing device 200.

After receipt of the authentication image data 3B, the operation device 300 transmits the authentication image data 3B to the display processing device 200 (F9). In response, the display processing device 200 analyzes the authentication image data 3B and then transmits, to the service providing device 400 which provides the website that the display processing device 200 attempted to access in the step F2, (i) the one-time password included in a processing specifying information item 5 and (ii) the terminal ID of the display processing device 200 (F10).

The service providing device 400 carries out authentication (login) on the basis of the received one-time password and the received terminal ID of the display processing device 200 (F11). If the terminal authentication has been successfully completed, the service providing device 400 transmits a result of the authentication to the display processing device 200 (F12).

As described above, according to the present invention, authentication (login) for a website provided by the service providing device 400 can be carried out by (i) transmitting authentication image data 3B, including a one-time password, from the service providing device 400 to the operation device 300 in accordance with an authentication information issue request, (ii) transmitting the authentication image data 3B from the operation device 300 to the display processing device 200, and (iii) transmitting, from the display processing device 200 to the service providing device 400, the one-time password included in the authentication image data 3B and the terminal ID of the display processing device 200.

Variation of Example 5

In the step F6 of Example 5, the service providing device 400 generates a one-time password. The step F6 can be changed as follows: While a one-time password is not generated in the step F6, (i) the display processing device 200 generates a one-time password, (ii) the display processing device 200 transmits, in the step F4, an "authentication information issue request" including the one-time password, and (iii) the service providing device 400 generates, in the step F7, authentication image data 3B including the one-time password extracted from the "authentication information issue request."

According to Example 5, the display processing device 200 transmits its terminal ID to the service providing device 400 in the step F4, and the service providing device 400 carries out terminal authentication on the basis of the terminal ID of the display processing device 200 in the step F5. These steps F4 and F5 can be omitted so that simple authentication (login) processing is carried out on the basis of only the authentication image data 3B.

According to Example 5, through the steps F6 through F8, the service providing device 400 generates authentication image data 3B including a one-time password and then transmits the authentication image data 3B thus generated to the operation device 300. The steps F6 through F8 can be changed as follows: While authentication image data 3B including a one-time password is not generated or transmitted through the steps F6 through F8, (i) the service providing device 400 transmits, to the operation device 300, link information such as a URL indicative of a target of a request for generation and transmission of authentication image data 3B including a one-time password, (ii) the operation device 300 transmits its terminal ID when accessing a linked website indicated by the link information, and (iii) the service providing device 400, which provides the linked website that has been accessed by the operation device 300, carries out terminal authentication on the basis of the terminal ID of the operation device 300, generates authentication image data 3B including a one-time password, and then transmits the authentication image data 3B thus generated to the operation device 300 which has accessed the linked website. In this case, an improvement in security can be achieved since the authentication is carried out on the basis of both the terminal ID of the display processing device 200 and that of the operation device 300.

Further, simple authentication processing can also be carried out in which authentication (login) for a website is completed when authentication based on both of the terminal ID of the display processing device 200 and that of the operation device 300 has successfully been achieved.

The above Examples 1 through 5 will further be described below in detail in Embodiments 1 through 5, respectively.

[Embodiment 1]

The present embodiment is an embodiment in which, in a case where a user has been notified when the user has accessed a website provided by the service providing device 400 that login is necessary, the user becomes able to log in the website by (i) causing the service providing device 400 to transmit authentication image data 3B, including a one-time password, to the operation device 300 in response to a request from the operation device 300, and (ii) causing the operation device 300 to transmit the authentication image data 3B to the display processing device 200.

The embodiment of the present invention will now be described with reference to FIGS. 1 and 15 through 21.

(More Detailed Configuration of Each Device)

Figure 1:
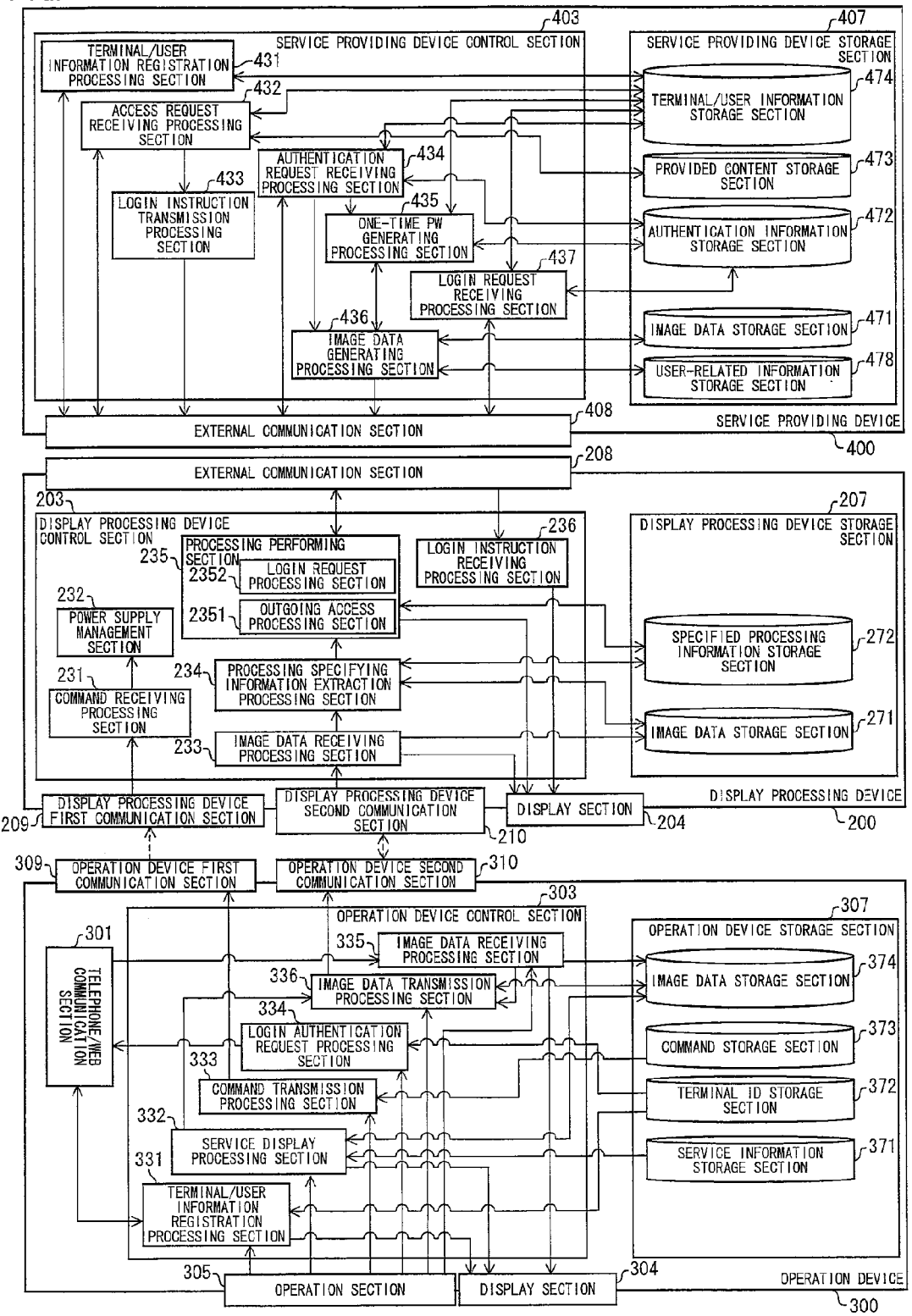
FIG. 1

With reference to FIG. 1, the following description deals in more detail with the configuration of each of the display processing device 200, the operation device 300, and the service providing device 400 according to the present embodiment. FIG. 1 is a block diagram illustrating an essential configuration of each of the display processing device 200, the operation device 300, and the service providing device 400 according to the present embodiment.

(More Detailed Configuration of Operation Device)

The configuration of the operation device 300 will first be described in more detail. As illustrated in FIG. 1, the operation device storage section 307 includes: a service information storage section 371; a terminal ID storage section 372; a command storage section 373; and an image data storage section (operation data storage section) 374. The operation device control section 303 includes: a terminal/user information registration processing section 331; a service display processing section (transmission instruction accepting means) 332; a command transmission processing section 333; a login authentication request processing section 334; an image data receiving processing section 335 (operation data receiving means; display control means); and an image data transmission processing section 336 (operation data transmitting means).

The service information storage section 371 readably stores information about services which a user can enjoy (for example, the name of each service or an icon indicative of each service), in association with information (service ID) with which each service is identifiable. The information about services which information is stored in the service information storage section 371 is used by the service display processing section 332 as data for displaying, for example, a menu from which the user selects a service.

The terminal ID storage section 372 stores a terminal ID with which the operation device 300 is identifiable.

The command storage section 373 readably stores command names for respective key operations on an application program (hereinafter referred to as "application"), which serves as a user interface for operation of the display processing device 200. The command names stored in the command storage section 373 are used by the command transmission processing section 333 as data to be included in a remote control signal to be transmitted to the display processing device 200.

The image data storage section 374 readably stores image data. Examples of the image data stored in the image data storage section 374 include: image data including an image of an outline of a service; and operation image data 3 such as site access image data 3A and authentication image data 3B.

Note that the image data stored in the image data storage section 374 can be (i) registered in advance when the operation device 300 is shipped out from a factory, (ii) received by the image data receiving processing section 335 from an external device, or (iii) registered by the user of the operation device 300.

The terminal/user information registration processing section 331 transmits, in response to an operation by the user as a trigger, a request for registration of the terminal ID of the operation device 300 in the service providing device 400 (terminal registration request). The terminal/user information registration processing section 331 causes the terminal ID of the operation device 300, obtained from the terminal ID storage section 372, to be included in the terminal registration request, and transmits the terminal registration request to the service providing device 400.

The terminal/user information registration processing section 331 further receives, from the service providing device 400, a provisional registration notification including a provisional user name, as a result of the registration of the terminal ID of the operation device 300 in the service providing device 400. The terminal/user information registration processing section 331 displays the provisional registration notification on the display section 304, and accepts an entry for updating the provisional user name so that the provisional user name is replaced with another user name. In a case where the user has carried out an operation to update the provisional user name, the terminal/user information registration processing section 331 transmits, to the service providing device 400, a request for such an update (user information update request). The terminal/user information registration processing section 331 then receives a notification for acceptance of the update request (user information update request acceptance notification) which notification is transmitted from the service providing device 400 in response to the request. Note that the user information update request transmitted as above includes the terminal ID of the operation device 300.

Upon receipt of the update request acceptance notification, the terminal/user information registration processing section 331 accepts a user input for a new user name and then transmits the accepted new user name to the service providing device 400 so as to update the provisional user name stored in the service providing device 400. In a case where the terminal/user information registration processing section 331 receives a notification of completion of the update (update registration completion notification) from the service providing device 400, the terminal/user information registration processing section 331 causes the display section 304 to carry out a display indicative of the completion of the update.

The service display processing section 332 reads, at the start-up of an application, the information about services which information is stored in the service information storage section 371, and causes the display section 304 to display the information so that the user can select a service. The service display processing section 332 further reads, from the image data storage section 374, image data including an image of an outline of a service selected through an operation by the user, and causes the display section 304 to display the image on the basis of image information included in the image data.

Simultaneously with the displaying of the image to the display section 304, the service display processing section 332 further causes the display section 304 to display a GUI (second user interface) for accepting an operation by the user to transmit, to the display processing device 200, site access image data 3A including the image currently displayed on the display section 304. Upon acceptance of an operation by the user through the GUI displayed, the image data transmission processing section 336 (described later) transmits, to the display processing device 200, the site access image data 3A including the image currently displayed on the display section 304. Note that the GUI is a button, for example.

The service display processing section 332 can additionally cause the display section 304 to display a GUI for accepting an operation other than the above GUI for transmitting the site access image data 3A to the display processing device 200. Examples of such a GUI include: a button for accepting an instruction to transit to the menu screen; a button for accepting an instruction to transmit, to the display processing device 200, a remote control signal for switching on the power supply of the display processing device 200; and a button for accepting an instruction to cause the display section 304 to display an application. In other words, the service display processing section 332 can cause the display section 304 to display a GUI serving as a menu (operation menu) for accepting various operations by the user of the operation device 300.

A later description referring to FIG. 17 will deal with how the service display processing section 332 causes the display section 304 to display (i) an image of an outline of a service and (ii) a GUI.

The command transmission processing section 333 generates a remote control signal in accordance with a key operation on an application. The command transmission processing section 333 further transmits the remote control signal thus generated to the display processing device 200 via the operation device first communication section 309.

The login authentication request processing section 334 transmits a login authentication request to the service providing device 400 via the telephone/web communication section 301 in response to a login operation by the user. The login authentication request is transmitted to the service providing device 400 so as to request transmission of, for example, authentication image data 3B including a one-time password for authentication (login) for a website provided by the service providing device 400. The login authentication request transmitted as above includes the terminal ID of the operation device 300. The terminal ID is obtained from the terminal ID storage section 372.

The image data receiving processing section 335 receives image data transmitted from an external device, and stores the image data thus received in the image data storage section 374. The image data receiving processing section 335 further causes the display section 304 to display an image on the basis of image information included in the image data received. Examples of the image data transmitted from an external device include authentication image data 3B transmitted from the service providing device 400.

Simultaneously with the displaying of the image to the display section 304, the image data receiving processing section 335 further causes the display section 304 to display a GUI (first user interface) for accepting an operation by the user to transmit the image data received to the display processing device 200. Upon acceptance of an instruction by the user through the GUI displayed, the image data transmission processing section 336 transmits, to the display processing device 200, the image data (that is, the image data received from the external device by the image data receiving processing section 335) including the image which the image data receiving processing section 335 has caused the display section 304 to display. Note that the GUI is a button, for example.

The image data receiving processing section 335 can additionally cause the display section 304 to display a GUI for accepting an operation other than the above GUI for accepting an operation by the user to transmit the image data to the display processing device 200. Examples of such a GUI include: a button for accepting an instruction to transit to a previous screen; and a button for accepting an instruction to display an application on the display section 304. In other words, the image data receiving processing section 335 can cause the display section 304 to display a GUI serving as a menu (operation menu) for accepting various operations by the user of the operation device 300.

A later description referring to FIG. 20 will deal with how the image data receiving processing section 335 causes the display section 304 to display an image and a GUI.

The image data transmission processing section 336 transmits image data to the display processing device 200 via the operation device second communication section 310 in response to an operation, as a trigger, by the user to transmit the image data. The above image data is image data which is included in the image data stored in the image data storage section 374 and of which the user has instructed the transmission.

More specifically, upon acceptance of an instruction by the user through the GUI which is displayed on the display section 304 by the image data receiving processing section 335, the image data transmission processing section 336 transmits, to the display processing device 200, image data including an image which the image data receiving processing section 335 has caused the display section 304 to display. Further, upon acceptance of an instruction by the user through the GUI which is displayed on the display section 304 by the service display processing section 332, the image data transmission processing section 336 transmits, to the display processing device 200, site access image data 3A including an image currently displayed on the display section 304.

(More Detailed Configuration of Display Processing Device)

The configuration of the display processing device 200 will now be described in more detail. As illustrated in FIG. 1, the display processing device storage section 207 includes: an image data storage section 271; and a specified processing information storage section 272. The display processing device control section 203 includes: a command receiving processing section 231; a power supply management section 232; an image data receiving processing section 233 (operation data receiving means); a processing specifying information extraction processing section 234 (authentication information extracting means); a processing performing section 235; and a login instruction receiving processing section 236.

The image data storage section 271 readably stores image data transmitted from the operation device 300.

The specified processing information storage section 272 stores a processing specifying information item 5 included in the image data transmitted from the operation device 300.

The command receiving processing section 231 receives, via the display processing device first communication section 209, a remote control signal transmitted from the operation device 300. The command receiving processing section 231 further provides an instruction, which is indicated by a command name included in the remote control signal received, to a corresponding section of the display processing device control section 203. In a case where, for example, the remote control signal received includes a command for switching on or switching off the power supply, the command receiving processing section 231 provides the power supply management section 232 with an instruction to carry out such switching.

The power supply management section 232, in accordance with an instruction from the command receiving processing section 231, carries out a switch of whether to (i) supply power to respective sections of the display processing device 200 (that is, to switch on the power supply), or to (ii) supply no power to the respective sections (that is, to place the display processing device 200 on standby). It is assumed herein that even when on standby, the display processing device 200 can at least receive a remote control signal including a command for switching on the power supply.

The image data receiving processing section 233 receives image data transmitted from the operation device 300 via the display processing device second communication section 210. The image data receiving processing section 233 then stores the image data thus received in the image data storage section 271, and causes the display section 204 to display an image included in an image region 610 of the image data received.

The processing specifying information extraction processing section 234 analyzes, in response to the storage of the image data in the image data storage section 271 by the image data receiving processing section 233 as a trigger, whether the image data thus stored includes a processing specifying information item 5. If the image data includes a processing specifying information item 5, the processing specifying information extraction processing section 234 extracts the processing specifying information item 5, and stores the processing specifying information item 5 thus extracted in the specified processing information storage section 272.

The processing performing section 235, in response to completion of the processing by the processing specifying information extraction processing section 234, carries out various processing on the basis of the processing specifying information item 5 stored in the specified processing information storage section 272. To carry out such various processing, the processing performing section 235 includes: an outgoing access processing section 2351; and a login request processing section (authentication information transmitting means) 2352.

In a case where a processing specifying information item 5 whose command name 6 is "SITE ACCESS" is stored in the specified processing information storage section 272, the outgoing access processing section 2351 requests, via the external communication section 208, access to a website specified by an URL indicated by a parameter 7 of the processing specifying information item 5. Upon receipt of display data such as HTML data and content in response to the access request, the outgoing access processing section 2351 causes the display section 204 to display the display data thus received.

In a case where a processing specifying information item 5 whose command name 6 is "AUTHENTICATION" is stored in the specified processing information storage section 272, the login request processing section 2352 transmits a request for login for a predetermined website (for example, a website currently displayed on the display section 204) via the external communication section 208. The login request transmitted as above includes a one-time password indicated by a parameter 7 of the processing specifying information item 5. If the parameter 7 of the processing specifying information item 5 further indicates a URL, the login request processing section 2352 can transmit a login request to a website specified by the URL. Further, the login request transmitted as above can include, instead of the one-time password indicated by the parameter 7 of the processing specifying information item 5, the image data which includes the processing specifying information item 5 and which is stored in the image data storage section 271. Upon receipt of a result of the authentication, the login request processing section 2352 causes the display section 204 to display the authentication result thus received.

The login instruction receiving processing section 236 receives login instruction information transmitted from the service providing device 400 via the external communication section 208, and causes the display section 204 to display information included in the login instruction information thus received.

(More Detailed Configuration of Service Providing Device)

The configuration of the service providing device 400 will now be described in more detail. As illustrated in FIG. 1, the service providing device storage section 407 includes: an image data storage section 471; an authentication information storage section 472; a provided content storage section 473; a terminal/user information storage section 474; and a user-related information storage section 478. The service providing device control section 403 includes: a terminal/user information registration processing section 431; an access request receiving processing section 432; a login instruction transmission processing section 433; an authentication request receiving processing section 434; a one-time PW generating processing section (authentication information generating means) 435; an image data generating processing section (operation data generating means; operation data transmitting means) 436; and a login request receiving processing section 437.

The image data storage section 471 stores a template for the operation image data 3. The template for the operation image data 3 is image data which does not include information such as a processing specifying information item 5 and image information, and which can be used as a template. The image data storage section 471 stores, in particular, a template for operation image data 3 generated by the image data generating processing section 436.

The image data storage section 471 can also store a template for each user in association with a user name so that the image data generating processing section 436 can generate operation image data 3 especially for the user. Further, the image data storage section 471 can store image information, which is to be included in the image data, in such a manner that the image information is separated from the image data.

The authentication information storage section 472 stores a one-time password, generated by the one-time PW generating processing section 435, for each operation device 300 in such a manner that the one-time password is associated with a terminal ID of the operation device 300.

The provided content storage section 473 stores various display data such as HTML data and video content to be transmitted to the display processing device 200 in response to a site access request from the display processing device 200.

The terminal/user information storage section 474 stores at least a set of (i) the terminal ID of each operation device 300, (ii) a name of a user of the operation device 300, (iii) a date and time at which the user last accessed content, and (iv) a date and time at which a one-time password for authentication was last issued for the user. The terminal/user information storage section 474 can, for example, have a data structure shown in Table 1 below.

TABLE 1

| No | Operation device terminal ID | User name | Last access date and time/ content | Last login authentication issue date and time |
|---|---|---|---|---|
| 1 | 0001 | Taro | 2008 May 27 12:18 Content A | 2008 May 27 12:10 |
| 2 | 0002 | Hanako | 2008 May 27 19:00 Content B | 2008 Mar. 27 19:00 |

An example of Table 1 shows that the terminal/user information storage section 474 stores the following information: (i) A name of a user of an operation device 300 whose terminal ID is "0001" is "Taro"; (ii) Content which the user last accessed is "content A," and a date and time of the access is "May 27, 2008, 12:18"; (iii) A date and time at which a one-time password for authentication (login) was last issued for the user is "May 27, 2008, 12:10."

The user-related information storage section 478 stores information about users (hereinafter referred to also as "user-related information") for each operation device in association with its terminal ID. The user-related information stands for (i) text information about users (hereinafter referred to also as "user text information") and (ii) image information about users (hereinafter referred to also as "user image information").

Specific examples of the user text information include: a user name; a user ID; a name of a service which the user can log in; and an operation which the user can carry out. The user text information is, however, not limited to these, and can thus be any text information about the users.

Specific examples of the user image information include: an image indicative of a user name; an image of an avatar representative of the user; an image indicative of a name of a service which the user can log in; an image of an icon for the service; and an image indicative of an operation which the user can carry out. The user image information is, however, not limited to these, and can thus be any image information about the users.

Note that the user-related information storage section 478 can store, for each user, either a single item of user-related information or a plurality of items of user-related information.

It is assumed herein that the user-related information can be registered in the user-related information storage section 478 by a user with use of an operation device 300 in accordance with a normal method. The present description omits details of such registration.

The terminal/user information registration processing section 431, upon receipt of a terminal registration request from the operation device 300, searches through the terminal/user information storage section 474 for a terminal ID, included in the terminal registration request received, so as to check whether the terminal ID has been registered. If the terminal/user information registration processing section 431 has determined that the terminal ID has not been registered, the terminal/user information registration processing section 431 generates a provisional user name and causes the terminal/user information storage section 474 to store (that is, newly register) the provisional user name and the above terminal ID in association with each other. The terminal/user information registration processing section 431 then transmits, to the operation device 300, a provisional registration notification indicative of a provisional registration of the terminal ID and the provisional user name. The provisional registration notification includes the above provisional user name.

Next, upon receipt of a user information update request transmitted from the operation device 300, the terminal/user information registration processing section 431 checks whether the user is a registered user and then transmits, to the operation device 300, a user information update request acceptance notification indicative of acceptance of the user information update request. The terminal/user information registration processing section 431 then updates the user name, stored in the terminal/user information storage section 474, so that the user name is replaced with a user name transmitted from the operation device 300. The terminal/user information registration processing section 431 then transmits, to the operation device 300, an update registration completion notification indicative of completion of the update.

The access request receiving processing section 432, in response to an access request from the outgoing access processing section 2351 of the display processing device 200, checks whether authentication (login) has been achieved. If login has not been achieved, the access request receiving processing section 432 causes the login instruction transmission processing section 433 to transmit, to the display processing device 200, login instruction information indicating that login is necessary. If login has been achieved, the access request receiving processing section 432 obtains, from the provided content storage section 473, data to be provided and transmits the data to the display processing device 200. If a website being accessed requires no authentication (login), the access request receiving processing section 432 obtains, from the provided content storage section 473, data to be provided and transmits the data to the display processing device 200, without checking whether login has been achieved.

The login instruction transmission processing section 433 transmits login instruction information to the display processing device 200 in response to an instruction from the access request receiving processing section 432.

The authentication request receiving processing section 434, upon receipt of a login authentication request from the login authentication request processing section 334 of the operation device 300, first carries out terminal authentication by checking whether a terminal ID included in the login authentication request received has been registered in the terminal/user information storage section 474. If the terminal authentication has been successfully completed, the authentication request receiving processing section 434 causes the one-time PW generating processing section 435 to generate a one-time password for authentication (login), and further causes the image data generating processing section 436 to generate authentication image data 3B. Each time the authentication request receiving processing section 434 causes the one-time PW generating processing section 435 to generate a one-time password, the authentication request receiving processing section 434 causes the terminal/user information storage section 474 to store, as a date and time at which a one-time password was last issued, a date and time at which the authentication request receiving processing section 434 has caused the one-time PW generating processing section 435 to generate the one-time password.

The one-time PW generating processing section 435 generates a one-time password for authentication (login) in response to an instruction from the authentication request receiving processing section 434. The one-time password thus generated has a valid period (for example, two minutes). A one-time password whose valid period has elapsed does not allow login. The one-time PW generating processing section 435 causes the authentication information storage section 472 to store the one-time password, generated as above, so that (i) the one-time password is associated with the terminal ID included in the login authentication request received by the authentication request receiving processing section 434 and (ii) the valid period of the one-time password can be referred to. A one-time password whose valid period has elapsed can be deleted from the authentication information storage section 472.

The image data generating processing section 436 generates authentication image data 3B which includes a one-time password generated by the one-time PW generating processing section 435. The image data generating processing section 436 generates the authentication image data 3B on the basis of a template stored in the image data storage section 471. In other words, the image data generating processing section 436 generates authentication image data 3B prepared by adding, to a template stored in the image data storage section 471, a processing specifying information item 5 which includes a one-time password generated by the one-time PW generating processing section 435.

In the case where the image data storage section 471 stores a template for each user, the image data generating processing section 436 generates authentication image data 3B on the basis of a template for a user of the operation device 300 which has transmitted the login authentication request. The user of the operation device 300 which has transmitted the login authentication request can be identified on the basis of a user name obtained by searching through the terminal/user information storage section 474 while using, as a key, the terminal ID of the operation device 300 included in the login authentication request. The image data generating processing section 436 thus generates authentication image data 3B on the basis of a template which is stored in the image data storage section 471 in association with the user name obtained.

The image data generating processing section 436 can also generate authentication image data 3B for each user by causing user-related information stored in the user-related information storage section 478 to be included in the authentication image data 3B. The image data generating processing section 436 can further generate an image, to be included in the authentication image data 3B, for each user with use of the user-related information. The image data generating processing section 436 can, for example, generate (i) an image indicative of a user name, or an image (avatar) representative of the user, (ii) an image of a name of a service which the user is attempting to log in, or an image of an icon with which such a service is identifiable, and/or (iii) an image indicative of, for example, an operation currently available for the user.

Specifically, the image data generating processing section 436 obtains user-related information which is stored in the user-related information storage section 478 in association with the terminal ID included in the login authentication request. The image data generating processing section 436 then causes an image including the user-related information, obtained as above, to be included in an image region 610 of the authentication image data 3B.

Examples of the "image including the user-related information" are as follows: In a case where the user-related information obtained is user text information, the "image including the user-related information" is, for example, an image in which the user text information obtained is displayed so as to be superimposed over a predetermined region of a predetermined image.

In a case where the user-related information obtained is user image information, the "image including the user-related information" is, for example, an image itself which is displayed on the basis of the user image information obtained, or an image in which the image displayed on the basis of the user image information obtained is superimposed over a predetermined region of a predetermined image. The predetermined image and the predetermined region can, for example, be either preset, or registered in the service providing device 400 by the user.

In a case where a plurality of items of user-related information are obtainable from the user-related information storage section 478, the image data generating processing section 436 can generate either an image including any of the plurality of items of user-related information or an image including all the plurality of items of user-related information.

The image data generating processing section 436 can further cause a processing specifying information item 5 of the authentication image data 3B to include a URL specifying a website provided by the service providing device 400.

The image data generating processing section 436 transmits the authentication image data 3B, generated as above, to the operation device 300 via the external communication section 408.

The login request receiving processing section 437 receives a login request transmitted from the login request processing section 2352 of the display processing device 200, and checks whether a one-time password included in the login request received is valid. Specifically, the login request receiving processing section 437 checks (i) whether the one-time password included in the login request received is identical to a corresponding one-time password stored in the authentication information storage section 472, and (ii) whether a valid period of the one-time password has not elapsed.

If the one-time password included in the login request received is valid (that is, the one-time password is identical to the corresponding one-time password stored in the authentication information storage section 472, and the valid period of the one-time password has not elapsed), the login request receiving processing section 437 carries out authentication (login) processing. The login request receiving processing section 437 can, according to need, cause the access request receiving processing section 432 to (i) obtain, from the provided content storage section 473, data to be provided and (ii) transmits the data to the display processing device 200. Each time the access request receiving processing section 432 transmits content, the login request receiving processing section 437 causes the terminal/user information storage section 474 to store, as a date and time at which the content was last accessed, a date and time at which the content was transmitted.

If the one-time password included in the login request received is not valid (that is, the one-time password is not identical to the corresponding one-time password stored in the authentication information storage section 472, or the valid period of the one-time password has elapsed), the login request receiving processing section 437 does not carry out authentication (login) processing.

A result of the authentication (login) can be transmitted to the display processing device 200 regardless of whether authentication (login) processing has been carried out.

(Procedure for Processing)

Figure 15:
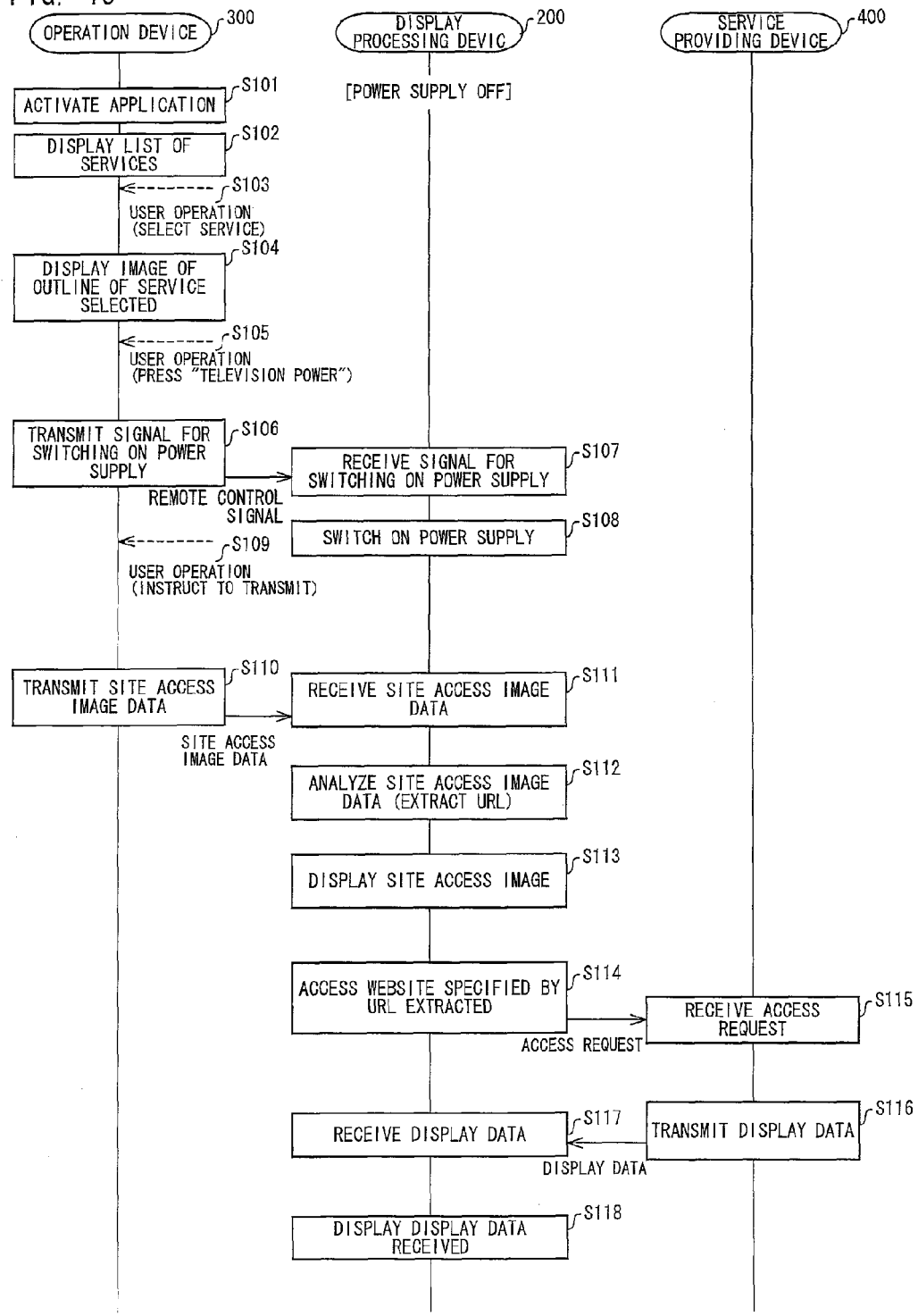
FIG. 15

With reference to FIG. 15, the following description deals with procedures for processing carried out by each device in a case where a user accesses a website within the operation system 100. The description below deals with (i) a processing procedure for a case in which the user accesses a website that does not require authentication (login) and (ii) a processing procedure for a case in which the user accesses a website that does require authentication (login).

(Processing Procedure 1: Access to Website Requiring No Authentication (Login))

FIG. 15 is a flowchart illustrating processing carried out by each device in a case where the user accesses, within the operation system 100, a website which does not require authentication (login). It is assumed herein that (i) user registration processing has been completed, and (ii) the power supply of the display processing device 200 is initially in an off state (on standby).

First, the user activates an application on the operation device 300 so as to use a service on a website provided by the service providing device 400 (S101).

When the application is activated, the service display processing section 332 of the operation device 300 causes the display section 304 to display a list of available services as a menu (S102). If the user selects one of the services listed (S103), the service display processing section 332 causes the display section 304 to display an image of an outline of the service selected (S104). More specifically, the service display processing section 332 reads, from the image data storage section 374, image data including an image of an outline of the service selected, and causes the display section 304 to display the image on the basis of image information included in the image data. Simultaneously with the displaying of the image, the service display processing section 332 causes the display section 304 to display GUIs (for example, buttons) for accepting various operations by the user. In particular, the service display processing section 332 causes the display section 304 to display (i) a GUI (for example, a "TELEVISION POWER" button) for accepting an operation to switch on the power supply of the display processing device 200, and (ii) a GUI (for example, a "TRANSMIT TO TELEVISION" button) for accepting an operation to transmit site access image data 3A to the display processing device 200.

Then, since the power supply of the display processing device 200 is in the off state, the user presses the "TELEVISION POWER" button, displayed on the display section 304, so as to switch on the power supply of the display processing device 200 in advance (S105). In response, the command transmission processing section 333 of the operation device 300 transmits, to the display processing device 200, a remote control signal for switching on the power supply (S106). Upon receipt of the remote control signal by the command receiving processing section 231 of the display processing device 200 (S107), the power supply management section 232 switches on the power supply (S108).

Next, the user carries out an operation (i.e., presses the "TRANSMIT TO TELEVISION" button) to transmit site access image data 3A, including the image displayed on the display section 304 in the step S104, to the display processing device 200 in order to access the website, provided by the service providing device 400, so as to use the service selected in the step S103 (S109). In response, the image data transmission processing section 336 transmits the site access image data 3A to the display processing device 200 (S110). It is assumed herein that the site access image data 3A includes (i) a command name 6 of "SITE ACCESS" and (ii) a parameter 7 indicative of a URL specifying the website provided by the service providing device 400.

The image data receiving processing section 233 of the display processing device 200 receives the site access image data 3A (S111). The processing specifying information extraction processing section 234 then analyzes the site access image data 3A thus received (S112). More specifically, the processing specifying information extraction processing section 234 extracts a processing specifying information item 5 included in the site access image data 3A received. In this case, the processing specifying information extraction processing section 234 extracts (i) "SITE ACCESS" as the command name 6 and (ii) the URL as the parameter 7.

Then, the image data receiving processing section 233 causes the display section 204 to display the image on the basis of the image information, included in the site access image data 3A, so that the user can check the site access image data 3A (S113). Further, since the command name 6, extracted as above, of the processing specifying information item 5 is "SITE ACCESS," the outgoing access processing section 2351 requests access to the website specified by the URL extracted (S114).

The access request receiving processing section 432 of the service providing device 400 receives the access request (S115). The access request receiving processing section 432, in response, transmits display data (for example, HTML data forming a web page, and video content) to be displayed on the display section 204 of the display processing device 200 (S116).

Upon receipt of the display data (S117), the outgoing access processing section 2351 of the display processing device 200 causes the display section 204 to display the display data thus received (S118).

(Screen Examples)

Figure 16:
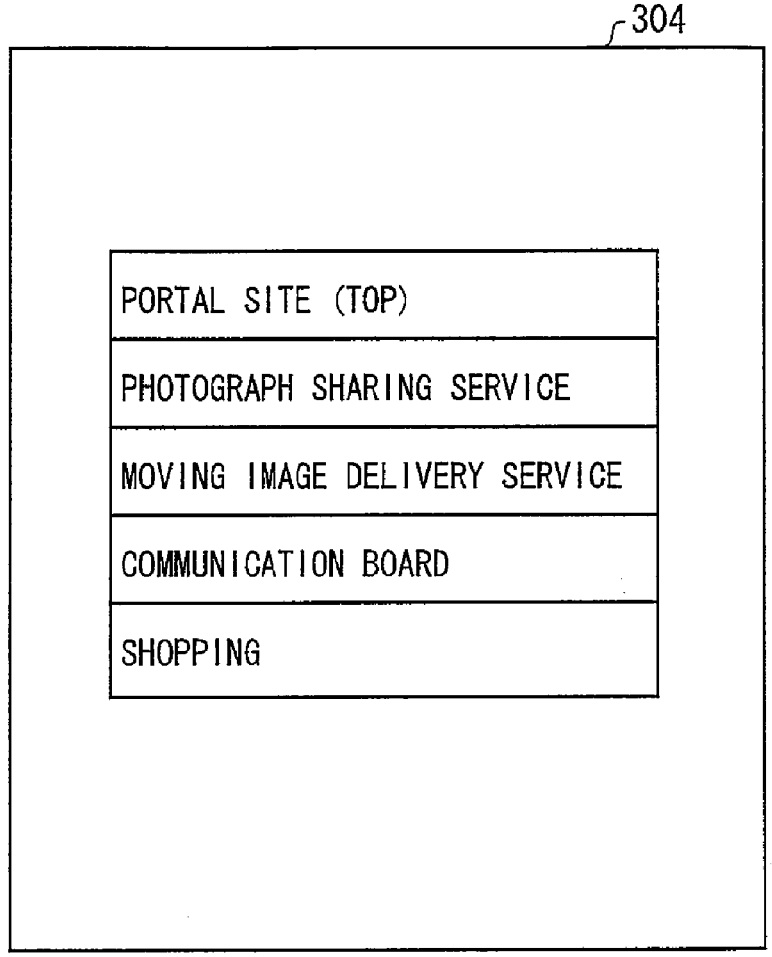
FIG. 16
Figure 17:
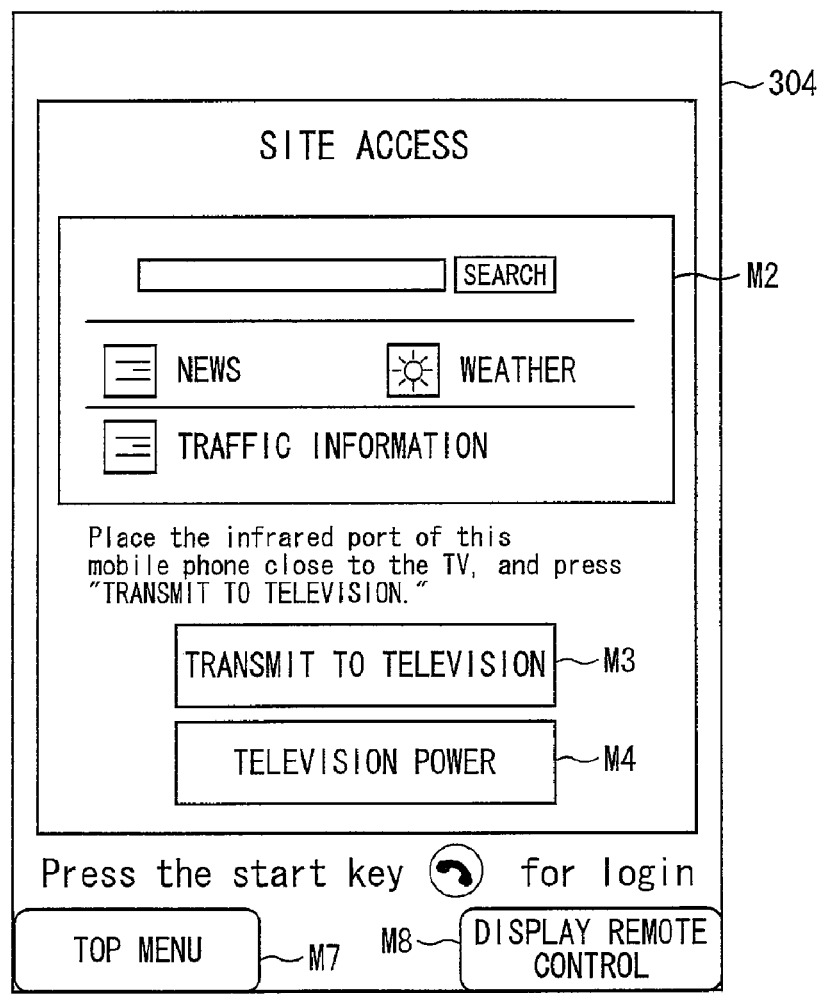
FIG. 17

With reference to FIGS. 16 and 17, the following description deals with example screens displayed on the display section 304 of the operation device 300.

FIG. 16 is a view schematically illustrating a list of services, displayed as a menu on the display section 304 of the operation device 300, which a user can select. This screen is an example screen observed in the step S102. In this example, the user can select any one of "PORTAL SITE (TOP)", "PHOTOGRAPH SHARING SERVICE", "MOVING IMAGE DELIVERY SERVICE", "COMMUNICATION BOARD", and "SHOPPING." In a case where, for example, the user selects "PORTAL SITE (TOP)" in the step S103, an image illustrated in FIG. 17 is displayed on the display section 304 in the step S104.

FIG. 17 is a view schematically illustrating an image of an outline of a service selected in the step S104 which image is displayed on the display section 304 of the operation device 300. The image of the outline of the service selected is an image M2. The image M2 is an image illustrating an outline of a front page of a comprehensive search site. Thus, in a case where site access image data 3A including this image is transmitted to the display processing device 200, processing is carried out for accessing the front page of the comprehensive search site.

In a case where the user presses a "TRANSMIT TO TELEVISION" button M3, the operation device 300 transmits site access image data 3A to the display processing device 200. This operation corresponds to the step S109. In a case where the user presses a "TELEVISION POWER" button M4, a remote control signal for switching on the power supply is transmitted to the display processing device 200. This operation corresponds to the step S105.

The buttons M3 and M4 are GUIs which the service display processing section 332 has caused the display section 304 to display.

In FIG. 17, the service display processing section 332 has further caused the display section 304 to display (i) a button M7 for accepting an instruction to transit to the menu screen illustrated in FIG. 16, and (ii) a button M8 for accepting an instruction to display the application.

It is assumed herein that (i) the user can switch focus between the buttons M3 and M4 with use of, for example, the direction keys of the operation section 305, and (ii) the user can, with use of, e.g., the enter key of the operation section 305, press a button on which the focus is placed. It is further assumed that the user can press either of the buttons M7 and M8 by pressing a predetermined key of the operation section 305.

(Processing Procedure 2: Access to Website Requiring Authentication (Login))

The following description deals with a processing procedure for a case in which a user accesses a website which requires authentication (login). More specifically, the description below deals with a case (2-1) in which a user first accesses a website which requires authentication (login) and a case (2-2) in which a user has logged in a website which requires authentication (login), and accesses the website again within a period during which authentication based on a one-time password is still valid.

(Processing Procedure 2-1: A case in which a user first accesses a website)

Figure 18:
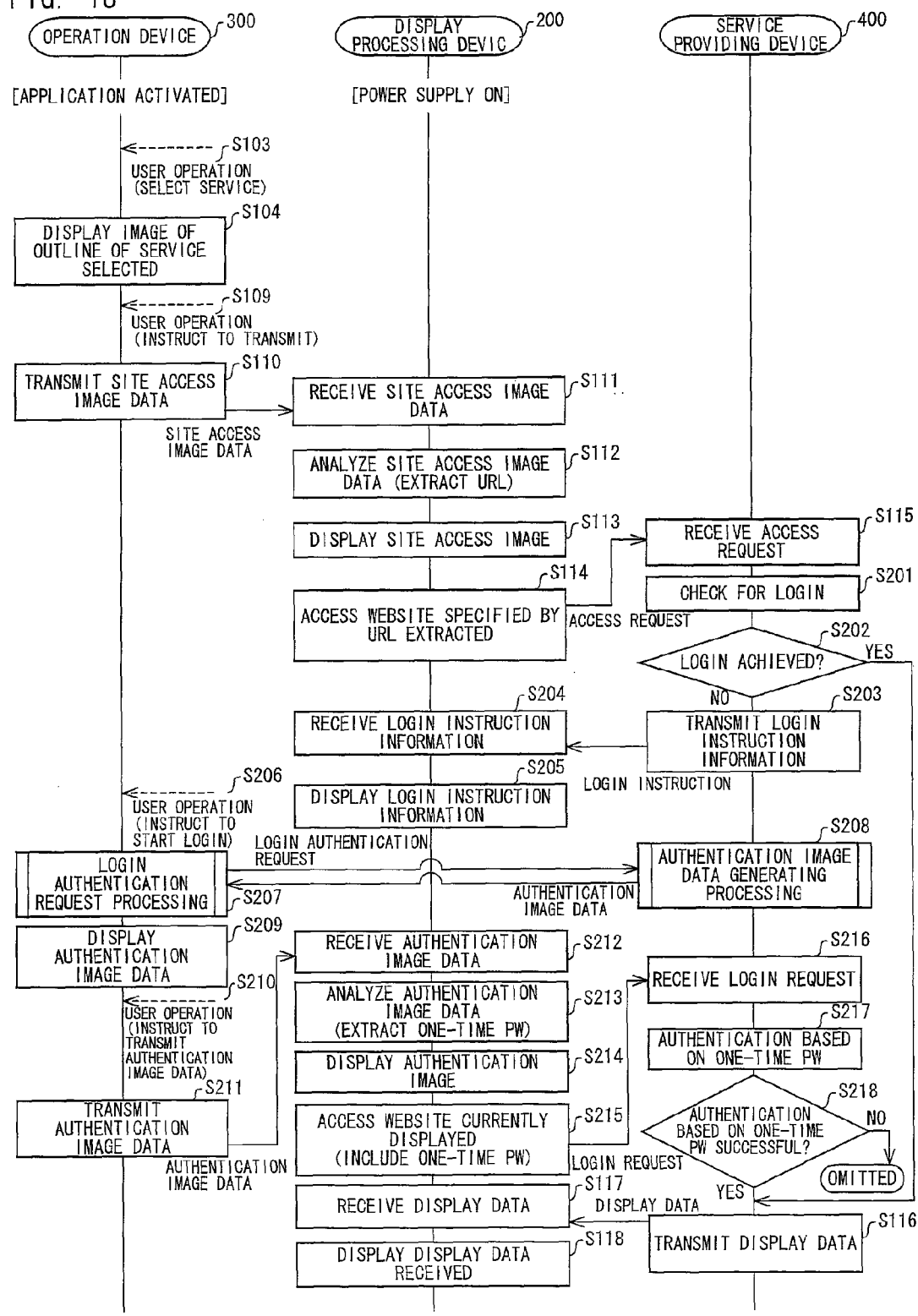
FIG. 18

FIG. 18 is a flowchart illustrating processing carried out by each device in a case where a user first accesses, within the operation system 100, a website which requires authentication (login).

It is assumed herein that (i) the application of the operation device 300 has been activated, and (ii) the power supply of the display processing device 200 is in an on state.

Both (i) steps up to the step S115 and (ii) steps S116 and later are identical to their respective corresponding steps in the above description. The description below thus does not deal with those steps.

After receipt of an access request in the step S115, the access request receiving processing section 432 of the service providing device 400 checks whether the operation device 300 has achieved authentication (login) (S201). If login has not been achieved (NO in S202), the login instruction transmission processing section 433 transmits, to the display processing device 200, login instruction information indicating that login is necessary to use the website (S203).

Upon receipt of the login instruction information (S204), the login instruction receiving processing section 236 of the display processing device 200 causes the display section 204 to display the login instruction information thus received (S205).

The user views the login instruction information displayed on the display section 204. The user then carries out, with use of the operation device 300, an operation for starting login processing in order to start login processing (S206). This operation starts login authentication request processing (S207). The login authentication processing will be described later in detail. When the login authentication processing has been carried out, the operation device 300 transmits a login authentication request to the service providing device 400.

Upon receipt of the login authentication request, the service providing device 400 carries out authentication image data generating processing (S208). When the authentication image data generating processing has been carried out, the service providing device 400 generates a one-time password which allows the user of the operation device 300 to log in a website provided by the service providing device 400. Then, the service providing device 400 transmits, to the operation device 300, authentication image data 3B including, as a processing specifying information item 5, the one-time password generated as above. The authentication image data generating processing will be described later in detail.

It is assumed herein that the authentication image data 3B includes a command name 6 of "AUTHENTICATION" and a parameter 7 indicative of the one-time password for login for the website provided by the service providing device 400. The authentication image data 3B can further include a URL specifying the website provided by the service providing device 400.

Upon receipt of the authentication image data 3B, the image data receiving processing section 335 of the operation device 300 causes the display section 304 to display an image on the basis of image information included in the authentication image data 3B thus received (S209). In this step, the image data receiving processing section 335 of the present embodiment causes the display section 304 to display GUIs (buttons) for accepting various operations by the user. In particular, the image data receiving processing section 335 causes the display section 304 to display a button for accepting an operation to transmit the authentication image data 3B to the display processing device 200.

The user then carries out an operation (for example, presses a button) to transmit the authentication image data 3B, including the image displayed on the display section 304 in the step S209, to the display processing device 200 in order to log in the website provided by the service providing device 400 (S210). In response, the image data transmission processing section 336 of the operation device 300 transmits the authentication image data 3B to the display processing device 200 (S211).

The image data receiving processing section 233 of the display processing device 200 receives the authentication image data 3B (S212). The processing specifying information extraction processing section 234 then analyzes the authentication image data 3B thus received (S213). Specifically, the processing specifying information extraction processing section 234 extracts the processing specifying information item 5 included in the authentication image data 3B received. In this case, the processing specifying information extraction processing section 234 extracts (i) "AUTHENTICATION" as the command name 6 and (ii) the one-time password as the parameter 7.

Then, the image data receiving processing section 233 causes the display section 204 to display the image on the basis of the image information, included in the authentication image data 3B, so that the user can check the authentication image data 3B (S214). Since the command name 6, extracted as above, of the processing specifying information item 5 is "AUTHENTICATION," the login request processing section 2352 transmits a request for login for the website currently displayed (S215). The request thus transmitted includes the one-time password extracted as above. Alternatively, the login request processing section 2352 can transmit the authentication image data 3B itself instead of the one-time password.

Upon receipt of the login request (S216), the login request receiving processing section 437 of the service providing device 400 carries out authentication (login) on the basis of the one-time password transmitted with the login request (S217). If the authentication has been successfully completed (YES in S218), the service providing device 400 transmits display data (for example, HTML data forming a web page, and video content) to be displayed on the display section 204 of the display processing device 200 (S116).

In the case where the login request processing section 2352 transmits the authentication image data 3B instead of the one-time password in the step S215, the login request receiving processing section 437 checks whether the authentication image data 3B received is identical to the authentication image data 3B generated in the step S208. If the authentication image data 3B received is identical to the authentication image data 3B generated in the step S208, the login request receiving processing section 437 analyzes the authentication image data 3B received. Specifically, the login request receiving processing section 437 extracts the processing specifying information item 5 included in the authentication image data 3B received. In this case, the login request receiving processing section 437 extracts (i) "AUTHENTICATION" as the command name 6 and (ii) the one-time password as the parameter 7. The login request receiving processing section 437 carries out authentication (login) on the basis of the one-time password extracted.

If the authentication has been successfully completed (YES in S218), the service providing device 400 transmits display data (for example, HTML data forming a web page, and video content) to be displayed on the display section 204 of the display processing device 200 (S116).

In the step S214, the image data receiving processing section 233 causes the display section 204 to display the image so that the user can check the authentication image data 3B received. The step S214 can, however, be omitted if the user has checked the authentication image data 3B with use of the operation device 300 and thus does not need to check the authentication image data 3B again on the display section 204.

(Login Authentication Request Processing and Authentication Image Data Generating Processing)

Figure 19:
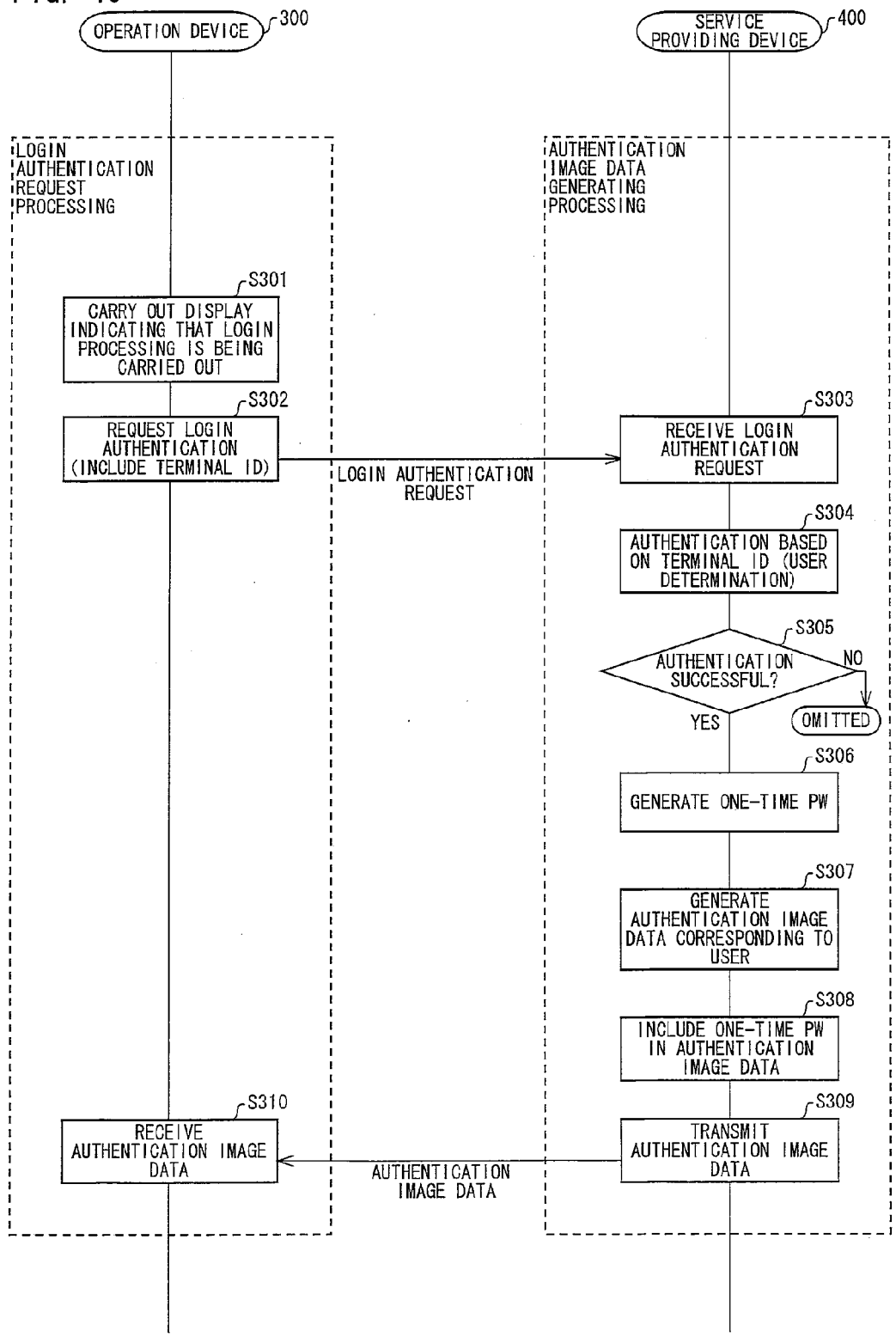
FIG. 19

The following description deals with the login authentication request processing in the step S207 and the authentication image data generating processing procedure in the step S208. FIG. 19 is a flowchart illustrating the login authentication request processing and the authentication image data generating processing procedure.

After the user has carried out an operation to start login processing with use of the operation device 300 in the step S206, the login authentication request processing section 334 causes the display section 304 to carry out a display indicating that login processing is being carried out (S301), and transmits a login authentication request to the service providing device 400 (S302). The login authentication request thus transmitted includes a terminal ID of the operation device 300.

Upon receipt of the login authentication request (S303), the authentication request receiving processing section 434 of the service providing device 400 carries out terminal authentication by checking whether the terminal ID transmitted with the login authentication request has been registered in the terminal/user information storage section 474 (S304).

If the terminal authentication has been successfully completed (YES in S305), the one-time PW generating processing section 435 generates a one-time password (S306). Then, the image data generating processing section 436 generates authentication image data 3B including an image corresponding to the user of the operation device 300 which has transmitted the login authentication request (S307). In other words, the image data generating processing section 436 generates authentication image data 3B on the basis of a template for the user of the operation device 300 which has transmitted the login authentication request. The image data generating processing section 436 further (i) obtains user-related information which is stored in the user-related information storage section 478 in association with the terminal ID included in the login authentication request, and (ii) causes an image including the user-related information to be included in the image region 610 of the authentication image data 3B.

The image data generating processing section 436 then causes a processing specifying information item 5 of the above-generated authentication image data 3B to include "AUTHENTICATION" as a command name 6 and the above-generated one-time password as the parameter 7 (S308). The image data generating processing section 436 can further cause the processing specifying information item 5 to include a URL specifying a website provided by the service providing device 400.

The image data generating processing section 436 then transmits, to the operation device 300, the authentication image data 3B which has included the above items (S309). The image data receiving processing section 335 of the operation device 300 receives the authentication image data 3B thus transmitted (S310).

Through the above procedure, the operation device 300 can obtain a one-time password, included in authentication image data 3B, which is necessary to log in a website provided by the service providing device 400 and which is issued by the service providing device 400.

(Screen Example)

Figure 20:
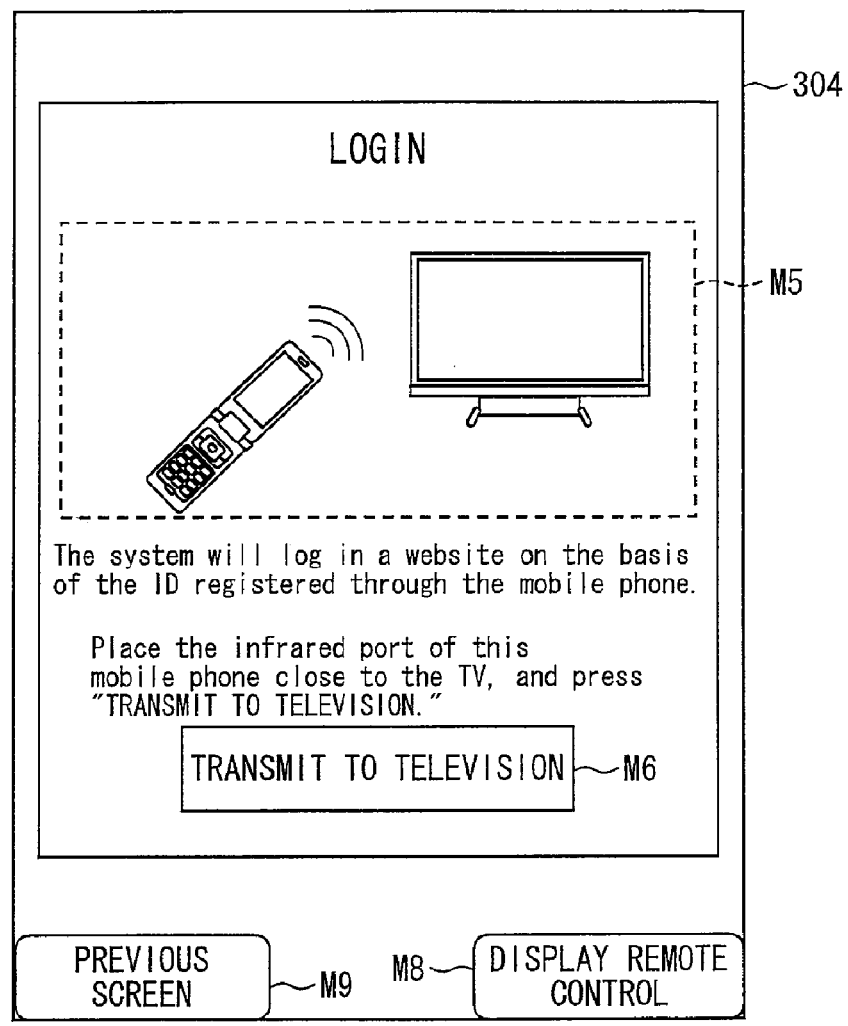
FIG. 20

With reference to FIG. 20, the following description deals with an example screen displayed on the display section 304 of the operation device 300. FIG. 20 is a view schematically illustrating an image displayed on the display section 304 on the basis of image information included in the authentication image data 3B. The image displayed on the display section 304 on the basis of the image information included in the authentication image data 3B is an image M5. The image M5 is an image indicating that login can be achieved by transmitting the image data to the display processing device 200.

The image M5 is displayed on the display section 304 on the basis of user image information. The user image information is obtained from the user-related information storage section 478 of the service providing device 400. The user image information is (i) read from the user-related information storage section 478 when the image data generating processing section 436 of the service providing device 400 generates the authentication image data 3B, and (ii) included in the image region 610 of the authentication image data 3B.

In a case where the user presses a "TRANSMIT TO TELEVISION" button M6, the operation device 300 transmits the authentication image data 3B to the display processing device 200. This operation corresponds to the step S210. The button M6 is a GUI which the image data receiving processing section 335 has caused the display section 304 to display.

In FIG. 20, the image data receiving processing section 335 has further caused the display section 304 to display (i) a button M9 for accepting an instruction to transit to a previous screen, and (ii) a button M8 for accepting an instruction to display the application.

It is assumed herein that (i) the user can place focus on the button M6 with use of, for example, the direction keys of the operation section 305, and (ii) the user can, with use of, e.g., the enter key of the operation section 305, press a button on which the focus is placed. It is further assumed that the user can press either of the buttons M8 and M9 by pressing a predetermined key of the operation section 305.

(Processing Procedure 2-2: A Case in which a User Accesses a Website Again within a Period During which Authentication is Valid)

Figure 21:
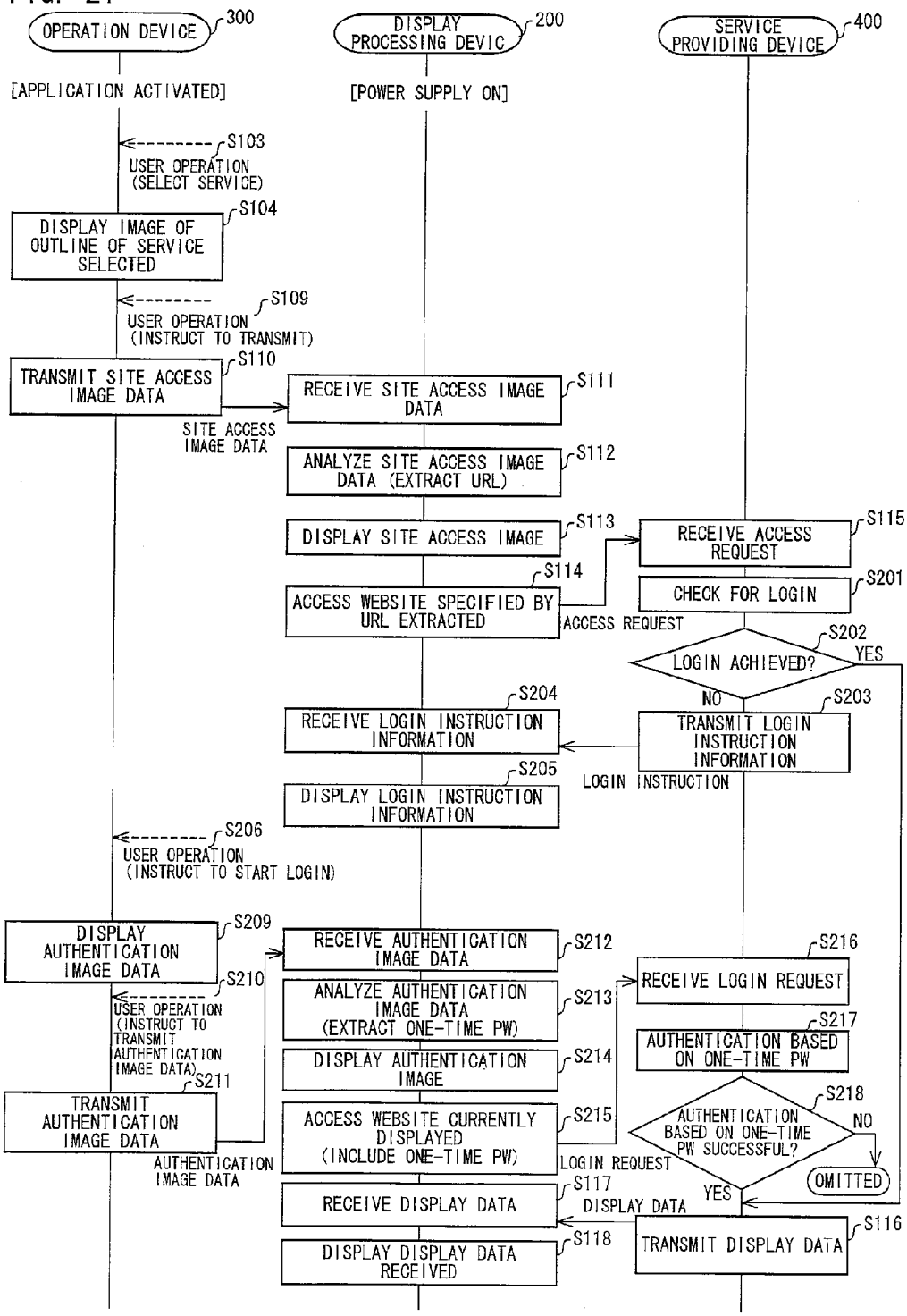
FIG. 21

FIG. 21 is a flowchart illustrating processing carried out by each device in a case where a user has logged in, within the operation system 100, a website which requires authentication (login), and accesses the website again within a period during which authentication based on a one-time password is still valid.

It is assumed herein that (i) the application of the operation device 300 has been activated, and (ii) the power supply of the display processing device 200 is in an on state.

Both (i) steps up to the step S206 and (ii) steps S210 and later are identical to their respective corresponding steps in the above description. The description below thus does not deal with those steps.

The user carries out an operation to start login processing with use of the operation device 300 in the step S206. Then, if a valid period (for example, for 2 minutes) of the one-time password, which is included in the authentication image data 3B and which is used for the previous login, has not elapsed, the login authentication request processing section 334, instead of starting login authentication request processing as in the step S207, causes the display section 304 to display an image on the basis of the image information included in the authentication image data 3B previously received (S209). After this step, the user logs in the website, provided by the service providing device 400, through a corresponding procedure illustrated in the flowchart of FIG. 18. Note that the user cannot log in the website if authentication based on the one-time password fails in the step S217 (that is, if the valid period of the one-time password has elapsed). In this case, the user carries out login authentication request processing again so as to (i) obtain, from the service providing device 400, authentication image data 3B including a new one-time password, and thus (ii) achieve login.

[Embodiment 2]

The present embodiment is an embodiment in which a user achieves login for a website, provided by the service providing device 400, simultaneously with access to the website.

The embodiment of the present invention will now be described with reference to FIGS. 22 through 24. A description of matters which are described in Embodiment 1 is omitted here.

(More Detailed Configuration of Each Device)

Figure 22:
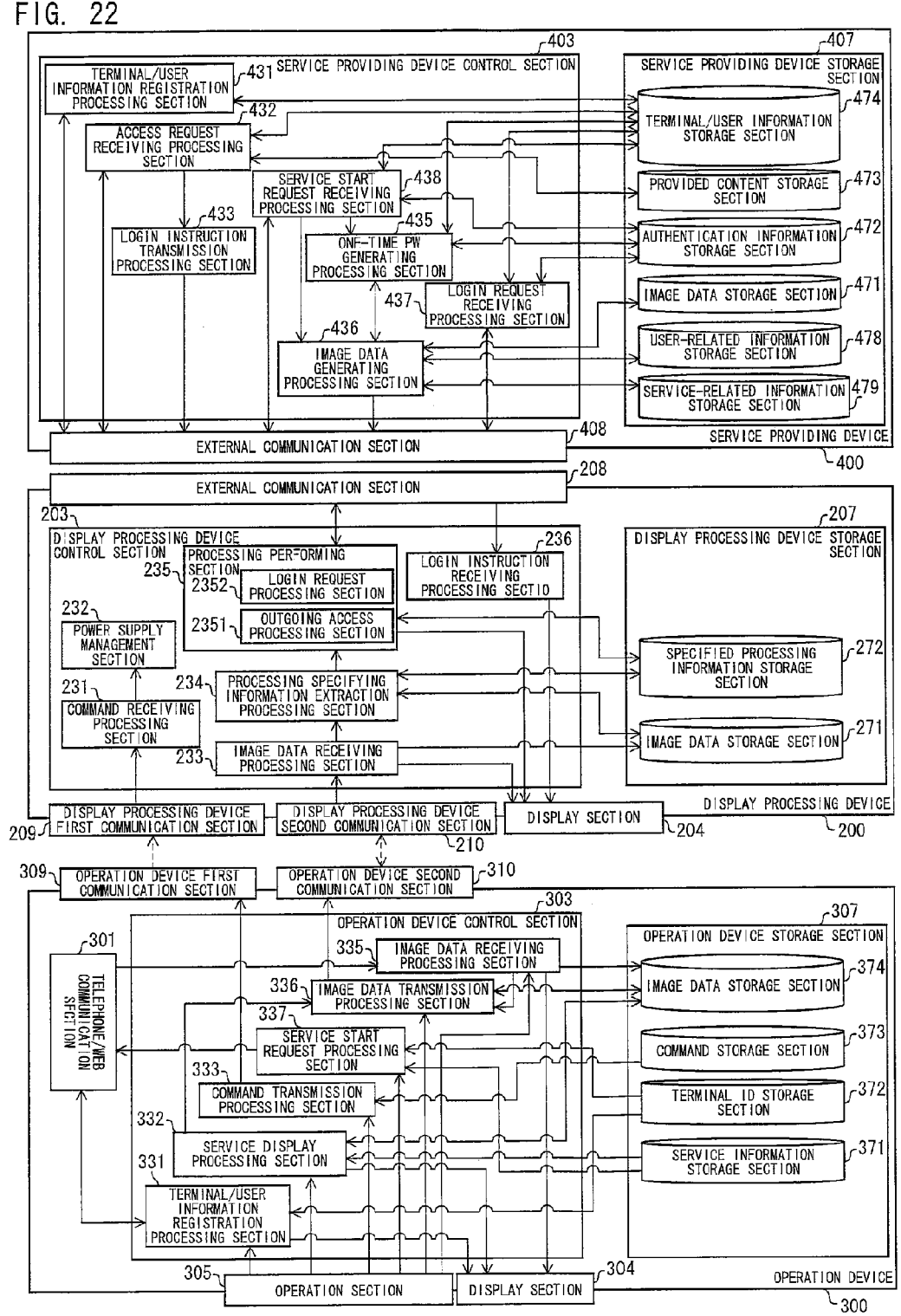
FIG. 22

With reference to FIG. 22, the following description deals in more detail with the configuration of each of the display processing device 200, the operation device 300, and the service providing device 400 according to the present embodiment. FIG. 22 is a block diagram illustrating an essential configuration of each of the display processing device 200, the operation device 300, and the service providing device 400 according to the present embodiment. The display processing device 200 of the present embodiment has an arrangement identical to the arrangement of the display processing device 200 of Embodiment 1, and is thus not described here.

(More Detailed Configuration of Operation Device)

The operation device 300 of the present embodiment has an arrangement identical to the arrangement of the operation device 300 of Embodiment 1, except that the operation device control section 303 of the operation device 300 of the present embodiment includes a service start request processing section 337 instead of the login authentication request processing section 334.

The service start request processing section 337 transmits a service start request to the service providing device 400 via the telephone/web communication section 301 in response to an operation by a user to start a service. The service start request is transmitted to the service providing device 400 so as to request transmission of authentication information-attached site access image data 3C including (i) a URL for use in access to a website corresponding to a service, and (ii) a one-time password necessary for authentication (login) achieved when the website is accessed. The service start request thus transmitted includes (i) a terminal ID of the operation device 300 and (ii) information (service ID) for identification of the service. The terminal ID is obtained from the terminal ID storage section 372, whereas the service ID is obtained from the service information storage section 371.

(More Detailed Configuration of Service Providing Device)

The service providing device 400 of the present embodiment has an arrangement identical to the arrangement of the service providing device 400 of Embodiment 1, except that (i) the service providing device storage section 407 of the service providing device 400 of the present embodiment further includes a service-related information storage section 479, and (ii) the service providing device control section 403 of the service providing device 400 of the present embodiment includes a service start request receiving processing section 438 instead of the authentication request receiving processing section 434.

The service-related information storage section 479 stores information (hereinafter referred to also as "service-related information"), which is about services provided by the service providing device 400, for each service in association with its service ID. The service-related information stands for (i) text information about services (hereinafter referred to also as "service text information") and (ii) image information about services (hereinafter referred to also as "service image information").

Specific examples of the service text information include: a service name; and an outline of the service. The service text information is, however, not limited to these, and can thus be any text information about the services.

Specific examples of the service image information include: an image indicative of a service name; an image of a logo for the service; an image indicative of an outline of the service; and an image of an icon with which the service is identifiable. The service image information is, however, not limited to these, and can thus be any image information about the services.

Note that the service-related information storage section 479 can store, for each service, either a single item of service-related information or a plurality of items of service-related information.

It is assumed herein that the service-related information has been registered in the service-related information storage section 479 in advance by, for example, a service providing company which owns the service providing device 400.

The service start request receiving processing section 438, upon receipt of a service start request from the service start request processing section 337 of the operation device 300, first carries out terminal authentication by checking whether a terminal ID included in the service start request received has been registered in the terminal/user information storage section 474. If the terminal authentication has been successfully completed, the service start request receiving processing section 438 causes the one-time PW generating processing section 435 to generate a one-time password for authentication (login), and further causes the image data generating processing section 436 to generate authentication information-attached site access image data 3C.

The one-time PW generating processing section 435 of the present embodiment generates a one-time password for authentication (login) in response to an instruction from the service start request receiving processing section 438.

The image data generating processing section 436 of the present embodiment generates authentication information-attached site access image data 3C which includes the one-time password generated by the one-time PW generating processing section 435. The image data generating processing section 436 generates the authentication information-attached site access image data 3C on the basis of a template stored in the image data storage section 471. In other words, the image data generating processing section 436 generates authentication information-attached site access image data 3C prepared by adding, to a template stored in the image data storage section 471, a processing specifying information item 5C which includes the one-time password generated by a one-time PW generating processing section 435.

As in Embodiment 1, in the case where the image data storage section 471 stores a template for each user, the image data generating processing section 436 of the present embodiment generates authentication information-attached site access image data 3C on the basis of a template for a user of the operation device 300 which has transmitted the service start request. The user of the operation device 300 which has transmitted the service start request can be identified on the basis of a user name obtained by searching through the terminal/user information storage section 474 while using, as a key, the terminal ID of the operation device 300 included in the service start request. The image data generating processing section 436 thus generates authentication information-attached site access image data 3C on the basis of a template which is stored in the image data storage section 471 in association with the user name obtained.

The image data generating processing section 436 can also generate authentication information-attached site access image data 3C, customized for each user, by causing (i) user-related information stored in the user-related information storage section 478 and (ii) service-related information stored in the service-related information storage section 479 to be included in the authentication information-attached site access image data 3C. For example, the image data generating processing section 436 can further generate, for each user, an image to be included in the authentication information-attached site access image data 3C. The image data generating processing section 436 can, for example, generate (i) an image indicative of a user name, or an image (avatar) representative of the user, (ii) an image of a name of a service which the user is attempting to log in, or an image of an icon with which such a service is identifiable, and/or (iii) an image indicative of, for example, an operation currently available for the user.

Specifically, like in Embodiment 1, the image data generating processing section 436 of the present embodiment obtains user-related information which is stored in the user-related information storage section 478 in association with the terminal ID included in the service start request. The image data generating processing section 436 then causes an image including the user-related information, obtained as above, to be included in an image region 610 of the authentication information-attached site access image data 3C.

Examples of the "image including the user-related information" include those in Embodiment 1. Specifically, in a case where the user-related information obtained is user text information, the "image including the user-related information" is, for example, an image in which the user text information obtained is displayed so as to be superimposed over a predetermined region of a predetermined image.

In a case where the user-related information obtained is user image information, the "image including the user-related information" is, for example, an image itself which is displayed on the basis of the user image information obtained, or an image in which the image displayed on the basis of the user image information obtained is superimposed over a predetermined region of a predetermined image. The predetermined image and the predetermined region can, for example, be either preset, or registered in the service providing device 400 by the user.

In addition, to use service-related information stored in the service-related information storage section 479, the image data generating processing section 436 of the present embodiment obtains service-related information which is stored in the service-related information storage section 479 in association with the service ID included in the service start request. The image data generating processing section 436 then causes an image including the service-related information, obtained as above, to be included in the image region 610 of the authentication information-attached site access image data 3C.

Examples of the "image including the service-related information" are as follows: In a case where the service-related information obtained is service text information, the "image including the service-related information" is, for example, an image in which the service text information obtained is displayed so as to be superimposed over a predetermined region of a predetermined image.

In a case where the service-related information obtained is service image information, the "image including the service-related information" is, for example, an image itself which is displayed on the basis of the service image information obtained, or an image in which the image displayed on the basis of the service image information obtained is superimposed over a predetermined region of a predetermined image. The predetermined image and the predetermined region can, for example, be either preset, or registered in the service providing device 400 by the user.

In a case where a plurality of items of service-related information are obtainable from the service-related information storage section 479, the image data generating processing section 436 can generate either an image including any of the plurality of items of service-related information or an image including all the plurality of items of service-related information.

The image data generating processing section 436 of the present embodiment transmits the authentication information-attached site access image data 3C, generated as above, to the operation device 300 via the external communication section 408.

(Processing Procedure)

Figure 23:
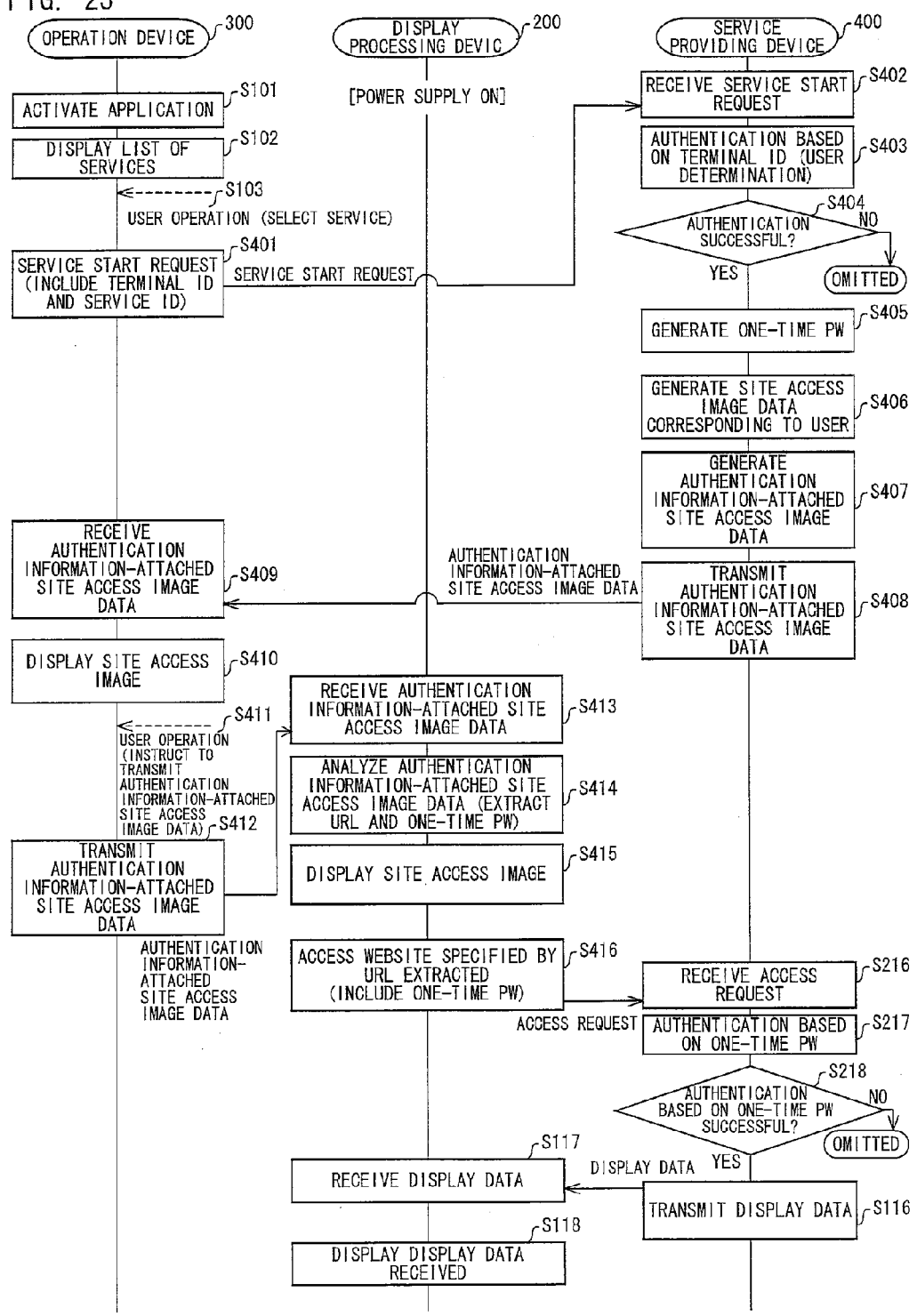
FIG. 23
Figure 24:
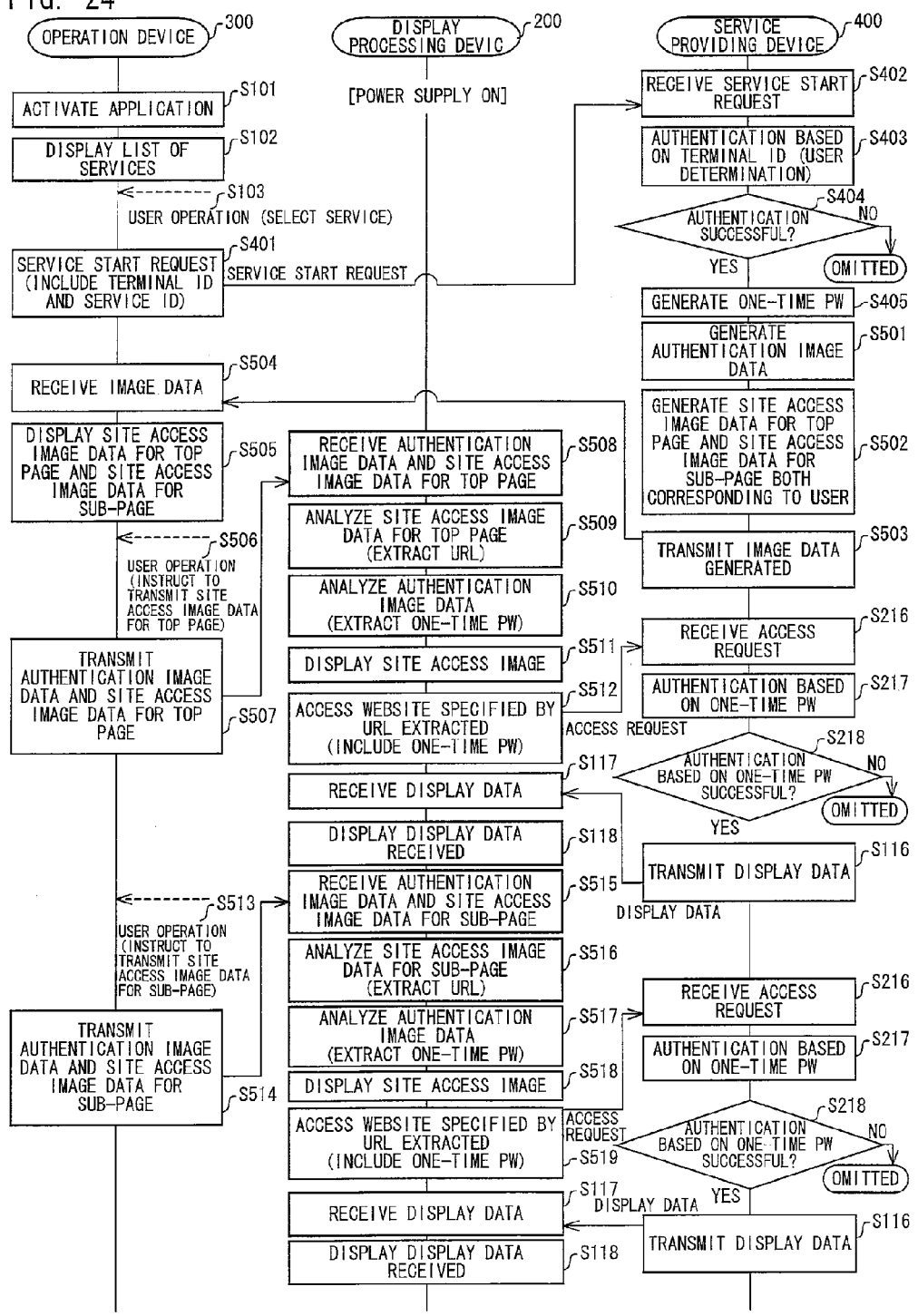
FIG. 24

With reference to FIGS. 23 and 24, the following description deals with procedures for processing carried out by each device in a case where a user accesses a website within the operation system 100 of the present embodiment. The description below deals with (i) a processing procedure for a case in which the service providing device 400, in response to a service start request from the operation device 300, provides a single item of authentication information-attached site access image data 3C, and (ii) a processing procedure for a case in which the service providing device 400, in response to a service start request from the operation device 300, provides authentication image data 3B and two items of site access image data 3A.

(Processing Procedure 1: A Case in which the Service Providing Device 400 Provides a Single Item of Authentication Information-Attached Site Access Image Data 3C)

FIG. 23 is a flowchart illustrating processing carried out by each device to access a website in a case where the service providing device 400, in response to a service start request from the operation device 300, provides a single item of authentication information-attached site access image data 3C.

It is assumed herein that (i) user registration processing has been completed, and (ii) the power supply of the display processing device 200 is in an on state. Further, steps up to the step S103 are identical to those described in Embodiment 1.

To establish access to a website (service) selected in the step S103, the service start request processing section 337 transmits a service start request to the service providing device 400 (S401). The service start request thus transmitted includes (i) a terminal ID of the operation device 300 and (ii) information (service ID) for identification of the service selected.

Upon receipt of the service start request, the service start request receiving processing section 438 carries out terminal authentication by checking whether the terminal ID with the service start request has been registered in the terminal/user information storage section 474 (S403).

If the terminal authentication has been successfully completed (YES in S404), the one-time PW generating processing section 435 generates a one-time password (S405). Next, the image data generating processing section 436 generates an image corresponding to the user of the operation device 300 which has transmitted the service start request (S406). The image data generating processing section 436 then generates authentication information-attached site access image data 3C including (i) the image thus generated, (ii) a first processing specifying information item 5 including a command name 6 of "SITE ACCESS" and a parameter 7 indicative of a URL specifying a website, and (iii) a second processing specifying information item 5 including a command name 6 of "AUTHENTICATION" and a parameter 7 indicative of the one-time password generated as above (S407). The image data generating processing section 436 then transmits the authentication information-attached site access image data 3C thus generated to the operation device 300 (S408).

Note that in the step S406, the image data generating processing section 436 obtains (i) user-related information which is stored in the user-related information storage section 478 in association with the terminal ID included in the service start request, and (ii) service-related information which is stored in the service-related information storage section 479 in association with the service ID included in the service start request. The image data generating processing section 436 then causes an image including the thus obtained user-related information and service-related information to be included in an image region 610 of the authentication information-attached site access image data 3C.

The operation device 300 receives the authentication information-attached site access image data 3C (S409). The image data receiving processing section 335 of the present embodiment then causes the display section 304 to display an image on the basis of image information included in the authentication information-attached site access image data 3C (S410). Simultaneously with the displaying of the image, the image data receiving processing section 335 of the present embodiment causes the display section 304 to display GUIs (for example, buttons) for accepting various operations by the user. In particular, the image data receiving processing section 335 causes the display section 304 to display a GUI (for example, a button) for accepting an operation to transmit the authentication information-attached site access image data 3C to the display processing device 200.

Next, the user carries out an operation (for example, presses a button) to transmit the authentication information-attached site access image data 3C, including the image displayed on the display section 304 in the step S410, to the display processing device 200 in order to access the website provided by the service providing device 400 (S411). In response, the image data transmission processing section 336 transmits the authentication information-attached site access image data 3C to the display processing device 200 (S412).

Upon receipt of the authentication information-attached site access image data 3C (S413), the processing specifying information extraction processing section 234 of the display processing device 200 analyzes the authentication information-attached site access image data 3C thus received (S414). Specifically, the processing specifying information extraction processing section 234 extracts the processing specifying information items 5 included in the authentication information-attached site access image data 3C. Specifically, the processing specifying information extraction processing section 234 in this case extracts (i) the first processing specifying information item 5 whose command name 6 is "SITE ACCESS" and whose parameter 7 indicates the URL, and (ii) the second processing specifying information item 5 whose command name 6 is "AUTHENTICATION" and whose parameter 7 indicates the one-time password.

Then, the image data receiving processing section 233 causes the display section 204 to display the image on the basis of the image information, included in the authentication information-attached site access image data 3C, so that the user can check the authentication information-attached site access image data 3C (S415). Further, since the command name 6, extracted as above, of the first processing specifying information item 5 is "SITE ACCESS," the outgoing access processing section 2351 transmits a request for access to the website specified by the URL extracted (S416). The request thus transmitted for access to the website includes the one-time password, extracted as above, so as to achieve login simultaneously with the access. Alternatively, the outgoing access processing section 2351 can transmit the authentication information-attached site access image data 3C itself instead of the one-time password. Steps after the step S416 are identical to the respective steps S216 to S218 and S116 to S118 described in Embodiment 1.

In the case where the login request processing section 2352 transmits the authentication information-attached site access image data 3C in the step S416, the login request receiving processing section 437 checks in the step S217 whether the authentication information-attached site access image data 3C received is identical to the authentication information-attached site access image data 3C generated in the step S407. If the authentication information-attached site access image data 3C received is identical to the authentication information-attached site access image data 3C generated in the step S407, the login request receiving processing section 437 analyzes the authentication information-attached site access image data 3C received. Specifically, the login request receiving processing section 437 extracts the processing specifying information items 5 included in the authentication information-attached site access image data 3C received. The login request receiving processing section 437 in this case extracts (i) "AUTHENTICATION" as the command name 6 and (ii) the one-time password as the parameter 7 from the second processing specifying information item 5. The login request receiving processing section 437 carries out authentication (login) on the basis of the one-time password extracted.

Through the above procedure, the user of the operation device 300 can achieve login for a website simultaneously with access to the website.

(Processing Procedure 2: A Case in which the Service Providing Device 400 Provides Authentication Image Data 3B and Two Items of Site Access Image Data 3A)

FIG. 24 is a flowchart illustrating processing carried out by each device to access a website in a case where the service providing device 400, in response to a service start request from the operation device 300, provides authentication image data 3B and two items of site access image data 3A.

It is assumed herein that (i) user registration processing has been completed, and (ii) the power supply of the display processing device 200 is in an on state. Further, steps up to the step S405 are identical to those shown in FIG. 23.

In the step S405, the one-time PW generating processing section 435 generates a one-time password. Then, the image data generating processing section 436 first generates (i) authentication image data 3B including the one-time password thus generated (S501), and (ii) two items of site access image data 3A corresponding to the user (S502). It is assumed herein that the image data generating processing section 436 generates (i) a first item of site access image data 3A including a URL of a front page of the website and (ii) a second item of site access image data 3A including a URL of a sub-page of the website. The image data generating processing section 436 transmits the image data, generated as above, to the operation device 300 (S503).

Upon receipt of the image data transmitted as above (S504), the image data receiving processing section 335 of the operation device 300 first causes the display section 304 to display (i) an image (hereinafter referred to as "front page image") on the basis of image information included in the first item of site access image data 3A which includes the URL of the front page of the website, and (ii) an image (hereinafter referred to as "sub-page image") on the basis of image information included in the second item of site access image data 3A which includes the URL of the sub-page of the website (S505). Simultaneously with the displaying of the images, the image data receiving processing section 335 of the present embodiment causes the display section 304 to display GUIs (buttons) for accepting various operations by the user. In particular, the image data receiving processing section 335 causes the display section 304 to display (i) a button (hereinafter referred to as "BT") for transmitting, to the display processing device 200, the first item of site access image data 3A including the URL of the front page of the website, and (ii) a button (hereinafter referred to as "BS") for transmitting, to the display processing device 200, the second item of site access image data 3A including the URL of the sub-page of the website.

Next, in a case where the user carries out an operation (i.e., presses the button BT) to transmit the first item of site access image data 3A, including the front page image displayed on the display section 304 in the step S505, to the display processing device 200 in order to access the front page of the website provided by the service providing device 400 (S506), the image data transmission processing section 336, in response, transmits the first item of site access image data 3A and the authentication image data 3B to the display processing device 200 (S507).

Upon receipt of the first item of site access image data 3A and the authentication image data 3B (S508), the display processing device 200 first analyzes the first item of site access image data 3A thus received (S509). Specifically, the processing specifying information extraction processing section 234 extracts a processing specifying information item 5 included in the site access image data 3A received. In this step, the processing specifying information extraction processing section 234 obtains the URL of the front page of the website.

The display processing device 200 then analyzes the authentication image data 3B received as above (S510). Specifically, the processing specifying information extraction processing section 234 extracts a processing specifying information item 5 included in the authentication image data 3B. In this step, the processing specifying information extraction processing section 234 obtains the one-time password.

Then, the image data receiving processing section 233 causes the display section 204 to display an image on the basis of the image information, included in the first item of site access image data 3A, so that the user can check the first item of site access image data 3A (S511). Further, the outgoing access processing section 2351 transmits a request for access to the website specified by the URL extracted (S512). The request thus transmitted for access to the website includes the one-time password, extracted as above, so as to achieve login simultaneously with the access. Alternatively, the outgoing access processing section 2351 can transmit the authentication image data 3B itself instead of the one-time password. Steps after the step S512 are identical to the respective steps S216 to S218 and S116 to S118 described in Embodiment 1.

In the case where the login request processing section 2352 transmits the authentication image data 3B in the step S512, the login request receiving processing section 437 checks in the step S217 whether the authentication image data 3B received is identical to the authentication image data 3B generated in the step S501. If the authentication image data 3B received is identical to the authentication image data 3B generated in the step S501, the login request receiving processing section 437 analyzes the authentication image data 3B received. Specifically, the login request receiving processing section 437 extracts the processing specifying information item 5 included in the authentication image data 3B received. In this case, the login request receiving processing section 437 extracts (i) "AUTHENTICATION" as the command name 6 and (ii) the one-time password as the parameter 7. The login request receiving processing section 437 carries out authentication (login) on the basis of the one-time password extracted.

In a case where the user carries out an operation (i.e., presses the button BS) to transmit the second item of site access image data 3A, including the sub-page image displayed on the display section 304 in the step S505, to the display processing device 200 in order to access the sub-page of the website provided by the service providing device 400 (S513), the image data transmission processing section 336, in response, transmits the second item of site access image data 3A and the authentication image data 3B to the display processing device 200 (S514).

Upon receipt of the second item of site access image data 3A and the authentication image data 3B (S515), the display processing device 200 first analyzes the second item of site access image data 3A thus received (S516). Specifically, the processing specifying information extraction processing section 234 extracts a processing specifying information item 5 included in the site access image data 3A received. In this step, the processing specifying information extraction processing section 234 obtains the URL of the sub-page of the website.

The display processing device 200 then analyzes the authentication image data 3B received as above (S517). Specifically, the processing specifying information extraction processing section 234 extracts a processing specifying information item 5 included in the authentication image data 3B. In this step, the processing specifying information extraction processing section 234 obtains the one-time password.

Then, the image data receiving processing section 233 causes the display section 204 to an image on the basis of the image information, included in the second item of site access image data 3A, so that the user can check the second item of site access image data 3A (S518). Further, the outgoing access processing section 2351 transmits a request for access to the website specified by the URL extracted (S519). The request thus transmitted for access to the website includes the one-time password, extracted as above, so as to achieve login simultaneously with the access. Alternatively, the outgoing access processing section 2351 can transmit the authentication image data 3B itself instead of the one-time password. Steps after the step S512 are identical to the respective steps S216 to S218 and S116 to S118 described in Embodiment 1.

In the case where the login request processing section 2352 transmits the authentication image data 3B in the step S519, the login request receiving processing section 437 checks in the step S217 whether the authentication image data 3B received is identical to the authentication image data 3B generated in the step S501. If the authentication image data 3B received is identical to the authentication image data 3B generated in the step S501, the login request receiving processing section 437 analyzes the authentication image data 3B received. Specifically, the login request receiving processing section 437 extracts the processing specifying information item 5 included in the authentication image data 3B received. In this case, the login request receiving processing section 437 extracts (i) "AUTHENTICATION" as the command name 6 and (ii) the one-time password as the parameter 7. The login request receiving processing section 437 carries out authentication (login) on the basis of the one-time password extracted.

Through the above procedure, the user of the operation device 300 can achieve login for a website simultaneously with access to the website.

[Embodiment 3]

The present embodiment is an embodiment in which for a purchase of content on a website, authentication is carried out in the service providing device 400 by transmitting image data from the operation device 300 to the display processing device 200.

The embodiment of the present invention will now be described with reference to FIGS. 25 and 26. A description of matters which are described in Embodiment 1 or 2 is omitted here.

(More Detailed Configuration of Each Device)

Figure 25:
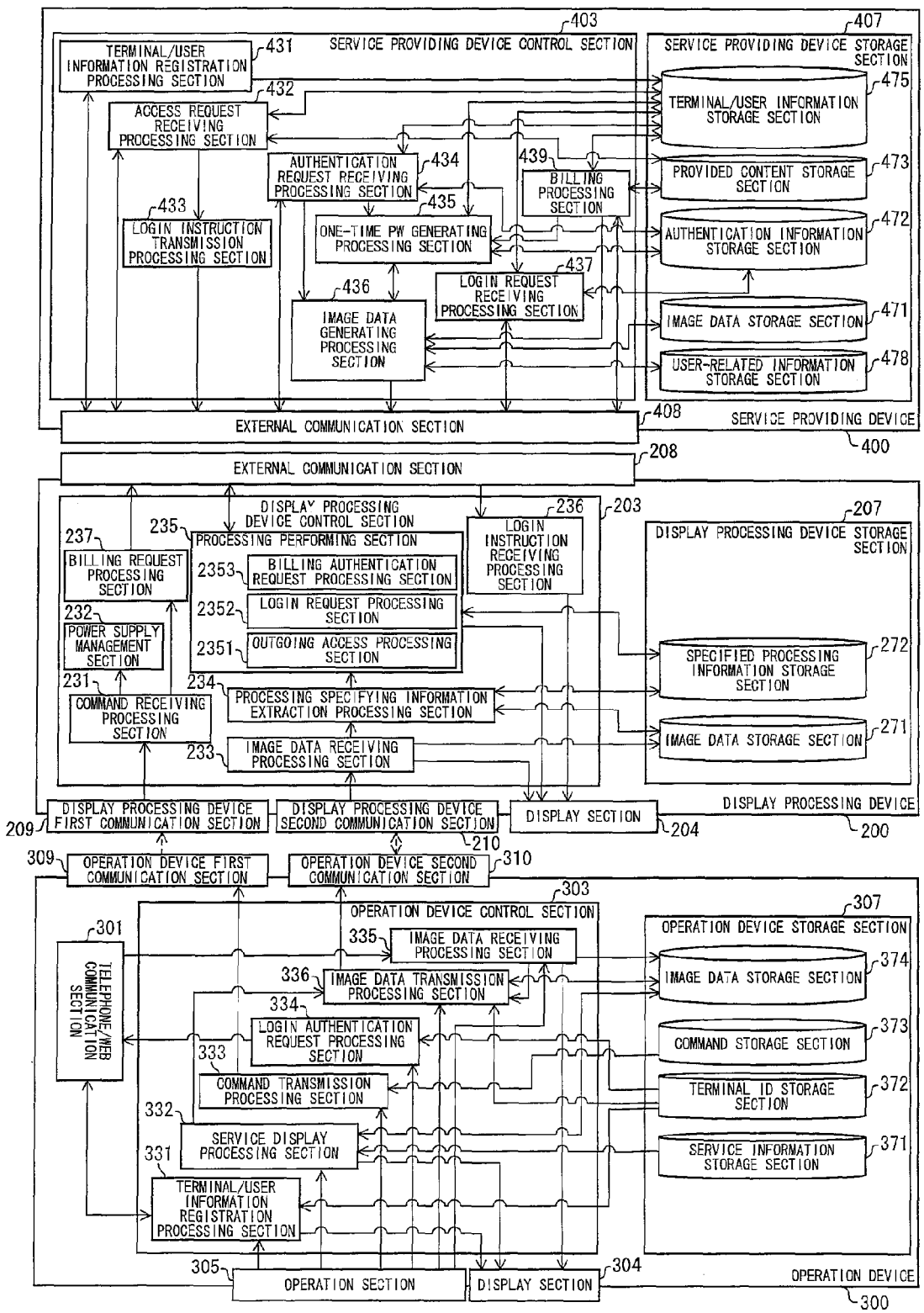
FIG. 25

With reference to FIG. 25, the following description deals in more detail with the configuration of each of the display processing device 200, the operation device 300, and the service providing device 400 according to the present embodiment. FIG. 25 is a block diagram illustrating an essential configuration of each of the display processing device 200, the operation device 300, and the service providing device 400 according to the present embodiment. The operation device 300 of the present embodiment has an arrangement identical to the arrangement of the operation device 300 of Embodiment 1, and is thus not described here.

(More Detailed Configuration of Display Processing Device)

The display processing device 200 of the present embodiment has an arrangement identical to the arrangement of the display processing device 200 of Embodiment 1, except that (i) the display processing device control section 203 of the display processing device 200 of the present embodiment further includes a billing request processing section 237, and (ii) the processing performing section 235 of the display processing device 200 of the present embodiment further includes a billing authentication request processing section 2353.

The billing request processing section 237, in a case where a remote control signal received by the command receiving processing section 231 is a signal indicating a purchase of content, transmits a request (purchase request) for a purchase of content to the service providing device 400 in response to an instruction from the command receiving processing section 231.

The billing authentication request processing section 2353 transmits (i) a one-time password and (ii) a terminal ID of the operation device 300, each of which is extracted from a processing specifying information item 5 of purchase image data 3D by the processing specifying information extraction processing section 234, to the service providing device 400 as authentication data for use in a content purchase. In a case where a URL is additionally extracted from a processing specifying information item 5 of the purchase image data 3D, the billing authentication request processing section 2353 transmits the one-time password and the terminal ID of the operation device 300 to a server or the like specified by the URL. The billing authentication request processing section 2353 can transmit image data, prepared by adding the processing specifying information items 5 to image data stored in the image data storage section 271, to the service providing device 400 as the authentication data for use in a content purchase instead of the one-time password and the terminal ID of the operation device 300.

(More Detailed Configuration of Service Providing Device)

The service providing device 400 of the present embodiment has an arrangement identical to the arrangement of the service providing device 400 of Embodiment 1, except that (i) the service providing device control section 403 of the service providing device 400 of the present embodiment further includes a billing processing section 439, and (ii) the service providing device storage section 407 of the service providing device 400 of the present embodiment includes a terminal/user information storage section 475 instead of the terminal/user information storage section 474.

The terminal/user information storage section 475 has an extended data structure in comparison with the terminal/user information storage section 474. In addition to the data stored in the terminal/user information storage section 474 (that is, a terminal ID of an operation device 300; a name of a user of the operation device 300; a date and time at which the user last accessed content; and a date and time at which a one-time password for authentication (login) was last issued for the user), the terminal/user information storage section 475 further stores: a date and time at which a one-time password for authentication (purchase) for use in a purchase of content was last issued for the user; and an amount of money available for the user. The terminal/user information storage section 475 can, for example, have a data structure shown in Table 2 below.

TABLE 2

| No | Operation device terminal ID | User name | Last access date and time/content | Last login authentication issue date and time | Last purchase authentication issue date and time | Amount of money available |
|---|---|---|---|---|---|---|
| 1 | 0001 | Taro | 2008/5/27 12:18 Content A | 2008/5/27 12:10 | 2008/5/27 12:12 | ¥1,200 |
| 2 | 0002 | Hanako | 2008/5/27 19:00 Content B | 2008/3/27 19:00 | 2008/3/27 10:00 | ¥3,000 |

An example of Table 2 shows that the terminal/user information storage section 475 stores the following information: (i) A name of a user of an operation device 300 whose terminal ID is "0001" is "Taro"; (ii) Content which the user last accessed is "content A," and a date and time of the access is "May 27, 2008, 12:18"; (iii) A date and time at which a one-time password for authentication (login) was last issued for the user is "May 27, 2008, 12:10"; (iv) A date and time at which a one-time password for authentication (purchase) was last issued for the user is "May 27, 2008, 12:12"; (v) An amount of money available for the user to purchase content is "¥1200."

The billing processing section 439 receives a purchase request from the display processing device 200 and checks an amount of money available for a user who has transmitted the purchase request. If the purchase requires an amount of money which amount is not larger than the amount of money available, the billing processing section 439 carries out settlement processing. The billing processing section 439 further causes (i) the one-time PW generating processing section 435 to generate a one-time password for authentication for use in the purchase and (ii) the image data generating processing section 436 to generate purchase image data 3D.

The image data generating processing section 436 of the present embodiment generates purchase image data 3D which includes the one-time password generated by the one-time PW generating processing section 435. The image data generating processing section 436 then transmits the purchase image data 3D thus generated to the operation device 300 via the external communication section 408.

The image data generating processing section 436 of the present embodiment can cause an image, including user-related information which is stored in the user-related information storage section 478 in association with a terminal ID included in the purchase request, to be included in an image region 610 of the purchase image data 3D.

The login request receiving processing section 437 of the present embodiment, upon receipt of a one-time password and a terminal ID of the operation device 300 from the display processing device 200, carries out authentication processing on the basis of the one-time password and the terminal ID. If the authentication has been successfully completed, the login request receiving processing section 437 carries out content purchase processing, and thus transmits information about the content purchased to the display processing device 200.

(Processing Procedure)

Figure 26:
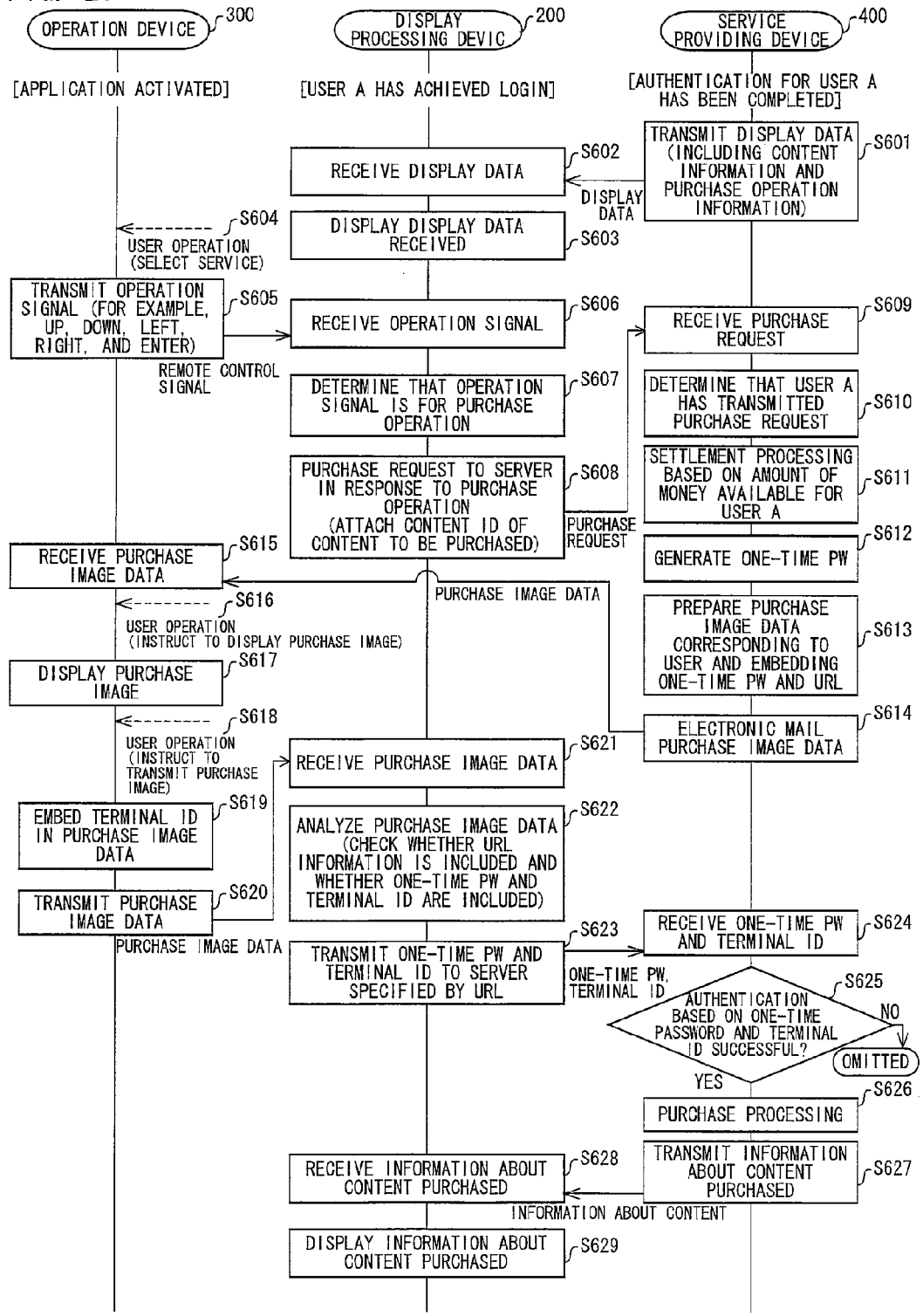
FIG. 26

With reference to FIG. 26, the following description deals with a procedure for processing carried out by each device in a case where, for a purchase of content on a website within the operation system 100 of the present embodiment, authentication (purchase) for the content purchase in the service providing device 400 is carried out by transmitting purchase image data 3D from the operation device 300 to the display processing device 200.

FIG. 26 is a flowchart illustrating a procedure for authentication (purchase) processing carried out when a user purchases content on a website within the operation system 100 of the present embodiment.

It is assumed herein that (i) the application of the operation device 300 has been activated, (ii) authentication for a user A of the operation device 300 has been completed, and (iii) login for the user A has been achieved.

It is first assumed that in a step S601, the service providing device 400 transmits, to the display processing device 200, (i) information about content and (ii) information about a purchase operation, as display data (S601). Upon receipt of the display data (S602), the display processing device 200 causes the display section 204 to display the display data (S603).

The user A, while viewing the display data displayed on the display section 204, carries out an operation to select a service with use of the operation device 300 (S604). Then, the user A presses, for example, operation keys on the application (e.g., the up key, the down key, the left key, the right key, and the enter key) so that the operation device 300 transmits, to the display processing device, a remote control signal indicating a purchase of content (S605). The operation to select a service can also be carried out with use of a remote control serving as an accessory for the display processing device 200.

Upon receipt of the remote control signal (S606), the display processing device 200 analyzes display data specified by the remote control signal. When the display processing device 200 determines that the remote control signal indicates an operation of purchasing content (S607), the display processing device 200 transmits, to the service providing device 400, a request (purchase request) for a purchase of the content (S608). The purchase request thus transmitted includes (i) information (content ID) for identification of the content and (ii) a terminal ID of the operation device 300.

Upon receipt of the purchase request (S609), the billing processing section 439 (i) determines that the user A using the terminal ID has transmitted the request for a purchase of the content (S610), and (ii) checks an amount of money available for the user A by referring to the terminal/user information storage section 475. The service providing device 400 then carries out settlement processing on the basis of the amount of money available (S611).

The one-time PW generating processing section 435 then generates a one-time password (S612). Next, the image data generating processing section 436 generates an image corresponding to the user A of the operation device 300 who has transmitted the content purchase request. The image data generating processing section 436 then generates purchase image data 3D including (i) the image thus generated and (ii) a processing specifying information item 5 including a command name 6 of "AUTHENTICATION" and a parameter 7 indicative of the one-time password generated as above (S613). The image data generating processing section 436 can further cause a URL of a server, by which authentication is to be carried out, to be included as a processing specifying information item 5. The image data generating processing section 436 thus transmits the purchase image data 3D, generated as above, to the operation device 300 (S614).

The image data receiving processing section 335 of the operation device 300 receives the purchase image data 3D (S615). When the user carries out an operation to display the image included in the purchase image data 3D (S616), the image data receiving processing section 335 causes the display section 304 to display the image included in the purchase image data 3D (S617). Further, in the 5617, the image data receiving processing section 335 of the present embodiment causes the display section 304 to display GUIs (for example, buttons) for accepting various operations by the user. In particular, the image data receiving processing section 335 causes the display section 304 to display a GUI (for example, a button) for accepting an operation to transmit the purchase image data 3D to the display processing device 200.

Then, in a case where the user carries out an operation (e.g., presses a button) to transmit the purchase image data 3D to the display processing device 200 (S618), the image data transmission processing section 336 (i) causes a terminal ID of the operation device 300 to be further included in the purchase image data 3D as a processing specifying information item 5 (S619), and (ii) transmits the purchase image data 3D to the display processing device 200 by, for example, electronic mail (S620).

The display processing device 200 receives the purchase image data 3D (S621). The processing specifying information extraction processing section 234 then analyzes the purchase image data 3D thus received (S622). Specifically, the processing specifying information extraction processing section 234 extracts the processing specifying information items 5 included in the purchase image data 3D received. In this case, the processing specifying information extraction processing section 234 analyzes for extraction whether the purchase image data 3D includes a URL, a one-time password, and the terminal ID of the operation device 300. The billing authentication request processing section 2353 thus transmits, to the service providing device 400, the one-time password and the terminal ID extracted as above (S623). If the processing specifying information extraction processing section 234 has extracted a URL as a result of the analysis, the billing authentication request processing section 2353 transmits the one-time password and the terminal ID, extracted as above, to a server or the like specified by the URL.

Upon receipt of the one-time password and the terminal ID (S624), the service providing device 400 carries out authentication (purchase) on the basis of the one-time password and the terminal ID thus received (S625). Specifically, the login request receiving processing section 437 checks (i) whether the one-time password received is valid and (ii) whether the terminal ID received is identical to the terminal ID of an operation device 300 used by the user for whom the one-time password has been issued. If the authentication (purchase) has been successfully completed (YES in S625), the service providing device 400 (i) carries out purchase processing (S626), and (ii) transmits, to the display processing device 200, information about the content purchased (S627).

Upon receipt of the information about the content purchased (S628), the display processing device 200 causes the display section 204 to display the information about the content (S629).

Through the above procedure, the user can achieve authentication (purchase) for a content purchase by transmitting, to the display processing device 200, purchase image data 3D obtained from the service providing device 400.

Through the steps S612 to S614, the service providing device 400 transmits the purchase image data 3D to the operation device 300. Alternatively, the service providing device 400 can transmit, instead of the purchase image data 3D, a URL for access to a website so that the operation device 300 obtains purchase image data 3D from the website specified by the URL. This arrangement allows (i) the operation device 300 to transmit, when accessing the website, its terminal ID so that the service providing device 400 can carry out terminal authentication on the basis of the terminal ID, and (ii) the service providing device 400 to then transmit the purchase image data 3D to the operation device 300. The arrangement thus advantageously improves security.

In addition, through the steps S612, S613, and S619, the purchase image data 3D is generated and processed. These steps can be changed so that (i) the operation device 300 obtains, from the website, purchase image data 3D generated on the website and (ii) the operation device 300 thus does not process the purchase image data 3D. This arrangement eliminates the need to process the purchase image data 3D in the operation device 300, and thus advantageously simplifies the arrangement of the operation device 300.

[Embodiment 4]

The present embodiment is an embodiment in which, in a case where a user has been notified when accessing a website provided by the service providing device 400 that login is necessary, the user becomes able to log in the website by transmitting, from the operation device 300 to the display processing device 200, user identification image data 3E which includes user identification information and which has been transmitted in advance by the service providing device 400 to the operation device 300 in response to a request from the operation device 300.

The embodiment of the present invention will now be described with reference to FIGS. 27 through 29. For convenience of explanation, a description of matters which are described in any of the above embodiments is omitted here.

(More Detailed Configuration of Each Device)

Figure 27:
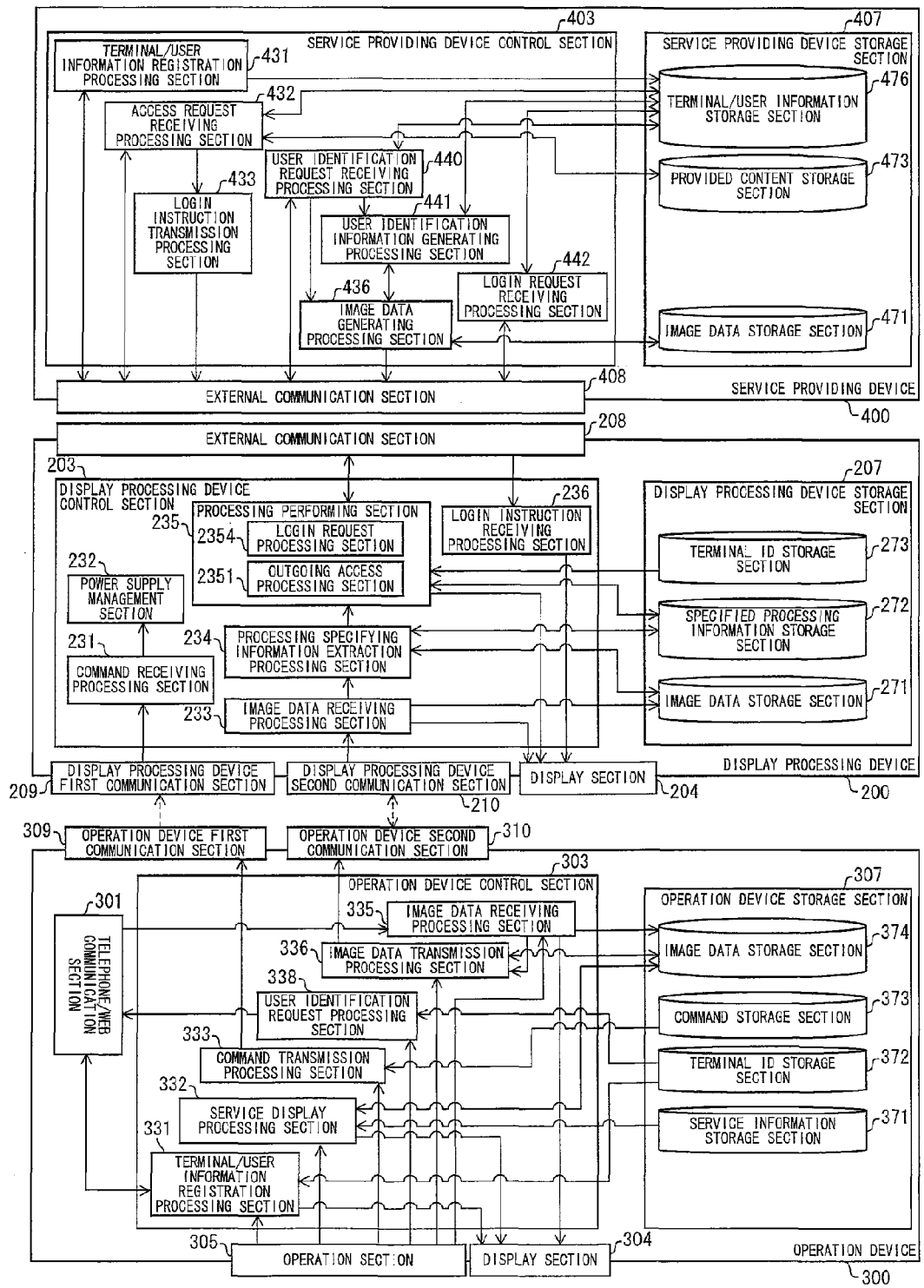
FIG. 27

With reference to FIG. 27, the following description deals in more detail with the configuration of each of the display processing device 200, the operation device 300, and the service providing device 400 according to the present embodiment. FIG. 27 is a block diagram illustrating an essential configuration of each of the display processing device 200, the operation device 300, and the service providing device 400 according to the present embodiment.

(More Detailed Configuration of Display Processing Device)

The display processing device 200 of the present embodiment has an arrangement identical to the arrangement of the display processing device 200 of Embodiment 1, except that (i) the display processing device storage section 207 of the display processing device 200 of the present embodiment further includes a terminal ID storage section 273, and (ii) the processing performing section 235 of the display processing device 200 of the present embodiment includes a login request processing section 2354 (authentication information/ device information transmitting means) instead of the login request processing section 2352.

The terminal ID storage section 273 stores a terminal ID with which the display processing device 200 is identifiable.

The login request processing section 2354 transmits a login request to a predetermined website (for example, a website currently displayed on the display section 204) via the external communication section 208 in a case where the specified processing information storage section 272 stores a processing specifying information item 5 whose command name 6 is "USER IDENTIFICATION." The login request thus transmitted includes (i) user identification information indicated by a parameter 7 of the processing specifying information item 5 and (ii) the terminal ID of the display processing device 200 obtained from the terminal ID storage section 273. In a case where the parameter 7 of the processing specifying information item 5 further indicates a URL, the login request can be transmitted to a website specified by the URL. The login request transmitted as above can include, instead of the user identification information indicated by the parameter 7 of the processing specifying information item 5, image data prepared by adding the processing specifying information item 5 to image data stored in the image data storage section 271. The login request processing section 2354, upon receipt of an authentication result, causes the display section 204 to display the authentication result thus received.

(More Detailed Configuration of Operation Device)

The operation device 300 of the present embodiment has an arrangement identical to the arrangement of the operation device 300 of Embodiment 1, except that the operation device control section 303 of the operation device 300 of the present embodiment includes a user identification request processing section 338 (authentication information requesting means) instead of the login authentication request processing section 334.

The user identification request processing section 338 transmits a user identification request to the service providing device 400 via the telephone/web communication section 301 in response to an operation by a user to obtain a user identification image. The user identification request is transmitted to the service providing device 400 so as to request transmission of user identification image data 3E including user identification information necessary for access to a website corresponding to a service. The user identification request transmitted as above includes a terminal ID of the operation device 300. The terminal ID is obtained from the terminal ID storage section 372.

(More Detailed Configuration of Service Providing Device)

The service providing device 400 of the present embodiment has an arrangement identical to the arrangement of the service providing device 400 of Embodiment 1, except that the service providing device control section 403 of the service providing device 400 of the present embodiment includes: a user identification request receiving processing section 440 (authentication information generation request receiving means) instead of the authentication request receiving processing section 434; a user identification information generating processing section 441 (authentication information generating means; authentication information/device information storage means) instead of the one-time PW generating processing section 435; and a login request receiving processing section 442 (authentication information/device information receiving means; authentication information/device information checking means) instead of the login request receiving processing section 437.

The service providing device 400 of the present embodiment further differs from the service providing device 400 of Embodiment 1 in that the service providing device storage section 407 of the service providing device 400 of the present embodiment includes (i) neither of the authentication information storage section 472 and the user-related information storage section 478 and (ii) a terminal/user information storage section 476 (authentication information/device information storage section; second device information storage section) instead of the terminal/user information storage section 474.

The terminal/user information storage section 476 has a varied data structure in comparison with the terminal/user information storage section 474. In addition to the data stored in the terminal/user information storage section 474 (a terminal ID of an operation device 300; a name of a user of the operation device 300; and a date and time at which the user last accessed content), the terminal/user information storage section 476 further stores: a date and time at which authentication image data was last issued for the user; a user ID, serving as user identification information, with which the user is uniquely identified; and a terminal ID of the display processing device 200. The terminal/user information storage section 476 can, for example, have a data structure shown in Table 3 below.

TABLE 3

| No | Operation device terminal ID | User name | Last access date and time/content | Last user identification image data issue date and time | User ID (UID) | Display processing device terminal ID |
|---|---|---|---|---|---|---|
| 1 | 0001 | Taro | 2008/5/27 12:18 Content A | 2008/3/27 12:10 | 0123456789abcd | 000a |
| 2 | 0002 | Hanako | 2008/5/27 19:00 Content B | 2008/3/27 19:00 | 123456789abcde | 000b |

An example of Table 3 shows that the terminal/user information storage section 475 stores the following information: (i) A name of a user of an operation device 300 whose terminal ID is "0001" is "Taro"; (ii) A user ID of the user is "0123456789abcd"; (iii) A terminal ID of a display processing device 200 used by the user is "000a"; (iv) Content which the user last accessed is "content A," and a date and time of the access is "May 27, 2008, 12:18"; (v) A date and time at which user identification image data for authentication (login) was last issued for the user is "Mar. 27, 2008, 12:10."

The user identification request receiving processing section 440, upon receipt of a user identification request from the user identification request processing section 338 of the operation device 300, first carries out terminal authentication by checking whether a terminal ID of the operation device 300 which terminal ID is included in the user identification request received as above has been registered in the terminal/user information storage section 476 (that is, whether the terminal ID of the operation device 300 which terminal ID is included in the user identification request is identical to a terminal ID of an operation device 300 which is stored in the terminal/user information storage section 476). If the terminal authentication has been successfully completed, the user identification request receiving processing section 440 causes (i) the user identification information generating processing section 441 to generate user identification information for use in authentication (login) for a website, and (ii) the image data generating processing section 436 to generate user identification image data 3E.

The user identification information generating processing section 441 generates, in response to an instruction from the user identification request receiving processing section 440, user identification information on the basis of a user ID stored in the terminal/user information storage section 476. The user identification information generating processing section 441 can further (i) generate an electronic signature to guarantee validity of the user identification information and (ii) attach the electronic signature to the user identification information generated as above. The user identification information generating processing section 441 then causes the user identification information, generated as above, to be stored in the terminal/user information storage section 476 in association with the terminal ID of the operation device 300.

The user identification information can be (i) the user ID itself or (ii) a value obtained by converting the user ID in accordance with a predetermined rule. Security of the user identification information is advantageously improved by, for example, encrypting the user ID.

The image data generating processing section 436 of the present embodiment generates user identification image data 3E including user identification information generated by the user identification information generating processing section 441. The image data generating processing section 436 generates user identification image data 3E on the basis of a template stored in the image data storage section 471. In other words, the image data generating processing section 436 generates user identification image data 3E prepared by adding, to a template stored in the image data storage section 471, a processing specifying information item 5 including user identification information generated by the user identification information generating processing section 441.

In the case where the image data storage section 471 stores a template for each user, the image data generating processing section 436 generates user identification image data 3E on the basis of a template for a user of the operation device 300 which has transmitted the user identification request.

The user of the operation device 300 which has transmitted the user identification request can be identified on the basis of a user name obtained by searching through the terminal/user information storage section 476 while using, as a key, the terminal ID of the operation device 300 included in the user identification request. The image data generating processing section 436 thus generates user identification image data 3E on the basis of a template which is stored in the image data storage section 471 in association with the user name obtained.

The image data generating processing section 436 can further generate, for each user, an image to be included in the user identification image data 3E. The image data generating processing section 436 can, for example, generate (i) an image indicative of a user name, or an image (avatar) representative of the user, (ii) an image of a name of a service which the user is attempting to log in, or an image of an icon with which such a service is identifiable, and/or (iii) an image indicative of, for example, an operation currently available for the user.

The login request receiving processing section 442, upon receipt of a login request transmitted from the login request processing section 2354 of the display processing device 200, checks whether a first set of (i) user identification information and (ii) a terminal ID of the display processing device 200, both included in the login request thus received, is identical to a second set of (i) a user ID serving as user identification information and (ii) a terminal ID of a display processing device, both stored in the terminal/user information storage section 476. If the first set is identical to the second set, the login request receiving processing section 442 carries out authentication (login) processing. In the case where the user identification information of the first set has been converted into a value in accordance with the predetermined rule, the login request receiving processing section 442 can determine the above identicalness by comparing the user identification information with a value resulting from converting the user ID in accordance with the predetermined rule. The login request receiving processing section 442 can, according to need, cause the access request receiving processing section 432 to (i) obtain, from the provided content storage section 473, data to be provided and (ii) transmit the data to the display processing device 200. If the first set is not identical to the second set, the login request receiving processing section 442 does not carry out authentication (login) processing.

A result of the authentication (login) can be transmitted to the display processing device 200 regardless of whether authentication (login) processing has been carried out.

(Processing Procedure)

Figure 28:
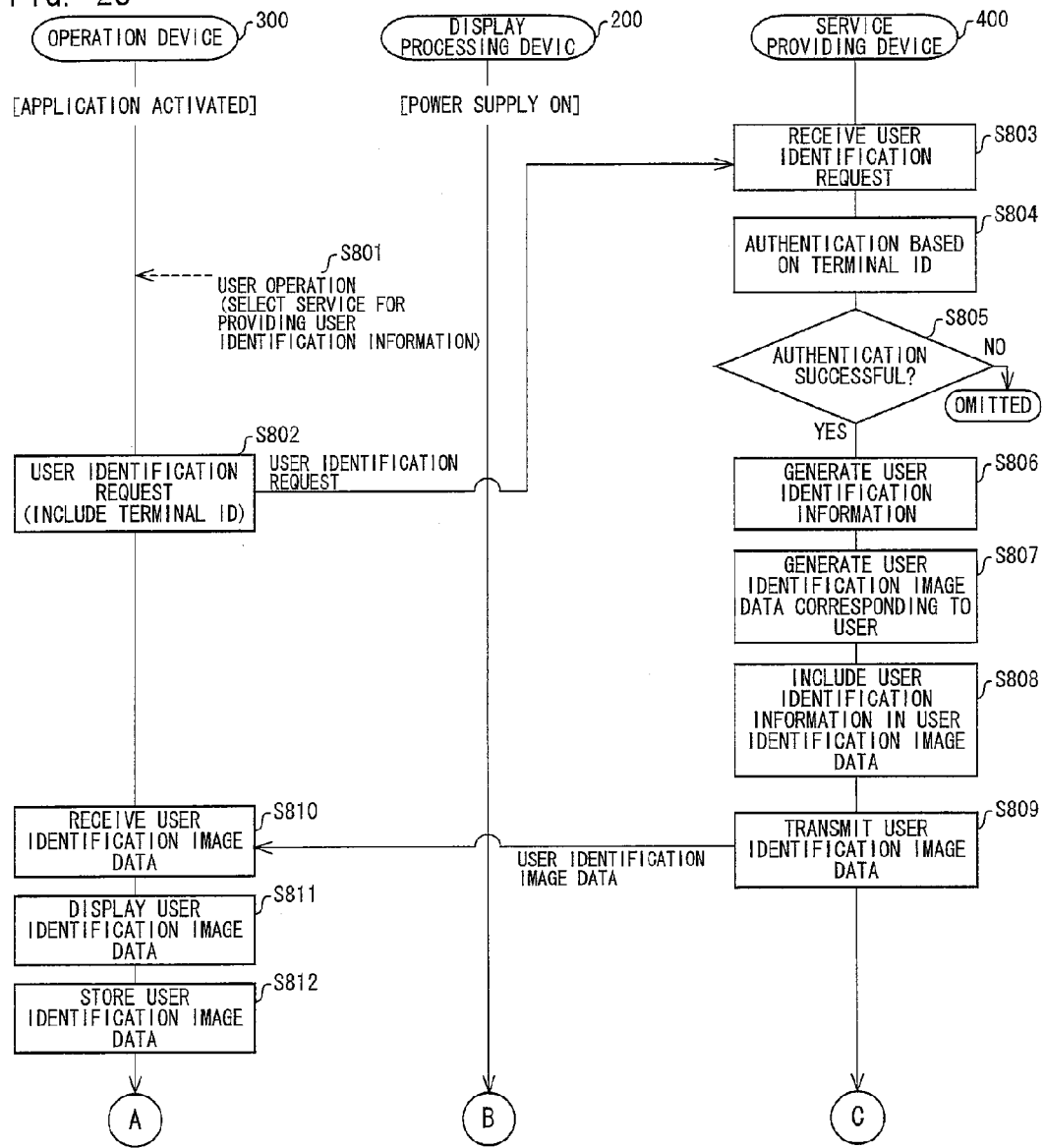
FIG. 28
Figure 29:
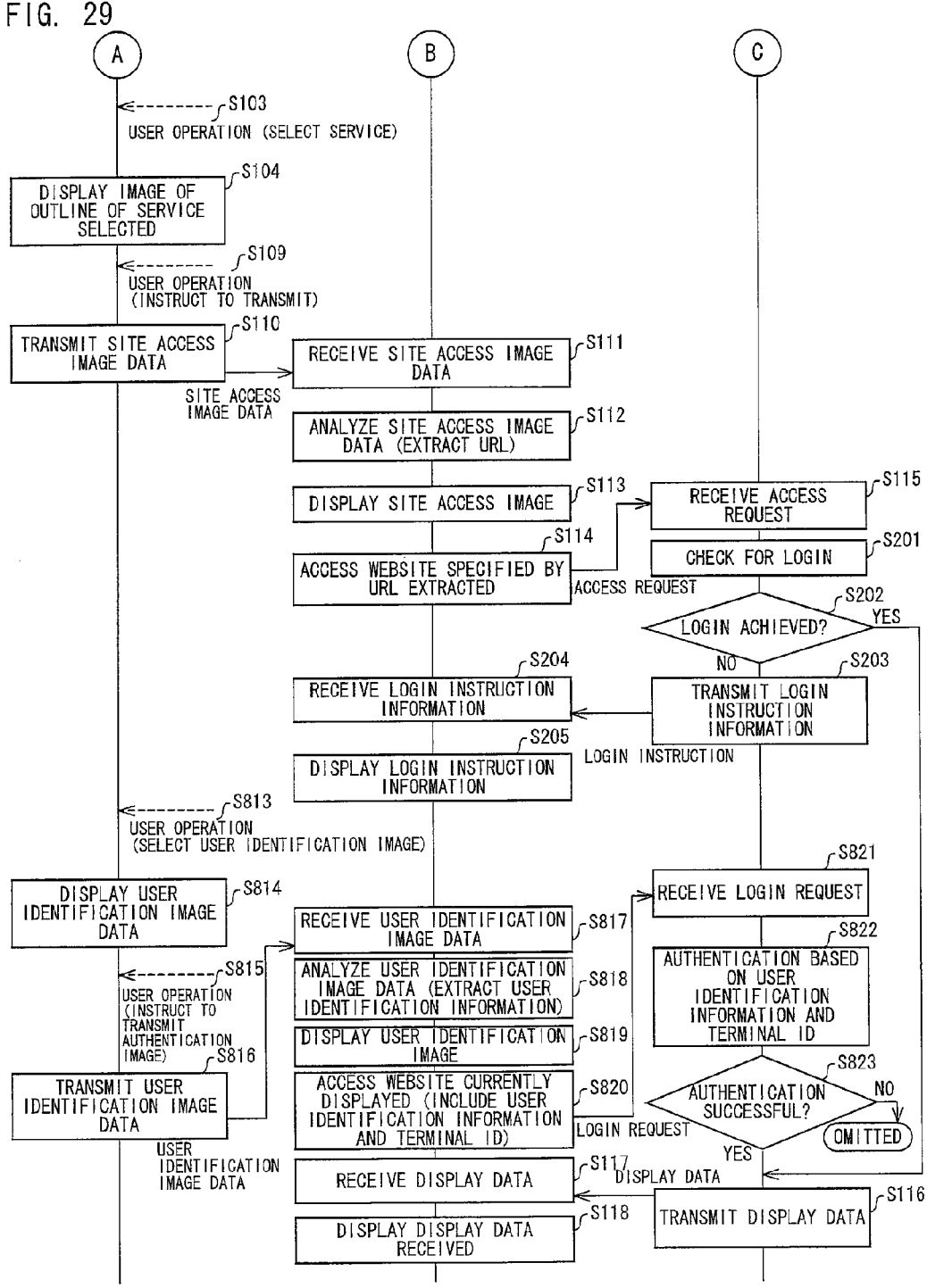
FIG. 29

With reference to FIGS. 28 and 29, the following description deals with procedures for processing carried out by each device in a case where a user accesses a website within the operation system 100 of the present embodiment. The description below deals first with (i) a procedure for processing with reference to FIG. 28 in which processing the user obtains user identification image data 3E, and then with (ii) a procedure for processing with reference to FIG. 29 in which processing the user accesses a website which requires authentication (login) with use of the user identification image data 3E.

It is assumed herein that (i) user registration processing has been completed, and (ii) the power supply of the display processing device 200 is in an on state. It is further assumed that the application of the operation device 300 has been activated.

(Processing Procedure 1: Obtaining User Identification Image Data 3E)

In a case where a user has carried out an operation to obtain user identification image data 3E (that is, the user has selected a service for providing user identification image data 3E) as shown in FIG. 28 (S801), the user identification request processing section 338 transmits a user identification request to the service providing device 400 (S802). The user identification request thus transmitted includes a terminal ID of the operation device 300.

Upon receipt of the user identification request (S803), the user identification request receiving processing section 440 carries out terminal authentication by checking whether the terminal ID of the operation device 300 transmitted with the user identification request has been registered in the terminal/user information storage section 476 (S804).

If the terminal authentication has been successfully completed (YES in S805), the user identification information generating processing section 441 generates user identification information (S806). Next, the image data generating processing section 436 generates an image corresponding to a user of the operation device 300 which has transmitted the user identification request (S807). The image data generating processing section 436 then generates user identification image data 3E including (i) the image thus generated and (ii) a processing specifying information item 5 whose command name 6 is "USER IDENTIFICATION" and whose parameter 7 indicates the user identification information generated as above (S808). The image data generating processing section 436 thus transmits, to the operation device 300, the user identification image data 3E generated as above (S809). The image data generating processing section 436 can further attach an electronic signature to the user identification image data 3E so as to guarantee validity of the user identification image data 3E.

Upon receipt of the user identification image data 3E (S810), the image data receiving processing section 335 of the operation device 300 causes the display section 304 to display an image on the basis of image information included in the user identification image data 3E (S811), and causes the user identification image data 3E, received as above, to be stored in the image data storage section 374 (S812).

Through the above procedure, the user of the operation device 300 can obtain user identification image data 3E.

(Processing Procedure 2: Accessing a Website which Requires Authentication (Login))

The steps S101 through S115 and 5201 through 205 shown in FIG. 29 are identical to those described in Embodiment 1.

The user views login instruction information displayed on the display section 204 in the step S205. In a case where the user then selects the user identification image data 3E, stored in the step S812, in order to log in a website provided by the service providing device 400 (S813), the image data receiving processing section 335 causes the display section 304 to display the user identification image data 3E thus selected (S814).

In a case where the user then carries out an operation to transmit, to the display processing device 200, the user identification image data 3E displayed on the display section 304 (S815), the image data transmission processing section 336 of the operation device 300 transmits the user identification image data 3E to the display processing device 200 (S816).

The image data receiving processing section 233 of the display processing device 200 receives the user identification image data 3E (S817). Next, the processing specifying information extraction processing section 234 analyzes the user identification image data 3E thus received (S818). Specifically, the processing specifying information extraction processing section 234 extracts the processing specifying information item 5 included in the user identification image data 3E received. In this case, the processing specifying information extraction processing section 234 extracts (i) "USER IDENTIFICATION" as the command name 6 and (ii) the user identification information as the parameter 7.

Then, the image data receiving processing section 233 causes the display section 204 to display the image on the basis of the image information, included in the user identification image data 3E, so that the user can check the user identification image data 3E (S819). Further, since the command name 6, extracted as above, of the processing specifying information item 5 is "USER IDENTIFICATION," the login request processing section 2352 transmits a request for login for the website currently displayed (S820). The request thus transmitted includes (i) the user identification information, extracted as above, and (ii) the terminal ID stored in the terminal ID storage section 273. Alternatively, the login request processing section 2352 can transmit the user identification image data 3E itself instead of the user identification information and the terminal ID.

Upon receipt of the login request (S821), the login request receiving processing section 437 of the service providing device 400 carries out authentication (login) on the basis of the user identification information and the terminal ID transmitted with the login request (S822).

In the case where the login request processing section 2352 transmits the user identification image data 3E instead of the user identification information and the terminal ID, the login request receiving processing section 442 checks whether the user identification image data 3E received is identical to the user identification image data 3E generated in the step S807. If the user identification image data 3E received is identical to the user identification image data 3E generated in the step S807, the login request receiving processing section 442 analyzes the user identification image data 3E received. Specifically, the login request receiving processing section 442 extracts the processing specifying information item 5 included in the user identification image data 3E. In this case, the login request receiving processing section 442 extracts (i) "USER IDENTIFICATION" as the command name 6 and (ii) the user identification information as the parameter 7. The login request receiving processing section 442 thus carries out authentication (login) on the basis of the user identification information thus extracted. If an electronic signature is attached to the user identification image data 3E, the login request receiving processing section 442 can alternatively carry out authentication (login), not on the basis of the user identification information, but by verifying validity of the electronic signature.

The electronic signature is a hash value calculated in accordance with a commonly known signature generating algorithm with use of a secret key and the user identification image data 3E. Whether the electronic signature is valid for the user identification image data 3E is verified with use of a public key. Specifically, the login request receiving processing section 442 verifies the validity by (i) decrypting the electronic signature with use of a public key and (ii) checking whether a hash value resulting from the decryption is identical to a hash value calculated from the user identification image data 3E.

If the authentication (login) has been successfully completed (YES in S823), the service providing device 400 transmits display data (for example, HTML data forming a web page, and video content) to be displayed on the display section 204 of the display processing device 200 (S116). The steps S116 through S118 are identical to those described in Embodiment 1.

In the step S819, the processing performing section 235 causes the display section 204 to display the image on the basis of the image information of the user identification image data 3E so that the user can check the user identification image data 3E. The step S819 can, however, be omitted if the user has checked the user identification image data 3E with use of the operation device 300 and thus does not need to check the user identification image data 3E again on the display section 204.

Through the above procedure, the user of the operation device 300 can log in a website with use of user identification image data 3E.

[Embodiment 5]

The present embodiment is an embodiment in which, in a case where a user has become aware when accessing a website provided by the service providing device 400 that the user has been notified by the website that authentication (login) is necessary, the user becomes able to achieve authentication (login) for the accessed website by (i) carrying out an operation to request an issue of authentication information with use of the display processing device 200 so that the service providing device 400 transmits authentication image data 3B to the operation device 300, and then (ii) transmitting the authentication image data 3B from the operation device 300 to the display processing device 200.

The embodiment of the present invention will now be described with reference to FIGS. 30 through 32. For convenience of explanation, a description of matters which are described in any of the above embodiments is omitted here.

(More Detailed Configuration of Each Device)

Figure 30:
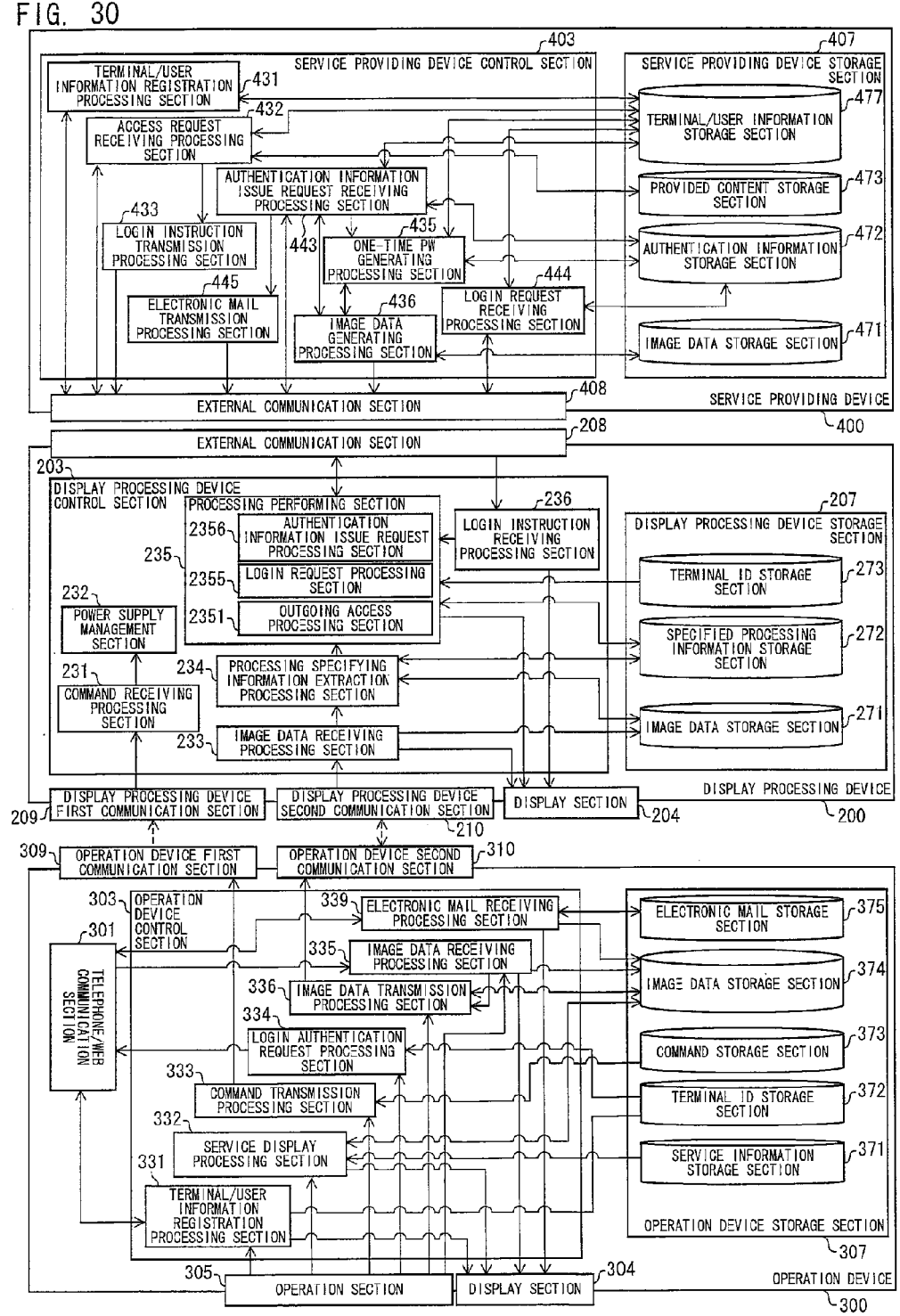
FIG. 30

With reference to FIG. 30, the following description deals in more detail with the configuration of each of the display processing device 200, the operation device 300, and the service providing device 400 according to the present embodiment. FIG. 30 is a block diagram illustrating an essential configuration of each of the display processing device 200, the operation device 300, and the service providing device 400 according to the present embodiment.

(More Detailed Configuration of Display Processing Device)

The display processing device 200 of the present embodiment has an arrangement identical to the arrangement of the display processing device 200 of Embodiment 4, except that the processing performing section 235 of the display processing device 200 of the present embodiment includes (i) a login request processing section 2355 (authentication information/device information transmitting means) instead of the login request processing section 2354, and further includes (ii) an authentication information issue request processing section 2356 (authentication information requesting means).

The login request processing section 2355 transmits a login request to a predetermined website (for example, a website currently displayed on the display section 204) via the external communication section 208 in a case where the specified processing information storage section 272 stores a processing specifying information item 5 whose command name 6 is "AUTHENTICATION." The login request thus transmitted includes (i) a one-time password indicated by a parameter 7 of the processing specifying information item 5 and (ii) a terminal ID obtained from the terminal ID storage section 273. In a case where the parameter 7 of the processing specifying information item 5 further indicates a URL, the login request can be transmitted to a website specified by the URL. The login request transmitted as above can include, instead of the one-time password indicated by the parameter 7 of the processing specifying information item 5, image data prepared by adding the processing specifying information item 5 to image data stored in the image data storage section 271. The login request processing section 2355, upon receipt of an authentication result, causes the display section 204 to display the authentication result thus received.

The authentication information issue request processing section 2356, in a case where a user has carried out an operation to transmit a authentication information issue request via the operation section 205, transmits an authentication information issue request to a predetermined website (for example, a website currently displayed on the display section 204) via the external communication section 208. The authentication information issue request thus transmitted includes the terminal ID of the display processing device 200 which terminal ID is stored in the terminal ID storage section 273. Alternatively, the authentication information issue request processing section 2356 can transmit the authentication information issue request in response to receipt of login instruction information by the login instruction receiving processing section 236 as a trigger.

(More Detailed Configuration of Operation Device)

The operation device 300 of the present embodiment has an arrangement identical to the arrangement of the operation device 300 of Embodiment 1, except that (i) the operation device storage section 307 of the operation device 300 of the present embodiment further includes an electronic mail storage section 375, and (ii) the operation device control section 303 of the operation device 300 of the present embodiment further includes an electronic mail receiving processing section 339 (operation data receiving means).

The electronic mail storage section 375 readably stores electronic mail. Examples of electronic mail stored in the electronic mail storage section 375 include: electronic mail (electronic mail to which image data is attached) which includes (i) image data including an image of an outline of a service or (ii) operation image data 3 such as site access image data 3A and authentication image data 3B; and electronic mail including a URL for site access.

The electronic mail receiving processing section 339 receives electronic mail transmitted from an external device, and causes the electronic mail storage section 375 to store the electronic mail thus received. The electronic mail receiving processing section 339 further causes the display section 304 to (i) carry out a display indicative of the receipt of the electronic mail from the external device and (ii) display the electronic mail stored in the electronic mail storage section 375. Examples of electronic mail transmitted from an external device include electronic mail including authentication image data 3B generated by the service providing device 400. The electronic mail receiving processing section 339 can cause the image data storage section 374 to store image data attached to electronic mail.

(More Detailed Configuration of Service Providing Device)

The service providing device 400 of the present embodiment has an arrangement identical to the arrangement of the service providing device 400 of Embodiment 1, except that (i) the service providing device control section 403 of the service providing device 400 of the present embodiment includes: an authentication information issue request receiving processing section 443 (authentication information generation request receiving means) instead of the authentication request receiving processing section 434; and a login request receiving processing section 444 (authentication information/device information receiving means; authentication information/device information checking means) instead of the login request receiving processing section 437, (ii) the service providing device control section 403 of the service providing device 400 of the present embodiment further includes an electronic mail transmission processing section 445 (operation data transmitting means), and (iii) the service providing device storage section 407 of the service providing device 400 of the present embodiment does not include the user-related information storage section 478 and includes a terminal/user information storage section 477 (first device information storage section) instead of the terminal/user information storage section 474.

The terminal/user information storage section 477 has an extended data structure in comparison with the terminal/user information storage section 474 of Embodiment 1. In addition to the data stored in the terminal/user information storage section 474 (a terminal ID of an operation device 300; a name of a user of the operation device 300; a date and time at which the user last accessed content; and a date and time at which a one-time password for authentication (login) was last issued for the user), the terminal/user information storage section 477 further stores: an electronic mail address; and a terminal ID of a display processing device 200. The terminal/user information storage section 477 can, for example, have a data structure shown in Table 4 below.

TABLE 4

| No | Operation device terminal ID | User name | Last access date and time/content | Last login authentication issue date and time | Electronic mail address | Display processing device terminal ID |
|---|---|---|---|---|---|---|
| 1 | 0001 | Taro | 2008/5/27 12:18 Content A | 2008/5/27 12:10 | taroh@abc.efg | 000a |
| 2 | 0002 | Hanako | 2008/5/27 19:00 Content B | 2008/3/27 19:00 | hanako@hij.klm | 000b |

An example of Table 4 shows that the terminal/user information storage section 477 stores the following information: (i) A name of a user of an operation device 300 whose terminal ID is "0001" is "Taro"; (ii) An electronic mail address of the operation device 300 of the user is "taroh@abc.efg"; (iii) A terminal ID of the display processing device 200 used by the user is "000a"; (iv) Content which the user last accessed is "content A," and a date and time of the access is "May 27, 2008, 12:18"; (v) A date and time at which a one-time password for authentication (login) was last issued for the user is "May 27, 2008, 12:10."

The data structure of the terminal/user information storage section 477 is not limited to that shown in Table 4. The terminal/user information storage section 477 can also have a data structure which further allows storage of, for example, a one-time password generated for the operation device 300. In this case, the service providing device storage section 407 does not need to include the authentication information storage section 472.

The authentication information issue request receiving processing section 443, upon receipt of an authentication information issue request from the authentication information issue request processing section 2356 of the display processing device 200, first carries out terminal authentication by checking whether a terminal ID of the display processing device 200 which terminal ID is included in the authentication information issue request received has been registered in the terminal/user information storage section 477 (that is, whether the terminal ID of the display processing device 200 which terminal ID is included in the authentication information issue request is identical to a terminal ID of a display processing device which terminal ID is stored in the terminal/user information storage section 477). If the terminal authentication has been successfully completed, the authentication information issue request receiving processing section 443 causes (i) the one-time PW generating processing section 435 to generate a one-time password for authentication (login), and (ii) the image data generating processing section 436 to generate authentication image data 3B.

The authentication information issue request receiving processing section 443 generates electronic mail which (i) is to be transmitted to an electronic mail address that is stored in the terminal/user information storage section 477 in association with the terminal ID of the display processing device 200 which terminal ID is included in the authentication information issue request received as above and which (ii) includes the authentication image data 3B generated by the image data generating processing section 436. The authentication information issue request receiving processing section 443 further causes the electronic mail transmission processing section 445 to transmit the electronic mail generated as above.

The login request receiving processing section 444, upon receipt of a login request transmitted from the login request processing section 2355 of the display processing device 200, first checks whether a one-time password included in the login request thus received is valid. Specifically, the login request receiving processing section 444 checks whether the one-time password is identical to a one-time password stored in the authentication information storage section 472, and whether a valid period of the one-time password has not elapsed. The login request receiving processing section 444 further checks whether a terminal ID of the display processing device 200 which terminal ID is included in the login request received as above is identical to a terminal ID of a display processing device which terminal ID is stored in the terminal/user information storage section 477.

If (i) the one-time password is valid (that is, the one-time password is identical to a one-time password stored in the authentication information storage section 472, and the valid period has not elapsed) and (ii) the terminal ID of the display processing device 200 which terminal ID is included in the login request is identical to a terminal ID of a display processing device which terminal ID is stored in the terminal/user information storage section 477, the login request receiving processing section 444 carries out authentication (login) processing. The login request receiving processing section 444 can, according to need, cause the access request receiving processing section 432 to (i) obtain, from the provided content storage section 473, data to be provided and (ii) transmit the data to the display processing device 200.

If (i) the one-time password is not valid (that is, the one-time password is not identical to any one-time password stored in the authentication information storage section 472, or the valid period has elapsed) or (ii) the terminal ID of the display processing device 200 which terminal ID is included in the login request is not identical to a terminal ID of any display processing device which terminal ID is stored in the terminal/user information storage section 477, the login request receiving processing section 444 does not carry out authentication (login) processing.

A result of the authentication (login) can be transmitted to the display processing device 200 regardless of whether authentication (login) processing has been carried out.

In a case where it is not necessary to maintain security (for example, in a case where a user views a shared album), the login request receiving processing section 444 can carry out authentication (login) processing without use of a one-time password.

The electronic mail transmission processing section 445, in response to an instruction from the authentication information issue request receiving processing section 443, transmits electronic mail, generated by the authentication information issue request receiving processing section 443, to an electronic mail address specified in the electronic mail via the external communication section 408.

(Processing Procedure)

Figure 31:
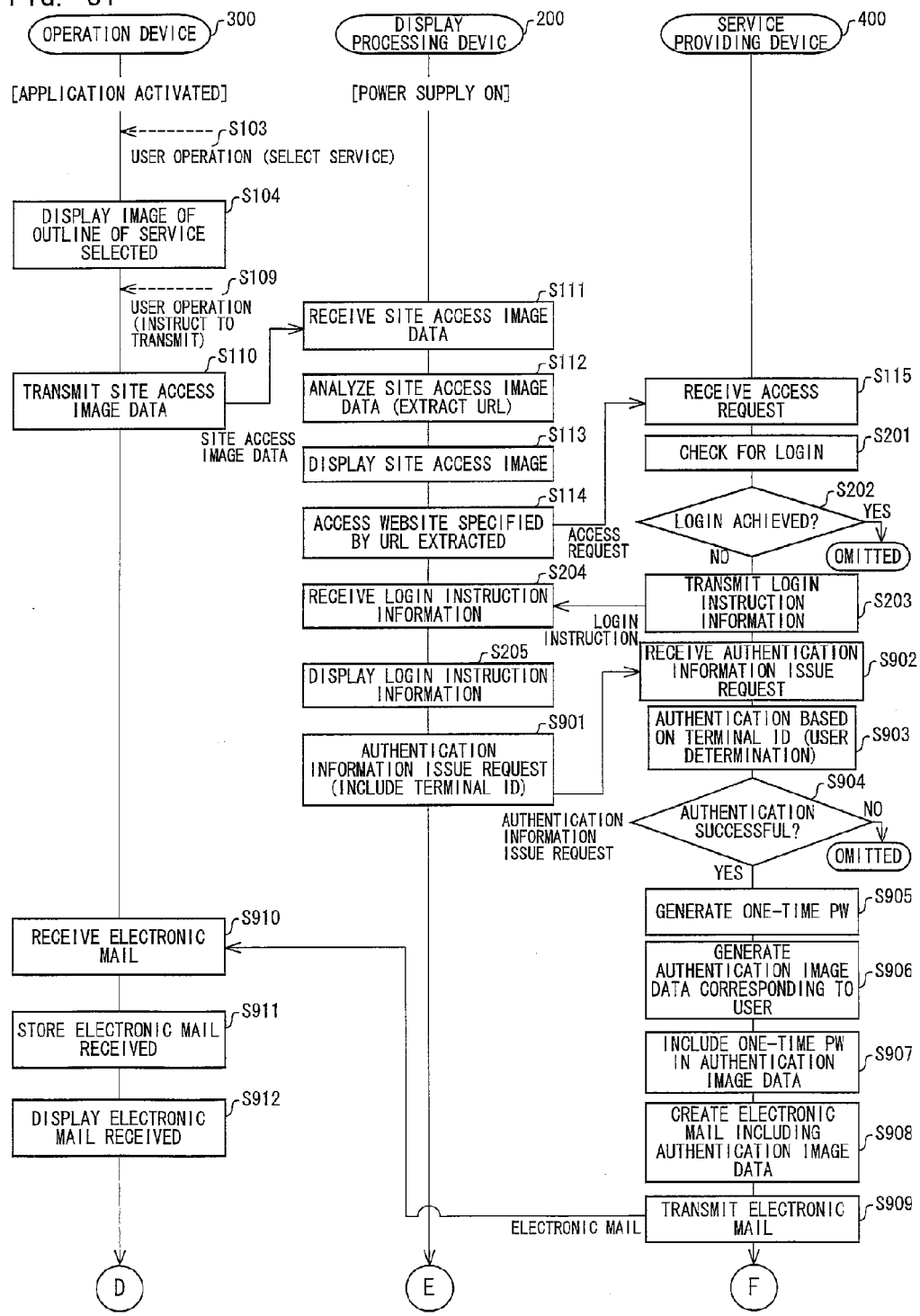
FIG. 31
Figure 32:
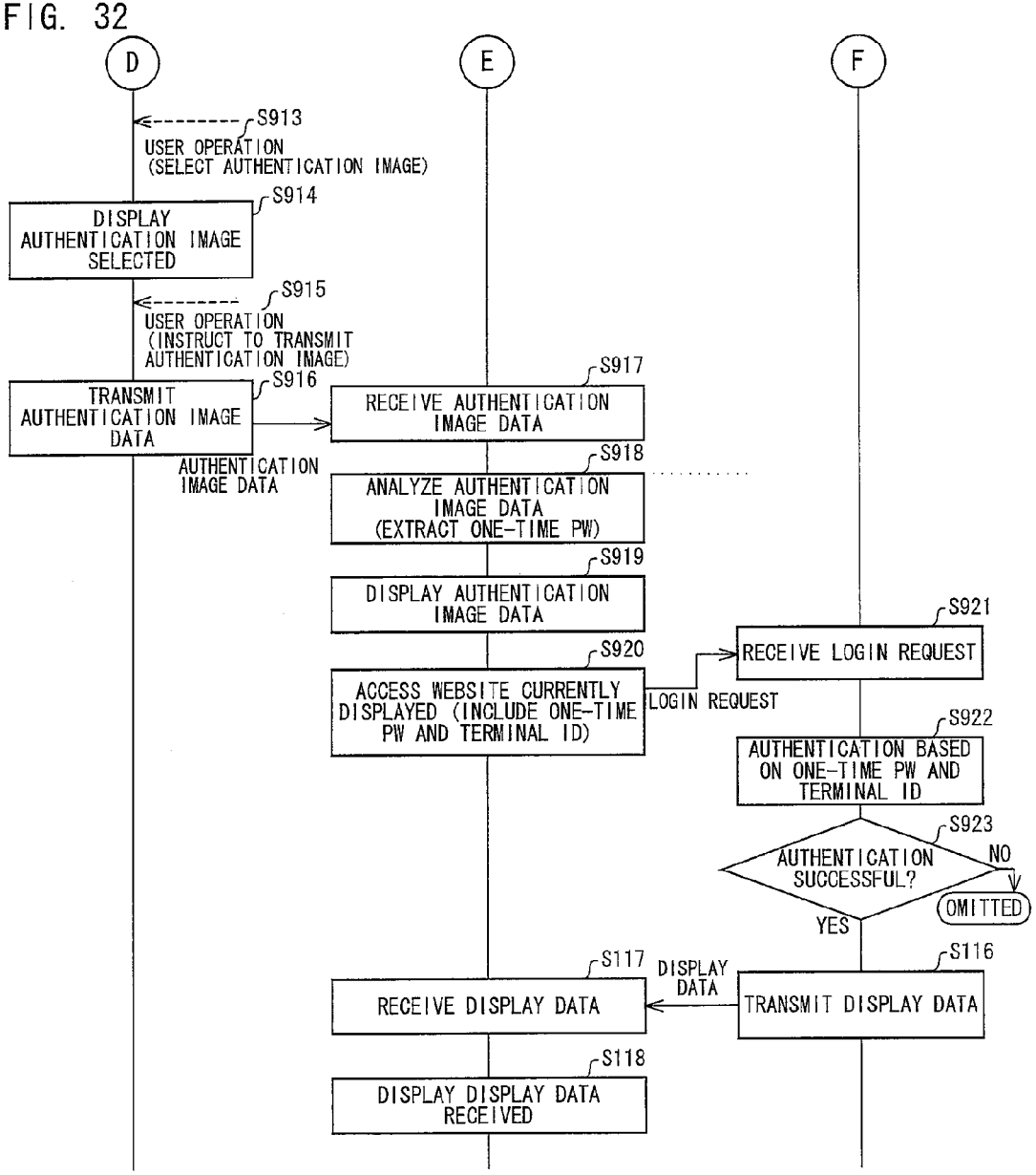
FIG. 32

With reference to FIGS. 31 and 32, the following description deals with procedures for processing carried out by each device in a case where a user accesses a website within the operation system 100 of the present embodiment. The description below deals first with (i) a procedure for processing with reference to FIG. 31 in which processing the user obtains authentication image data 3B including a one-time password, and then with (ii) a procedure for processing with reference to FIG. 32 in which processing the user accesses a website which requires authentication (login) with use of the authentication image data 3B.

It is assumed herein that (i) user registration processing has been completed, and (ii) the power supply of the display processing device 200 is in an on state. It is further assumed that the application of the operation device 300 has been activated.

(Processing Procedure 1: Obtaining Authentication Image Data 3B)

The steps S101 through S115 and 5201 through 205 shown in FIG. 31 are identical to those described in Embodiment 1.

After the login instruction receiving processing section 236 has caused the display section 204 to display login instruction information (S205), the authentication information issue request processing section 2356 transmits an authentication information issue request to a website via the external communication section 208 in response to an operation, as a trigger, by the user to transmit an authentication information issue request (S901). The authentication information issue request thus transmitted includes a terminal ID of the display processing device 200 which terminal ID is stored in the terminal ID storage section 273. Alternatively, in the step S901, the authentication information issue request processing section 2356 can transmit an authentication information issue request in response to receipt of login instruction information by the login instruction receiving processing section 236 as a trigger.

Upon receipt of the authentication information issue request (S902), the authentication information issue request receiving processing section 443 of the service providing device 400 carries out terminal authentication by checking whether the terminal ID of the display processing device 200 which terminal ID is included in the authentication information issue request has been registered in the terminal/user information storage section 477 (S903).

If the terminal authentication has been successfully completed (YES in S904), the one-time PW generating processing section 435 generates a one-time password for authentication (login) (S905). Next, the image data generating processing section 436 generates authentication image data 3B including an image corresponding to the user registered (S906). The image data generating processing section 436 then causes (i) a command name 6 of "AUTHENTICATION" and (ii) a parameter 7 indicative of the above-generated one-time password to be included in the authentication image data 3B, generate as above, as a processing specifying information item 5 (S907). The image data generating processing section 436 can further cause a URL of a website provided by the service providing device 400 to be included as the parameter 7.

The authentication information issue request receiving processing section 443 then generates electronic mail including the authentication image data 3B (S908). Next, the electronic mail transmission processing section 445 transmits the electronic mail thus generated to an electronic mail address specified in the electronic mail (S909).

Upon receipt of the electronic mail, including the authentication image data 3B and transmitted as above (S910), the electronic mail receiving processing section 339 of the operation device 300 causes the electronic mail storage section 375 to store the electronic mail thus received (S911). The electronic mail receiving processing section 339 further causes the display section 304 to (i) carry out a display indicative of the receipt of the electronic mail, and (ii) display the electronic mail stored in the electronic mail storage section 375 (S912).

Through the above procedure, the operation device 300 can obtain a one-time password as included in authentication image data 3B which one-time password has been issued by the service providing device 400 and which is necessary to log in a website provided by the service providing device 400.

(Processing Procedure 2: Accessing a Website which Requires Authentication (Login))

With reference to FIG. 32, the following description deals with a procedure for steps after the step S912. After viewing the electronic mail displayed on the display section 304 in the step S912, the user selects the authentication image data 3B, included in the electronic mail stored in the step S911, in order to log in a website provided by the service providing device 400 (S913). In response, the image data receiving processing section 335 causes the display section 304 to display the authentication image data 3B thus selected (S914).

In a case where the user then carries out an operation to transmit, to the display processing device 200, the authentication image data 3B displayed on the display section 304 (S915), the image data transmission processing section 336 of the operation device 300 transmits the authentication image data 3B to the display processing device 200 (S916).

The image data receiving processing section 233 of the display processing device 200 receives the authentication image data 3B (S917). Next, the processing specifying information extraction processing section 234 analyzes the authentication image data 3B thus received (S918). Specifically, the processing specifying information extraction processing section 234 extracts the processing specifying information item 5 included in the authentication image data 3B received. In this case, the processing specifying information extraction processing section 234 extracts (i) "AUTHENTICATION" as the command name 6 and (ii) the one-time password as the parameter 7.

Then, the image data receiving processing section 233 causes the display section 204 to display an image on the basis of image information, included in the authentication image data 3B, so that the user can check the authentication image data 3B (S919). Further, since the command name 6, extracted as above, of the processing specifying information item 5 is "AUTHENTICATION," the login request processing section 2355 transmits a request for login for the website currently displayed (S920). The request thus transmitted includes (i) the one-time password, extracted as above, and (ii) the terminal ID stored in the terminal ID storage section 273. Alternatively, the login request processing section 2352 can transmit the authentication image data 3B itself instead of the one-time password and the terminal ID.

Upon receipt of the login request (S921), the login request receiving processing section 444 of the service providing device 400 carries out authentication (login) on the basis of the one-time password and the terminal ID transmitted with the login request (S922). In the case where the login request processing section 2352 transmits the authentication image data 3B instead of the one-time password and the terminal ID, the login request receiving processing section 444 checks whether the authentication image data 3B received is identical to the authentication image data 3B generated in the step 5906. If the authentication image data 3B received is identical to the authentication image data 3B generated in the step S906, the login request receiving processing section 444 analyzes the authentication image data 3B received. Specifically, the login request receiving processing section 444 extracts the processing specifying information item 5 included in the authentication image data 3B. In this case, the login request receiving processing section 444 extracts (i) "AUTHENTICATION" as the command name 6 and (ii) the one-time password as the parameter 7. The login request receiving processing section 444 thus carries out authentication (login) on the basis of (i) the one-time password thus extracted and (ii) the terminal ID transmitted therewith.

If the authentication has been successfully completed (YES in S923), the service providing device 400 transmits display data (for example, HTML data forming a web page, and video content) to be displayed on the display section 204 of the display processing device 200 (S116). The steps S116 through S118 are identical to those described in Embodiment 1.

In the step S919, the processing performing section 235 causes the display section 204 to display the image on the basis of the image information of the authentication image data 3B so that the user can check the authentication image data 3B. The step S919 can, however, be omitted if the user has checked the authentication image data 3B with use of the operation device 300 and thus does not need to check the authentication image data 3B again on the display section 204.

Through the above procedure, the user of the operation device 300 can log in a website.

Note that the above processing procedure can be changed so that (i) the steps S801 through S823 described in Embodiment 4 are first carried out, and if the authentication has been successfully completed in the step S823, (ii) the steps S905 and later described in the present embodiment are then carried out. In other words, the processing procedure can be changed so that (i) authentication is carried out on the basis of user identification image data 3E issued in advance, and (ii) authentication is carried out again on the basis of authentication image data 3B. This arrangement advantageously improves security in comparison with the method described in Embodiment 4, in which authentication is carried out on the basis of user identification image data 3E and a terminal ID of the display processing device 200.

[Supplementals]

(Procedure for Terminal Registration Processing and User Information Registration/Update Processing)

The above embodiments are described on the assumption that terminal registration processing and user information registration/update processing through the operation device 300 and the service providing device 400 have already been completed. The following description deals with a procedure for the terminal registration processing and the user information registration/update processing carried out with use of the operation device 300 and the service providing device 400.

Figure 33:
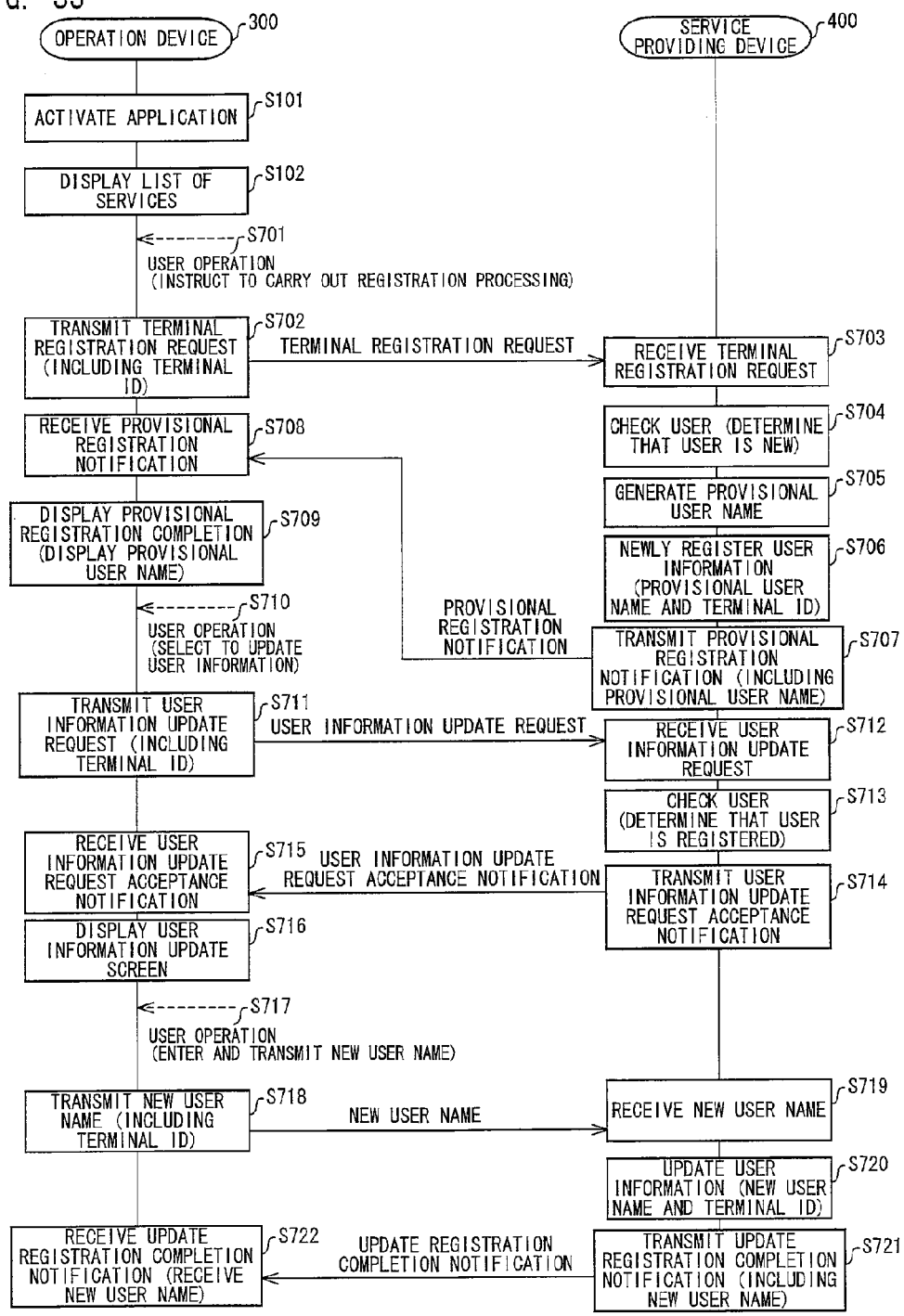
FIG. 33

FIG. 33 is a flowchart illustrating a procedure for the terminal registration processing and the user information registration/update processing carried out with use of the operation device 300 and the service providing device 400. The steps S101 and S102 in FIG. 33 are identical to those described above.

In response to an instruction by a user to carry out registration processing (S701), the terminal/user information registration processing section 331 of the operation device 300 transmits, to the service providing device 400, a terminal registration request for the operation device 300 (S702). The terminal registration request thus transmitted to the service providing device 400 includes a terminal ID of the operation device 300 which terminal ID has been obtained from the terminal ID storage section 372.

Upon receipt of the terminal registration request from the operation device 300 (S703), the terminal/user information registration processing section 431 of the service providing device 400 searches through the terminal/user information storage section 474, 475, 476, 477 on the basis of the terminal ID, included in the terminal registration request received as above, so as to check whether the terminal ID has been registered (S704). If the terminal/user information registration processing section 431 has determined that the terminal ID has not been registered, the terminal/user information storage section 474, 475, 476, 477 generates a provisional user name (S705), and causes the terminal/user information registration processing section 431 to store (that is, newly register) the provisional user name and the above terminal ID in association with each other (S706). The terminal/user information registration processing section 431 then transmits, to the operation device 300, a provisional registration notification indicative of a provisional registration of the terminal ID and the provisional user name (S707). The provisional registration notification includes the above provisional user name.

Upon receipt of the provisional registration notification transmitted from the service providing device 400 (S708), the terminal/user information registration processing section 331 of the operation device 300 (i) causes the display section 304 to display the provisional registration notification (S709), and accepts an input for updating the provisional user name so that the provisional user name is replaced with another user name. In response to an operation by the user to update the provisional user name (S710), the terminal/user information registration processing section 331 transmits, to the service providing device 400, a request (user information update request) indicative of the update (S711).

Upon receipt of the user information update request transmitted from the operation device 300 (S712), the terminal/user information registration processing section 431 of the service providing device 400 (i) checks whether the user has been registered (S713), and if the terminal/user information registration processing section 431 has determined that the user has been registered, (ii) transmits a user information update request acceptance notification to the operation device 300 (S714).

Upon receipt of the update request acceptance notification transmitted from the service providing device 400 (S715), the terminal/user information registration processing section 331 of the operation device 300 causes the display section 304 to display the update request acceptance notification thus received (S716). Then, upon acceptance of a user input for a new user name (S717), the terminal/user information registration processing section 331 transmits the new user name thus accepted to the service providing device 400 in order to update the provisional user name stored in the service providing device 400 (S718).

Upon receipt of the new user name transmitted from the operation device 300 (S719), the terminal/user information registration processing section 431 of the service providing device 400 updates the user name stored in the terminal/user information storage section 474, 475, 476, 477 (S720). The terminal/user information registration processing section 431 then transmits, to the operation device 300, an update registration completion notification indicative of completion of the update (S721).

Finally, upon receipt of the update registration completion notification, the terminal/user information registration processing section 331 of the operation device 300 causes the display section 304 to carry out a display indicative of the receipt (S722).

(Example Screens Displaying an Image Corresponding to a User)

Figure 34:
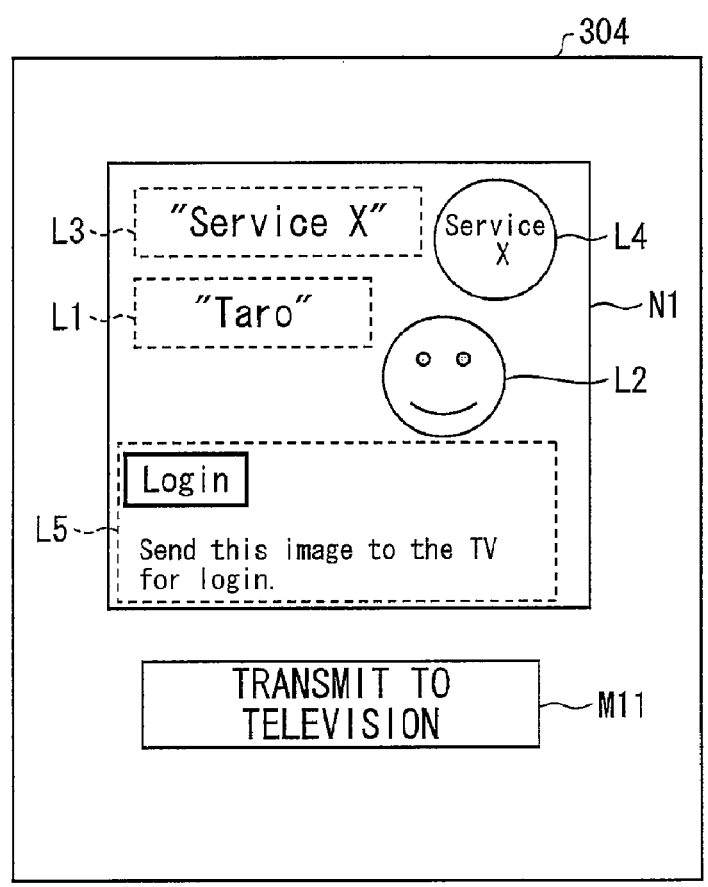
FIG. 34
Figure 35:
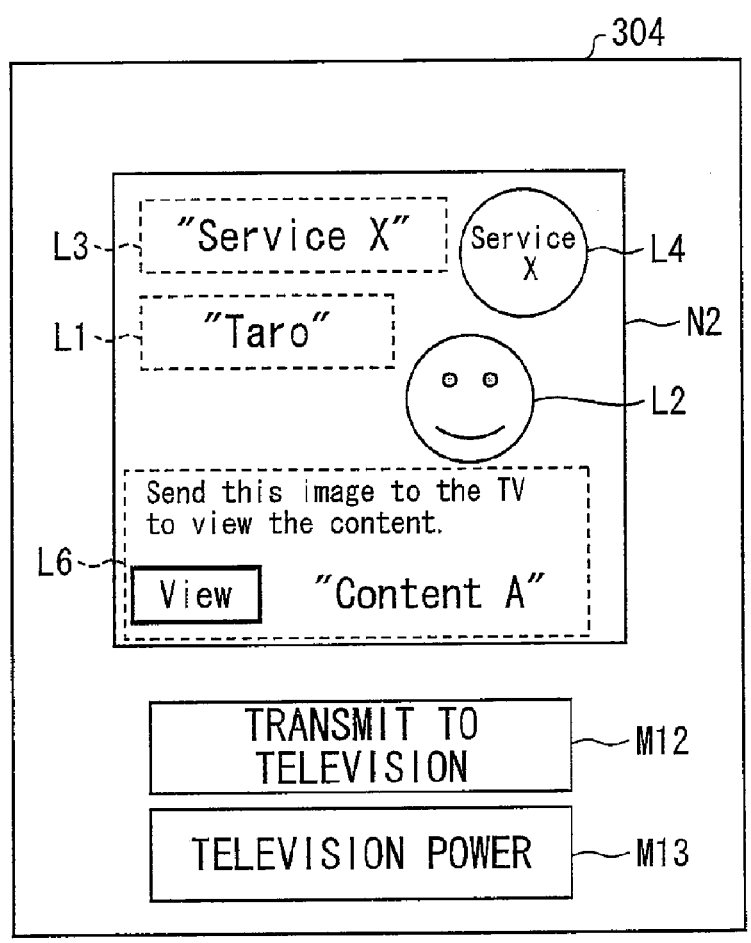
FIG. 35
Figure 36:
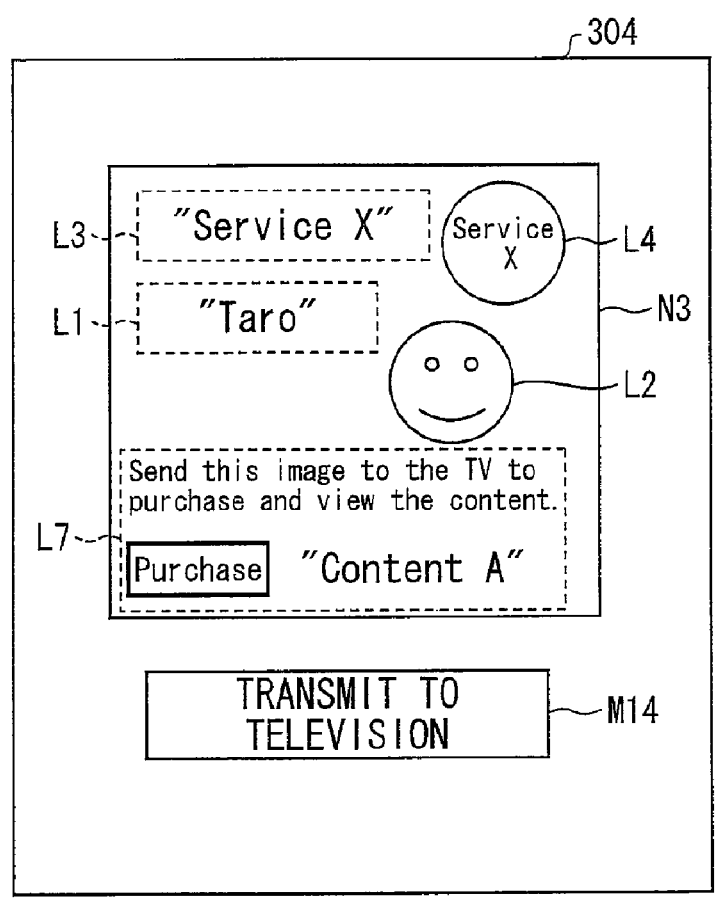
FIG. 36

The above embodiments mention generation of image data including an image corresponding to a user. With reference to FIGS. 34 through 36, the following description deals with example screens each observed in a case where such image data including an image corresponding to a user is displayed on the display section 304 of the operation device 300.

FIG. 34 is a view schematically illustrating an image N1 displayed on the display section 304 of the operation device 300 on the basis of image information included in authentication image data 3B generated in correspondence with a user. As illustrated in FIG. 34, the image N1 includes: a user name L1; an image (avatar) L2 representative of the user; a name L3 of a service which the user can log in; an icon L4 with which the service is identifiable; and an image L5 indicative of an operation available for the user. The image N1 thus clearly indicates that the user ("Taro") viewing the image can log in a service X by transmitting the authentication image data 3B to a television.

It is assumed herein that (i) the name L1, the image L2, the name L3, the icon L4, and the image L5 are each user-related information which has been obtained from the user-related information storage section 478, and (ii) the image data generating processing section 436 of Embodiment 1, when generating the authentication image data 3B, caused an image N1 to be included in an image region 610 of the authentication image data 3B which image N1 includes the name L1, the image L2, the name L3, the icon L4, and the image L5 obtained from the user-related information storage section 478. The image data receiving processing section 335 has thus caused the display section 304 to display the image N1 on the basis of the image information included in the image region 610 of the authentication image data 3B received from the service providing device 400.

FIG. 34 further illustrates a "TRANSMIT TO TELEVISION" button M11 displayed for accepting an operation to transmit the authentication image data 3B to the display processing device 200.

FIG. 35 is a view schematically illustrating an image N2 displayed on the display section 304 of the operation device 300 on the basis of image information included in authentication information-attached site access image data 3C generated in correspondence with a user. As illustrated in FIG. 35, the image N2 includes: a user name L1; an image (avatar) L2 representative of the user; a name L3 of a service which the user can log in; an icon L4 with which the service is identifiable; and an image L6 indicative of an operation available for the user. The image N2 thus clearly indicates that the user ("Taro") viewing the image can view content A of a service X by transmitting the authentication information-attached site access image data 3C to a television.

It is assumed herein that (i) the name L1, the image L2, and the image L6 are stored in the user-related information storage section 478, while the name L3 and the icon L4 are stored in the service-related information storage section 479, and (ii) the image data generating processing section 436 of Embodiment 2, when generating the authentication information-attached site access image data 3C, caused an image N2 to be included in an image region 610 of the authentication information-attached site access image data 3C which image N2 includes: the name L1, the image L2, and the image L6 obtained from the user-related information storage section 478; and the name L3 and the icon L4 obtained from the service-related information storage section 479. The image data receiving processing section 335 has thus caused the display section 304 to display the image N2 on the basis of the image information included in the image region 610 of the authentication information-attached site access image data 3C received from the service providing device 400.

FIG. 35 further illustrates (i) a "TRANSMIT TO TELEVISION" button M11 displayed for accepting an operation to transmit the authentication information-attached site access image data 3C to the display processing device 200, and (ii) a "TELEVISION POWER" button M13 displayed for accepting an operation to switch on a power supply of the display processing device 200.

FIG. 36 is a view schematically illustrating an image N3 displayed on the display section 304 of the operation device 300 on the basis of image information included in purchase image data 3D generated in correspondence with a user. As illustrated in FIG. 36, the image N3 includes: a user name L1; an image (avatar) L2 representative of the user; a name L3 of a service which the user can log in; an icon L4 with which the service is identifiable; and an image L7 indicative of an operation available for the user. The image N3 thus clearly indicates that the user ("Taro") viewing the image can purchase content A of a service X by transmitting the purchase image data 3D to a television.

It is assumed herein that (i) the name L1, the image L2, the name L3, the icon L4, and the image L7 are each user-related information which has been obtained from the user-related information storage section 478, and (ii) the image data generating processing section 436 of Embodiment 3, when generating the purchase image data 3D, caused an image N3 to be included in an image region 610 of the purchase image data 3D which image N3 includes the name L1, the image L2, the name L3, the icon L4, and the image L7 obtained from the user-related information storage section 478. The image data receiving processing section 335 has thus caused the display section 304 to display the image N3 on the basis of the image information included in the image region 610 of the purchase image data 3D received from the service providing device 400.

FIG. 36 further illustrates a "TRANSMIT TO TELEVISION" button M14 displayed for accepting an operation to transmit the purchase image data 3D to the display processing device 200.

[Additional Matters]

The above embodiments deal with image data in a JPEG format. The image data can, however, be in any format, provided that the image data can secure a maker note region 621. The image data can be formed by, for instance, embedding an equivalent of the maker note region 621 in image data in a TIFF format. The image data can alternatively be formed by embedding an equivalent of the maker note region 621 in a text chunk included in image data in a PNG (portable network graphics) format. The image data can further alternatively be in a GIF (graphics interchange format) format.

The above embodiments can be altered so that the image data includes signature information so as to prevent the image data from being tampered with. It is assumed herein that the signature information proves that a processing specifying information item 5 included in image data has not been tampered with. The display processing device 200 can refer to the signature information so as to process image data only if the display processing device 200 has determined that the image data has been delivered from a credible provider and has not been tampered with. The display processing device 200 can also be arranged so as to ask a user whether to process image data if, for instance, the display processing device 200 has determined that the image data has not been delivered from a credible provider, or if the image data includes no signature information.

A data providing device of the present invention may be a data providing device for providing operation data, including processing specifying information which specifies processing to be carried out, to an operation device which transmits the operation data to a data processing device which carries out the processing in accordance with the operation data, the data providing device including: authentication information generating means for generating, for each of operation devices and in response to a request from each of the operation devices, authentication information for use in authentication processing to be carried out in a case where the data providing device is accessed by the data processing device; operation data generating means for generating operation data including (i) the authentication information generated by the authentication information generating means and (ii) processing specifying information which specifies processing of access by the data processing device to the data providing device; and operation data transmitting means for transmitting the operation data, generated by the operation data generating means, to the operation device.

The embodiments can not only be described as above, but also be described as below.

[1] A data providing device of the present invention may be a data providing device for providing operation data, including processing specifying information which specifies processing to be carried out, to an operation device which transmits the operation data to a data processing device which carries out the processing in accordance with the operation data, the data providing device including: authentication information generating means for generating, for each of operation devices and in response to each of the operation devices, authentication information for use in authentication processing to be carried out in a case where the data providing device is accessed by the data processing device; terminal information storage means for storing, in association with each other, (i) authentication information provided to an operation device and (ii) terminal information of a data processing device which can use the authentication information; operation data generating means for generating operation data in a visible form, the operation data including (i) the authentication information generated by the authentication information generating means and (ii) processing specifying information which specifies processing of access by the data processing device to the data providing device; operation data transmitting means for transmitting the operation data, generated by the operation data generating means, to the operation device; authentication information receiving means for receiving, from the data processing device, authentication information and terminal information for use in the authentication processing; and authentication information verification means for comparing (i) a set of the authentication information and the terminal information both received by the authentication information receiving means with (ii) a set of the authentication information and the terminal information both stored in the terminal information storage means.

[2] An operation device of the present invention may be an operation device for transmitting operation data, which (i) includes processing specifying information which specifies processing to be carried out and (ii) is provided by a data providing device, to a data processing device which carries out the processing in accordance with the operation data, the operation device including: authentication information requesting means for transmitting a request to the data providing device for authentication information for use in authentication processing carried out in a case where the data providing device is accessed by the data processing device; operation data receiving means for receiving operation data from the data providing device; display means for displaying the operation data received by the operation data receiving means; and operation data transmitting means for transmitting the operation data, received by the operation data receiving means, to the data processing device.

[3] A data processing device of the present invention may be a data processing device for carrying out processing in accordance with operation data, received from an operation device and including processing specifying information which is provided by a data providing device and which specifies the processing to be carried out, the data processing device including: operation data receiving means for receiving operation data from the operation device; authentication information extracting means for extracting authentication information from the operation data; terminal ID storage means for storing a terminal ID; and authentication information transmitting means for transmitting, to the data providing device, (i) the authentication information extracted by the authentication information extracting means and (ii) the terminal ID obtained from the terminal ID storage means.

[4] A data providing device of the present invention may be a data providing device for providing operation data, including processing specifying information which specifies processing to be carried out, to an operation device which transmits the operation data to a data processing device which carries out the processing in accordance with the operation data, the data providing device including: terminal information storage means for storing, in association with one another, (i) authentication information, received from the data processing device, for use in authentication processing, (ii) terminal information of a data processing device which accepts a request for generating authentication information, and (iii) terminal information of an operation device which transmits operation data; authentication information issue request receiving means for receiving (i) the request from the data processing device for generating authentication information and (ii) terminal information of a data processing device, and comparing (i) the terminal information thus received with (ii) the terminal information stored in the terminal information storage means; authentication information generating means for generating authentication information for use in authentication processing, carried out in a case where the data providing device is accessed by the data processing device, for each operation device in accordance with (i) the request, received by the authentication information issue request receiving means, for generating authentication information and (ii) a result of the comparison of the terminal information which comparison is carried out by the authentication information issue request receiving means; operation data generating means for generating operation data in a visible form, the operation data including (i) the authentication information generated by the authentication information generating means and (ii) processing specifying information which specifies processing of access by the data processing device to the data providing device; operation data transmitting means for transmitting the operation data, generated by the operation data generating means, to an operation device whose terminal information is stored in the terminal information storage means; authentication information receiving means for receiving, from the data processing device, authentication information for use in authentication processing; and authentication information verification means for comparing (i) the authentication information received by the authentication information receiving means with (ii) the authentication information stored in the terminal information storage means.

[5] An operation device of the present invention may be an operation device for transmitting operation data, which (i) includes processing specifying information which specifies processing to be carried out and (ii) is provided by a data providing device, to a data processing device which carries out the processing in accordance with the operation data, the operation device including: operation data receiving means for receiving operation data from the data providing device; display means for displaying the operation data received by the operation data receiving means; and operation data transmitting means for transmitting the operation data, received by the operation data receiving means, to the data processing device.

[6] A data processing device of the present invention may be a data processing device for carrying out processing in accordance with operation data, received from an operation device and including processing specifying information which is provided by a data providing device and which specifies the processing to be carried out, the data processing device including: terminal ID storage means for storing a terminal ID; authentication information issue request transmitting means for transmitting, to the data providing device, a request for issuing operation data including the terminal ID stored in the terminal ID storage means; operation data receiving means for receiving operation data from the operation device; authentication information extracting means for extracting authentication information from the operation data; and authentication information transmitting means for transmitting, to the data providing device, (i) the authentication information extracted by the authentication information extracting means and (ii) the terminal ID obtained from the terminal ID storage means.

[7] A data providing device of the present invention may be a data providing device for providing operation data, including processing specifying information which specifies processing to be carried out, to an operation device which transmits the operation data to a data processing device which carries out the processing in accordance with the operation data, the data providing device including: authentication information generating means for generating, for each of operation devices and in response to each of the operation devices, authentication information for use in authentication processing to be carried out in a case where the data providing device is accessed by the data processing device; operation data generating means for generating operation data including (i) the authentication information generated by the authentication information generating means and (ii) processing specifying information which specifies processing of access by the data processing device to the data providing device; and operation data transmitting means for transmitting the operation data, generated by the operation data generating means, to the operation device.

[8] A method of the present invention for controlling a data providing device may be a method for controlling a data providing device for providing operation data, including processing specifying information which specifies processing to be carried out, to an operation device which transmits the operation data to a data processing device which carries out the processing in accordance with the operation data, the method including: an authentication information generating step for generating, for each of operation devices, authentication information for use in authentication processing to be carried out by the data providing device in a case where the data providing device is accessed by the data processing device; an operation data generating step for generating operation data including (i) the authentication information generated in the authentication information generating step and (ii) processing specifying information which specifies authentication processing; an operation data transmitting step for transmitting the operation data, generated in the operation data generating step, to the operation device; an authentication information/device information receiving step for receiving, from the data processing device, (i) the authentication information included in the operation data and (ii) first device information with which the data processing device is identifiable; and an authentication information/device information checking step for carrying out the authentication processing on the basis of a set of the authentication information and the first device information both received in the authentication information/device information receiving step.

[9] A method of the present invention for controlling an operation device may be a method for controlling an operation device for transmitting operation data to a data processing device which carries out processing in accordance with operation data, which operation data (i) includes processing specifying information which specifies the processing to be carried out and (ii) is provided by a data providing device which generates, in response to a request from an external device, authentication information for use in authentication processing carried out in a case where the data providing device is accessed by the data processing device, the method including: an operation data receiving step for receiving, from the data providing device, operation data including (i) the authentication information generated by the data providing device and (ii) processing specifying information which specifies authentication processing; and an operation data transmitting step for transmitting the operation data, received in the operation data receiving step, to the data processing device.

[10] A method of the present invention for controlling a data processing device may be a method for controlling a data processing device for carrying out processing in accordance with operation data which (i) includes processing specifying information which specifies the processing to be carried out and (ii) is provided to an operation device from a data providing device which generates authentication information for use in authentication processing carried out in a case where the data providing device is accessed by an external device, the method including: an operation data receiving step for receiving, from the operation device, operation data including (i) the authentication information and (ii) processing specifying information which specifies authentication processing; an authentication information extracting step for extracting the authentication information from the operation data received in the operation data receiving step; and an authentication information/device information transmitting step for transmitting, to the data providing device, (i) the authentication information extracted in the authentication information extracting step and (ii) device information with which the data processing device is identifiable.

Finally, the control sections (that is, the service providing device control section 403, the display processing device control section 203, and the operation device control section 303) can each be realized by way of hardware, or software as executed by a CPU as follows: The service providing device 400, the display processing device 200, and the operation device 300 each include a CPU and memory devices (memory media). The CPU executes instructions in control programs realizing the functions. The memory devices include a ROM which contains programs, a RAM to which the programs are loaded, and a memory containing the programs and various data. The objective of the present invention can also be achieved by mounting, to each of the service providing device 400, the display processing device 200, and the operation device 300, a computer-readable storage medium containing control program code (executable program, intermediate code program, or source program) for each of the service providing device 400, the display processing device 200, and the operation device 300, which is software realizing the aforementioned functions, in order for the computer (or CPU, MPU [micro processing unit]) in each of the service providing device 400, the display processing device 200, and the operation device 300 to retrieve and execute the program code contained in the storage medium.

The storage medium can be, for example, a tape, such as a magnetic tape or a cassette tape; a magnetic disk, such as a floppy (registered trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The service providing device 400, the display processing device 200, and the operation device 300 can each be arranged to be connectable to a communications network so that the program code can be delivered over the communications network. The communications network is not limited in any particular manner, and can be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and can be, for example, wired line, such as IEEE 1394 cable, USB cable, electric power line, cable TV line, telephone line, or ADSL line; or wireless, such as infrared radiation (IrDA), Bluetooth (registered trademark), IEEE 802.11 wireless, HDR, mobile telephone network, satellite line, or terrestrial digital network. The present invention can be achieved by use of a computer data signal embodied in a carrier wave which signal is formed by electronic transmission of the program code.

The present invention is not limited to the description of the embodiments above, but can be altered in various ways by a skilled person within the scope of the claims. Any embodiment based on a proper combination of technical means disclosed in different embodiments is also encompassed in the technical scope of the present invention.

As described above, a data providing device of the present invention is a data providing device for providing operation data, including processing specifying information which specifies processing to be carried out, to an operation device which transmits the operation data to a data processing device which carries out the processing in accordance with the operation data, the data providing device including: authentication information generating means for generating, for each of operation devices, authentication information for use in authentication processing to be carried out by the data providing device in a case where the data providing device is accessed by the data processing device; operation data generating means for generating operation data including (i) the authentication information generated by the authentication information generating means and (ii) processing specifying information which specifies the authentication processing; and operation data transmitting means for transmitting the operation data, generated by the operation data generating means, to the operation device.

Thus, after the operation device receives the operation data generated as above and then transmits the operation data thus received to the data processing device, the data processing device can, upon receipt of the operation data, carry out the authentication processing, carried out when the data processing device accesses the data providing device, on the basis of the authentication information included in the operation data. As a result, a user of the operation device who operates the data processing device has no need to directly enter the authentication information, and is simply required to transmit the operation data, generated as above, to the data processing device.

The user of the operation device thus has no need to carry out a troublesome operation of directly entering authentication information, and is instead merely required to carry out a simple operation of receiving and transmitting operation data. This achieves the advantage of carrying out authentication processing, carried out when the data processing device accesses the data providing device, without impairing convenience for the user.

The data providing device of the present invention may be arranged such that the authentication information generating means generates, for said each of operation devices, the authentication information for use in the authentication processing in response to a first request from the operation device for obtaining the authentication information.

According to the above arrangement, the data providing device generates authentication information in response to a first request from the operation device for obtaining authentication information.

The data providing device can thus transmit, to the operation device, operation data which is generated in response to the first request from the operation device and which includes the authentication information.

As a result, the operation device can obtain the operation data from the data providing device as a response to the first request.

The data providing device of the present invention may be arranged such that the first request includes service identification information for identifying a service which is to be provided to the data processing device in a case where the authentication processing has been successfully completed; the data providing device further includes a service-related information storage section which stores, in association with each other, (i) the service identification information and (ii) service-related information about the service identified by the service identification information; and the operation data generating means further (i) obtains, from the service-related information storage section, the service-related information associated with the service identification information included in the first request, and (ii) generates the operation data so that the operation data further includes the service-related information obtained.

According to the above arrangement, the data providing device can further (i) obtain, from the service-related information storage section, service-related information associated with the service identification information included in the first request, and (ii) generate operation data which includes the service-related information thus obtained.

The data providing device can thus transmit, to the operation device, operation data which includes (i) the authentication information generated in response to the first request and (ii) the service-related information associated with the service identification information included in the first request.

As a result, the user of the operation device can know, on the basis of the service-related information included in the operation data received from the data providing device, what service the received operation data is generated for. This advantageously further improves convenience for the user.

The data providing device of the present invention may be arranged such that the service-related information includes an image related to the service.

According to the above arrangement, the image related to the service is included in the operation data as the service-related information.

The data providing device can thus transmit, to the operation device, operation data which includes (i) the authentication information generated in response to the first request and (ii) the image related to the service.

As a result, the user of the operation device can know what service the received operation data is generated for, by simply viewing, on the operation device, the image related to the service which image is included in the operation data received from the data providing device. This advantageously further improves convenience for the user.

The data providing device of the present invention may be arranged such that the first request includes operation device identification information for identifying the operation device; the data providing device further includes a user-related information storage section which stores, in association with each other, (i) the operation device identification information and (ii) user-related information about a user of the operation device identified with the operation device identification information; and the operation data generating means further (i) obtains, from the user-related information storage section, the user-related information associated with the operation device identification information included in the first request, and (ii) generates the operation data so that the operation data further includes the user-related information obtained.

According to the above arrangement, the data providing device can further (i) obtain, from the user-related information storage section, user-related information associated with the operation device identification information included in the first request, and (ii) generate operation data which includes the user-related information thus obtained.

The data providing device can thus transmit, to the operation device, operation data which includes (i) the authentication information generated in response to the first request and (ii) the user-related information associated with the operation device identification information included in the first request.

As a result, the user of the operation device can know, on the basis of the user-related information included in the operation data received from the data providing device, which user the received operation data is generated for. This advantageously further improves convenience for the user.

The data providing device of the present invention may be arranged such that the user-related information includes an image related to the user.

According to the above arrangement, the image related to the user is included in the operation data as the user-related information.

The data providing device can thus transmit, to the operation device, operation data which includes (i) the authentication information generated in response to the first request and (ii) the image related to the user.

As a result, the user of the operation device can know which user the received operation data is generated for, by simply viewing, on the operation device, the image related to the user which image is included in the operation data received from the data providing device. This advantageously further improves convenience for the user.

An operation device of the present invention is an operation device for transmitting operation data to a data processing device, which operation data (i) includes processing specifying information which specifies first processing to be carried out and (ii) is provided by a data providing device which generates authentication information for use in authentication processing carried out in a case where the data providing device is accessed by the data processing device which carries out the first processing in accordance with the operation data, the operation device including: operation data receiving means for receiving, from the data providing device, operation data including (i) the authentication information generated by the data providing device and (ii) processing specifying information which specifies the authentication processing; and operation data transmitting means for transmitting the operation data, received by the operation data receiving means, to the data processing device.

Thus, after the operation device transmits the operation data received as above to the data processing device, the data processing device can, upon receipt of the operation data, cause the data providing device to carry out authentication processing on the basis of the authentication information included in the operation data. In other words, the user of the operation device has no need to directly enter the authentication information, and is merely required to carry out a simple operation of transmitting the operation data received as above to the data processing device.

As a result, the user can advantageously carry out a simple operation of receiving and transmitting operation data to carry out the authentication processing, carried out when the data processing device accesses the data providing device, without impairing convenience for the user.

The operation device of the present invention may be arranged such that the operation data received by the operation data receiving means from the data providing device includes an image; and the operation device further includes display control means for causing a display section of the operation device to display the image included in the operation data received by the operation data receiving means.

According to the above arrangement, the operation device can further cause its display section to display an image included in the operation data received from the data providing device.

The operation device can thus present the image, included in the operation data received, to the user of the operation device.

As a result, the user of the operation device can know, in a case where, for example, the image included in the operation data received is an image indicative of what service the receive operation data is generated for, what service the received operation data is generated for, by simply viewing the image displayed on the display section. The user of the operation device can further know, in a case where, for example, the image included in the operation data received is an image indicative of which user the receive operation data is generated for, which user the received operation data is generated for, by simply viewing the image displayed on the display section. This advantageously further improves convenience for the user.

The operation device of the present invention may be arranged such that the display control means further causes the display section to display a first user interface for accepting an instruction by a user to transmit the operation data, received by the operation data receiving means, to the data processing device; and the operation data transmitting means, in a case where the first user interface has accepted the instruction by the user, transmits the operation data, received by the operation data receiving means, to the data processing device.

According to the above arrangement, the operation device can further (i) cause the display section to display the first user interface, and (ii) transmit the operation data, received by the operation data receiving means, to the data processing device upon acceptance of an instruction by the user through the first user interface.

The operation device can thus transmit the operation data to the data processing device in response to an instruction, as a trigger, by the user through the first user interface.

As a result, the user of the operation device can decide when to transmit the operation data to the data processing device. This advantageously further improves convenience for the user.

The operation device of the present invention may further include: an operation data storage section which stores operation data including processing specifying information which specifies processing of access by the data processing device to the data providing device; and transmission instruction accepting means for causing the display section to display a second user interface for accepting an instruction by the user to transmit the operation data, stored in the operation data storage section, to the data processing device, wherein: the operation data transmitting means, in a case where the second user interface has accepted the instruction by the user, further transmits the operation data, stored in the operation data storage section, to the data processing device.

According to the above arrangement, the operation device can further (i) store operation data including processing specifying information which specifies processing of access by the data processing device to the data providing device, and (ii) transmit the operation data, stored in the operation data storage section, to the data processing device upon acceptance of an instruction by the user through the second user interface. The data processing device, upon receipt of the operation data, carries out the processing of access to the data providing device on the basis of the processing specifying information included in the operation data.

The operation device can thus cause the data processing device to carry out the processing of access to the data providing device in response to the acceptance, as a trigger, of the instruction by the user through the second user interface.

As a result, the user of the operation device can (i) merely carry out a simple operation to cause the data processing device to carry out the processing of access to the data providing device and (ii) decide when to transmit the operation data to the data processing device. This advantageously further improves convenience for the user.

A data processing device of the present invention is a data processing device for carrying out processing in accordance with operation data including processing specifying information which specifies the processing to be carried out, the operation data being provided to an operation device from a data providing device which generates authentication information for use in authentication processing carried out in a case where the data providing device is accessed by the data processing device, the data processing device including: operation data receiving means for receiving, from the operation device, operation data including (i) the authentication information and (ii) processing specifying information which specifies the authentication processing; authentication information extracting means for extracting the authentication information from the operation data received by the operation data receiving means; and authentication information transmitting means for transmitting the authentication information, extracted by the authentication information extracting means, to the data providing device.

Thus, after receiving the operation data from the operation device, the data processing device can transmit the authentication information, included in the operation data, to the data providing device so as to cause the data providing device to carry out the authentication processing. A user of the operation device who operates the data processing device thus has no need to directly enter the authentication information, and is merely required to carry out a simple operation of transmitting the operation data generated as above to the data processing device in order to cause the data providing device to carry out the authentication processing.

The user of the operation device thus has no need to carry out a troublesome operation of directly entering authentication information, and is instead merely required to carry out a simple operation of receiving and transmitting operation data. As such, it is possible to carry out authentication processing, carried out when the data processing device accesses the data providing device, without impairing convenience for the user.

The data providing device of the present invention may further include: authentication information/device information receiving means for receiving, from the data processing device, (i) the authentication information included in the operation data and (ii) first device information with which the data processing device is identifiable; and authentication information/device information checking means for carrying out the authentication processing on a basis of a first set of (i) the authentication information and (ii) the first device information both received by the authentication information/device information receiving means.

According to the above arrangement, the data providing device can receive, from the data processing device, (i) the authentication information included in the operation data and (ii) the first device information, and can further carry out authentication processing on the basis of the first set of the authentication information and the first device information both received as above.

As such, after the operation device transmits the operation data, generated by the data providing device and received by the operation device, to the data processing device, the data processing device can, upon receipt of the operation data, cause the data providing device to carry out authentication processing on the basis of (i) the authentication information included in the operation data and (ii) the first device information of the data processing device. The user of the operation device who operates the data processing device thus has no need to directly enter the authentication information, and is merely required to carry out a simple operation of transmitting the operation data generated as above to the data processing device in order to cause the data providing device to carry out the authentication processing.

The data providing device can further use the first device information of the data processing device for the authentication processing. As such, it is possible to (i) prevent the data providing device from receiving authentication information from an unauthorized data processing device, and thus (ii) improve security.

As a result, authentication processing can be carried out, in the case where the data providing device is accessed, while convenience for the user and a predetermined security level are maintained.

The data providing device of the present invention may further include: authentication information/device information storage means for causing an authentication information/device information storage section of the data providing device to store, in association with each other, (i) the authentication information generated by the authentication information generating means and (ii) the first device information, wherein: the authentication information/device information checking means carries out the authentication processing by checking whether the first set is identical to a second set of (i)

the authentication information and (ii) the first device information both stored in the authentication information/device information storage section.

According to the above arrangement, the data providing device can carry out authentication processing by checking whether the first set of (i) the authentication information and (ii) the first device information both received by the authentication information/device information receiving means is identical to the second set of (i) the authentication information and (ii) the first device information both stored in the authentication information/device information storage section.

The data providing device can thus (i) check, by checking whether the authentication information received is identical to that stored in advance, whether the data providing device is being accessed on the basis of proper authentication information, and (ii) carry out terminal authentication for the data processing device by checking whether the first device information received is identical to that stored in advance. As such, it is possible to (i) prevent access by an unauthorized data processing device and thus (ii) improve security.

As a result, authentication processing can be carried out, in the case where the data providing device is accessed, while a predetermined security level is maintained.

The data providing device of the present invention may be arranged such that the authentication information generating means generates an electronic signature as the authentication information; and the authentication information/device information checking means (i) verifies authenticity of the electronic signature, serving as the authentication information, received by the authentication information/device information receiving means, and (ii) carries out the authentication processing by checking whether the first device information received by the authentication information/device information receiving means is identical to the first device information stored in the data providing device in advance.

According to the above arrangement, the data providing device can (i) verify the authenticity of the received electronic signature serving as the authentication information, and (ii) carry out authentication processing by checking whether the first device information received by the authentication information/device information receiving means is identical to the first device information stored in the authentication information/device information storage section.

The data providing device can thus (i) check, by verifying the authenticity of the received electronic signature as the authentication information, whether the data providing device is being accessed by a data processing device possessing a proper electronic signature, and (ii) carry out terminal authentication for the data processing device by checking whether the first device information received is identical to that stored in advance. As such, it is possible to (i) prevent access by an unauthorized data processing device and thus (ii) improve security.

As a result, authentication processing can be carried out, in the case where the data providing device is accessed, while a predetermined security level is maintained.

The data providing device of the present invention may further include: a second device information storage section which stores in advance second device information with which the operation device is identifiable; and authentication information generation request receiving means for receiving, from the operation device, (i) a request for generating the authentication information and (ii) the second device information, wherein: the authentication information generating means (i) checks whether the second device information received by the authentication information generation request receiving means is identical to the second device information stored in the second device information storage section, and if the second device information received by the authentication information generation request receiving means is identical to the second device information stored in the second device information storage section, (ii) generates the authentication information.

According to the above arrangement, the data providing device can receive, from the operation device, (i) a request for generating authentication information and (ii) second device information. The data providing device can further (i) check whether the second device information received is identical to second device information stored in the second device information storage section, and if the second device information received is identical to the second device information stored in the second device information storage section, (ii) generate authentication information.

The data providing device can thus carry out terminal authentication for the operation device when generating, in response to a request from the operation device, operation data including authentication information. As such, it is possible to (i) prevent a request for authentication information from an unauthorized operation device and thus (ii) improve security.

As a result, the operation data can be provided to the operation device, while a predetermined security level is maintained.

The data providing device of the present invention may further include: a first device information storage section which stores the first device information in advance; and authentication information generation request receiving means for receiving, from the data processing device, (i) a request for generating the authentication information and (ii) the first device information, wherein: the authentication information generating means (i) checks whether the first device information received by the authentication information generation request receiving means is identical to the first device information stored in the first device information storage section, and if the first device information received by the authentication information generation request receiving means is identical to the first device information stored in the first device information storage section, (ii) generates the authentication information.

According to the above arrangement, the data providing device can receive, from the data processing device, (i) a request for generating authentication information and (ii) first device information. The data providing device can further (i) check whether the first device information received is identical to first device information stored in the first device information storage section, and if the first device information received is identical to the first device information stored in the first device information storage section, (ii) generate authentication information.

The data providing device can thus carry out terminal authentication for the data processing device when generating, in response to a request from the data processing device, operation data including authentication information. As such, it is possible to (i) prevent a request for authentication information from an unauthorized data processing device and thus (ii) improve security.

As a result, the operation data can be provided to the operation device, while a predetermined security level is maintained.

The data providing device of the present invention may be arranged such that the operation data is data which the operation device is capable of presenting to a user.

According to the above arrangement, the operation data can further be data which the operation device can present to the user. The operation data is, for example, image data indicative of an outline of processing specified in processing specifying information. The operation data can be displayed on the display section of the operation device so as to be presented to the user.

The user can thus carry out authentication processing, carried out in a case where the data providing device is accessed, while viewing the operation data (for example, the outline of processing) on the operation device.

As a result, the user can view what processing is to be carried out in a case where the user transmits the operation data. This advantageously further improves convenience for the user.

The operation device of the present invention may be arranged such that the operation data receiving means further receives the operation data from the data providing device in a case where the data providing device generates the authentication information in response to a request from an external device.

According to the above arrangement, the operation device can receive, from the data providing device, operation data which is generated in response to a request from an external device and which includes authentication information.

As a result, the operation device can advantageously obtain, from the data providing device, the authentication information generated in response to the request.

The operation device of the present invention may further include: authentication information requesting means for transmitting a request for the authentication information to the data providing device.

According to the above arrangement, the operation device can further transmit a request to the data providing device for authentication information.

As such, the data providing device can generate operation data which includes (i) authentication information generated in response to a request from the operation device and (ii) processing specifying information which specifies authentication processing, and the operation device can receive the operation data generated by the data providing device. Thus, the user of the operation device can in advance obtain operation data, including processing specifying information which specifies authentication processing, from the data providing device before the user accesses the data providing device via the data processing device. When the user accesses the data providing device via the data processing device, the user is thus merely required to carry out a simple operation of transmitting the operation data, obtained in advance, to the data processing device so as to cause the data providing device to carry out authentication processing.

As such, it is possible to carry out authentication processing, carried out when the data processing device accesses the data providing device, without impairing convenience for the user. In addition, since the user can obtain operation data in advance, it is possible to shorten a period necessary for authentication processing, as compared to a case in which the user obtains operation data after being notified that authentication processing is necessary.

The operation device of the present invention may be arranged such that the authentication information requesting means further transmits device information with which the operation device is identifiable.

According to the above arrangement, the operation device can transmit, to the data providing device, not only a request for authentication information, but also device information with which the operation device is identifiable.

The data providing device can thus carry out, on the basis of the device information of the operation device, authentication processing for the operation device which has transmitted the request for authentication information.

As a result, the data providing device can carry out, when generating operation data including authentication information, terminal authentication for the operation device which has transmitted the request for authentication information. In a case where this terminal authentication is carried out, it is possible to (i) prevent a request for authentication information from an unauthorized operation device and thus (ii) further improve security.

The operation device of the present invention may be arranged such that the operation data is data which the operation device is capable of presenting to a user; and the operation device further includes a display section which displays the operation data received by the operation data receiving means.

According to the above arrangement, the operation data can further be data which the operation device can present to the user. The operation data is, for example, image data indicative of an outline of processing specified in processing specifying information. The operation data can be displayed on the display section of the operation device so as to be presented to the user.

The user can thus carry out authentication processing, carried out in a case where the data providing device is accessed, while viewing the operation data (the outline of processing) on the display section of the operation device.

As a result, the user can view what processing is to be carried out in a case where the user transmits the operation data. This advantageously further improves convenience for the user.

The data processing device of the present invention may be arranged such that the authentication information transmitting means further transmits, to the data providing device, device information with which the data processing device is identifiable.

According to the above arrangement, the data processing device can transmit, to the data providing device, device information with which the data processing device is identifiable.

Since the data processing device transmits its device information to the data providing device, the data providing device can, when carrying out the authentication processing, carry out terminal authentication for the data processing device which has transmitted the authentication information. In a case where this terminal authentication is carried out, it is possible to (i) prevent transmission of authentication information from an unauthorized data processing device and thus (ii) improve security.

As a result, authentication processing can be carried out, in the case where the data providing device is accessed, while convenience for the user and a predetermined security level are maintained.

The data processing device of the present invention may further include: authentication information requesting means for (i) transmitting a request for the authentication information to the data providing device and (ii) transmitting, to the data providing device, the device information with which the data processing device is identifiable.

According to the above arrangement, the data processing device can transmit, to the data providing device, not only a request for authentication information, but also device information with which the data processing device is identifiable.

As such, in a case where the data providing device is arranged to generate authentication information in response to a request from an external device, it is possible to cause the data providing device to generate authentication information in response to a request from the data processing device. Further, since the data processing device transmits its device information to the data providing device, the data providing device can carry out terminal authentication on the basis of the device information of the data processing device. In a case where this terminal authentication is carried out, it is possible to (i) prevent a request for authentication information from an unauthorized data processing device, and thus (ii) improve security.

As a result, it is possible to cause the data providing device to generate the operation device, while a predetermined security level is maintained.

An operation system of the present invention includes: the data providing device; the operation device; and the data processing device.

First, according to the above arrangement, the data providing device can (i) generate, for each operation device, authentication information for use in authentication processing carried out in the case where the data providing device is accessed by the data processing device, (ii) generate operation data including the authentication information generate as above and processing specifying information which specifies authentication processing, and (iii) transmit the operation data generated as above to the operation device.

Second, according to the above arrangement, the operation device can (i) receive, from the data providing device, authentication information generated as above and the processing specifying information which specifies authentication processing, and (ii) transmit the operation data received as above to the data processing device.

Third, according to the above arrangement, the data processing device can (i) receive, from the operation device, the operation data including the authentication information and the processing specifying information which specifies authentication processing, (ii) extract the authentication information from the operation data thus received, and (iii) transmit the authentication information thus extracted to the data providing device.

As such, according to the operation system, after the operation device transmits the operation data, generated by the data providing device and received by the operation device, to the data processing device, the data processing device can, upon receipt of the operation data, cause the data providing device to carry out authentication processing on the basis of the authentication information included in the operation data. The user of the operation device who operates the data processing device thus has no need to directly enter the authentication information, and is merely required to carry out a simple operation of transmitting the operation data generated as above to the data processing device in order to cause the data providing device to carry out the authentication processing.

In other words, the user of the operation device can cause the data providing device to carry out authentication processing, by transmitting, to the data processing device, the operation data including authentication information generated by the data providing device.

Within the operation system including the data providing device, the operation device, and the data processing device, the user carries out a simple operation of receiving and transmitting operation data on the operation device. As a result, it is possible to carry out authentication processing, carried out when the data processing device accesses the data providing device, without impairing convenience for the user.

Note that each of the data providing device, the operation device, and the data processing device can also be in the form of a computer. In this case, the present invention encompasses in its scope (i) a control program for each of the data providing device, the operation device, and the data processing device, the control program causing the computer to function as each of the means so as to allow each of the data providing device, the operation device, and the data processing device to be in the form of a computer, and (ii) a non-transitory computer-readable recording medium in which the control program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided that such variations do not exceed the scope of the patent claims set forth below.

INDUSTRIAL APPLICABILITY

The present invention is applicable to an operation system including (i) a data processing device which carries out processing in accordance with operation data, (ii) an operation device which transmits operation data to the data processing device, and (iii) a data providing device which provides operation data to the operation device. The data processing device of the present invention is particularly applicable to, for example, a television receiver and a video recorder which are remotely operated with use of a remote control or the like. The operation device of the present invention is particularly applicable to, for example, a remote control and a mobile telephone which are capable of remotely operating other equipment.

REFERENCE SIGNS LISTS

| | |
|---|---|
| 3 | operation image data (operation data) |
| 3A | site access image data |
| 3B | authentication image data (operation data) |
| 3C | authentication information-attached site access image data (operation data) |
| 3D | purchase image data |
| 3E | user identification image data (operation data) |
| 5 | processing specifying information |
| 100 | operation system |
| 200 | display processing device (data processing device) |
| 233 | image data receiving processing section (operation data receiving means) |
| 234 | processing specifying information extraction processing section (authentication information extracting means) |
| 235 | processing performing section |
| 2352 | login request processing section (authentication information transmitting means) |
| 2354 | login request processing section (authentication information/ device information transmitting means) |
| 2355 | login request processing section (authentication information/device information transmitting means) |
| 2356 | authentication information issue request processing section (authentication information requesting means) |
| 300 | operation device |
| 304 | display section |
| 332 | service display processing section (transmission instruction accepting means) |
| 334 | login authentication request processing section |

-continued

| | |
|---|---|
| 335 | image data receiving processing section (operation data receiving means; display control means) |
| 336 | image data transmission processing section (operation data transmitting means) |
| 337 | service start request processing section |
| 339 | electronic mail receiving processing section (operation data receiving means) |
| 338 | user identification request processing section (authentication information requesting means) |
| 374 | image data storage section (operation data storage section) |
| 400 | service providing device (data providing device) |
| 432 | access request receiving processing section |
| 433 | login instruction transmission processing section |
| 434 | authentication request receiving processing section |
| 435 | one-time PW generating processing section (authentication information generating means) |
| 436 | image data generating processing section (operation data generating means; operation data transmitting means) |
| 437 | login request receiving processing section |
| 438 | service start request receiving processing section |
| 440 | user identification request receiving processing section (authentication information generation request receiving means) |
| 441 | user identification information generating processing section (authentication information generating means; authentication information/device information storage means) |
| 442 | login request receiving processing section (authentication information/device information receiving means; authentication information/device information checking means) |
| 443 | authentication information issue request receiving processing section (authentication information generation request receiving means) |
| 444 | login request receiving processing section (authentication information/device information receiving means; authentication information/device information checking means) |
| 445 | electronic mail transmission processing section (operation data transmitting means) |
| 472 | authentication information storage section |
| 476 | terminal/user information storage section (authentication information/device information storage section; second device information storage section) |
| 477 | terminal/user information storage section (first device information storage section) |
| 478 | user-related information storage section |
| 479 | service-related information storage section |

The invention claimed is:

1. The data providing device for providing operation data, including processing specifying information which specifies processing to be carried out, to an operation device which transmits the operation data to a data processing device which carries out the processing in accordance with the operation data, the data providing device comprising:
authentication information generating means for generating, for each of operation devices, authentication information for use in authentication processing to be carried out by the data providing device in a case where the data providing device is accessed by the data processing device;
operation data generating means for generating operation data including (i) the authentication information generated by the authentication information generating means and (ii) processing specifying information which specifies the authentication processing; and
operation data transmitting means for transmitting the operation data, generated by the operation data generating means, to the operation device, wherein:
the authentication information generating means generates, for said each of operation devices, the authentication information for use in the authentication processing in response to a first request from the operation device for obtaining the authentication information,
wherein:
the first request includes service identification information for identifying a service which is to be provided to the data processing device in a case where the authentication processing has been successfully completed;
the data providing device further comprises a service-related information storage section which stores, in association with each other, (i) the service identification information and (ii) service-related information about the service identified by the service identification information; and
the operation data generating means further (i) obtains, from the service-related information storage section, the service-related information associated with the service identification information included in the first request, and (ii) generates the operation data so that the operation data further includes the service-related information obtained.

2. The data providing device according to claim 1, wherein:
the service-related information includes an image related to the service.

3. The data providing device according to claim 1, wherein:
the first request includes operation device identification information for identifying the operation device;
the data providing device further comprises a user-related information storage section which stores, in association with each other, (i) the operation device identification information and (ii) user-related information about a user of the operation device identified with the operation device identification information; and
the operation data generating means further (i) obtains, from the user-related information storage section, the user-related information associated with the operation device identification information included in the first request, and (ii) generates the operation data so that the operation data further includes the user-related information obtained.

4. The data providing device according to claim 3, wherein:
the user-related information includes an image related to the user.

5. The data providing device according to claim 1, further comprising:
authentication information/device information receiving means for receiving, from the data processing device, (i) the authentication information included in the operation data and (ii) first device information with which the data processing device is identifiable; and
authentication information/device information checking means for carrying out the authentication processing on a basis of a first set of (i) the authentication information and (ii) the first device information both received by the authentication information/device information receiving means.

6. The data providing device according to claim 5, further comprising:
authentication information/device information storage means for causing an authentication information/device information storage section of the data providing device to store, in association with each other, (i) the authentication information generated by the authentication information generating means and (ii) the first device information,
wherein:
the authentication information/device information checking means carries out the authentication processing by checking whether the first set is identical to a second set of (i) the authentication information and (ii) the first device information both stored in the authentication information/device information storage section.

7. The data providing device according to claim 5, wherein:
the authentication information generating means generates an electronic signature as the authentication information; and
the authentication information/device information checking means (i) verifies authenticity of the electronic signature, serving as the authentication information, received by the authentication information/device information receiving means, and (ii) carries out the authentication processing by checking whether the first device information received by the authentication information/device information receiving means is identical to the first device information stored in the data providing device in advance.

8. The data providing device according to claim 5, further comprising:
a second device information storage section which stores in advance second device information with which the operation device is identifiable; and
authentication information generation request receiving means for receiving, from the operation device, (i) a request for generating the authentication information and (ii) the second device information,
wherein:
the authentication information generating means (i) checks whether the second device information received by the authentication information generation request receiving means is identical to the second device information stored in the second device information storage section, and if the second device information received by the authentication information generation request receiving means is identical to the second device information stored in the second device information storage section, (ii) generates the authentication information.

9. The data providing device according to claim 5, further comprising:
a first device information storage section which stores the first device information in advance; and
authentication information generation request receiving means for receiving, from the data processing device, (i) a request for generating the authentication information and (ii) the first device information,
wherein:
the authentication information generating means (i) checks whether the first device information received by the authentication information generation request receiving means is identical to the first device information stored in the first device information storage section, and if the first device information received by the authentication information generation request receiving means is identical to the first device information stored in the first device information storage section, (ii) generates the authentication information.

10. The data providing device according to claim 5, wherein:
the operation data is data which the operation device is capable of presenting to a user.

11. An operation device for transmitting operation data to a data processing device, which operation data (i) includes processing specifying information which specifies first processing to be carried out and (ii) is provided by a data providing device which generates authentication information for use in authentication processing carried out in a case where the data providing device is accessed by the data processing device which carries out the first processing in accordance with the operation data,
the operation device comprising:
operation data receiving means for receiving, from the data providing device, operation data including (i) the authentication information generated by the data providing device and (ii) processing specifying information which specifies the authentication processing; and
operation data transmitting means for transmitting the operation data, received by the operation data receiving means, to the data processing device,
wherein:
the operation data received by the operation data receiving means from the data providing device includes an image; and
the operation device further comprises display control means for causing a display section of the operation device to display the image included in the operation data received by the operation data receiving means.

12. The operation device according to claim 11, wherein:
the display control means further causes the display section to display a first user interface for accepting an instruction by a user to transmit the operation data, received by the operation data receiving means, to the data processing device; and
the operation data transmitting means, in a case where the first user interface has accepted the instruction by the user, transmits the operation data, received by the operation data receiving means, to the data processing device.

13. The operation device according to claim 11, further comprising:
an operation data storage section which stores operation data including processing specifying information which specifies processing of access by the data processing device to the data providing device; and
transmission instruction accepting means for causing the display section to display a second user interface for accepting an instruction by the user to transmit the operation data, stored in the operation data storage section, to the data processing device,
wherein:
the operation data transmitting means, in a case where the second user interface has accepted the instruction by the user, further transmits the operation data, stored in the operation data storage section, to the data processing device.

14. The operation device according to claim 11, wherein:
the operation data receiving means further receives the operation data from the data providing device in a case where the data providing device generates the authentication information in response to a request from an external device.

15. The operation device according to claim 14, further comprising:
authentication information requesting means for transmitting a request for the authentication information to the data providing device.

16. The operation device according to claim 15, wherein:
the authentication information requesting means further transmits device information with which the operation device is identifiable.

17. The operation device according to claim 14, wherein:
the operation data is data which the operation device is capable of presenting to a user; and
the operation device further comprises a display section which displays the operation data received by the operation data receiving means.

18. An data processing device for carrying out processing in accordance with operation data including processing specifying information which specifies the processing to be carried out, the operation data being provided to an operation device from a data providing device which generates authentication information for use in authentication processing carried out in a case where the data providing device is accessed by the data processing device,
the data processing device comprising:
operation data receiving means for receiving, from the operation device, operation data including (i) the authentication information and (ii) processing specifying information which specifies the authentication processing;
authentication information extracting means for extracting the authentication information from the operation data received by the operation data receiving means; and
authentication information transmitting means for transmitting the authentication information, extracted by the authentication information extracting means, to the data providing device,
wherein:
the authentication information transmitting means further transmits, to the data providing device, device information with which the data processing device is identifiable.

19. The data processing device according to claim 18, further comprising:
authentication information requesting means for (i) transmitting a request for the authentication information nation to the data providing device and (ii) transmitting, to the data providing device, the device information with which the data processing device is identifiable.

* * * * *